(12) United States Patent
Podgorny et al.

(10) Patent No.: US 7,904,209 B2
(45) Date of Patent: Mar. 8, 2011

(54) OPEN WEB SERVICES-BASED INDOOR CLIMATE CONTROL SYSTEM

(75) Inventors: Marek Podgorny, Fayetteville, NY (US); Luke Beca, Baldwinsville, NY (US); Roman Markowski, Syracuse, NY (US); Edward A. Bogucz, Fayetteville, NY (US); Suresh Santanam, Manlius, NY (US); Edward Lipson, Manlius, NY (US); Paul Roman, Blacksburg, VA (US); Greg Michalak, Manlius, NY (US); Gregg Lewandowski, Syracuse, NY (US); Paul D. Gelling, Syracuse, NY (US)

(73) Assignee: Syracuse University, Syracuse, NY (US)

( * ) Notice: Subject to any disclaimer, the term of this patent is extended or adjusted under 35 U.S.C. 154(b) by 51 days.

(21) Appl. No.: 12/041,472

(22) Filed: Mar. 3, 2008

(65) Prior Publication Data
US 2008/0281472 A1 Nov. 13, 2008

Related U.S. Application Data

(60) Provisional application No. 60/892,513, filed on Mar. 1, 2007.

(51) Int. Cl.
*G05D 23/00* (2006.01)
(52) U.S. Cl. .......... 700/276; 700/277; 700/278; 700/299
(58) Field of Classification Search .................. 700/8, 9, 700/17, 19, 276–278, 299, 300
See application file for complete search history.

(56) References Cited

U.S. PATENT DOCUMENTS

| 5,097,672 | A   |   | 3/1992 | Takenaka et al. |
| 6,067,477 | A   | * | 5/2000 | Wewalaarachchi et al. .... 700/17 |
| 6,604,023 | B1  | * | 8/2003 | Brown et al. ................. 700/276 |

(Continued)

OTHER PUBLICATIONS

Prototype INdoor Climate System Enables User to Control Personal Environmental Preferences Via the Web, http://www.sciencedialy.com/releases/2007/06/070627113500.htm.
CollabWorx Celebrates International Recognition at Technology Garden Event, Chamber News, http://www.syracusechamber.com/newsletters/august/front.html.

(Continued)

*Primary Examiner* — Charles R Kasenge
(74) *Attorney, Agent, or Firm* — George R. McGuire; Frederick J. M. Price

(57) ABSTRACT

The present invention relates generally to a building automation system, and, more particularly, to an Internet-centric, open, extensible software and hardware framework supporting all aspects of control and monitoring of a smart building ecosphere. The present invention further relates to an "intelligent," real-time control system capable of both autonomous process control and interaction with system users and system administrators, which is configured to accommodate functional extensions and a broad array of sensors and control devices. The system allows individuals to communicate, monitor and adjust their personal environmental preferences (temperature, light, humidity, white noise, etc.) much like they would in an automobile, via the Internet. The system is equipped with an occupancy sensor that recognizes the presence and identity of the individual. A built-in expert system can make decisions based on data from multiple sources so that the system can alter its activity to conserve energy while maintaining users' comfort.

9 Claims, 17 Drawing Sheets

U.S. PATENT DOCUMENTS

| | | | | |
|---|---|---|---|---|
| 6,756,998 B1* | 6/2004 | Bilger | | 715/764 |
| 6,792,319 B1* | 9/2004 | Bilger | | 700/276 |
| 6,832,120 B1 | 12/2004 | Frank et al. | | |
| 6,912,429 B1* | 6/2005 | Bilger | | 700/276 |
| 7,055,759 B2 | 6/2006 | Wacker et al. | | |
| 7,130,719 B2* | 10/2006 | Ehlers et al. | | 700/276 |
| 7,187,986 B2* | 3/2007 | Johnson et al. | | 700/9 |
| 7,343,226 B2* | 3/2008 | Ehlers et al. | | 700/276 |
| 7,436,292 B2* | 10/2008 | Rourke et al. | | 700/17 |
| 7,440,809 B2* | 10/2008 | Lehman et al. | | 700/83 |
| 7,480,534 B2* | 1/2009 | Bray et al. | | 700/19 |
| 7,529,646 B2* | 5/2009 | Lin et al. | | 700/19 |
| 2003/0216837 A1* | 11/2003 | Reich et al. | | 700/276 |
| 2004/0225649 A1* | 11/2004 | Yeo et al. | | 707/3 |
| 2005/0234596 A1* | 10/2005 | Rietschel | | 700/276 |
| 2005/0275525 A1* | 12/2005 | Ahmed | | 700/277 |
| 2006/0026972 A1 | 2/2006 | Masui et al. | | |
| 2006/0111816 A1 | 5/2006 | Spalink et al. | | |

OTHER PUBLICATIONS

Prototype Indoor climate system developed by local company CollabWorx, Inc. enables user to control personal environmental preferences via the Web, sunews.syr.edu/stor=4185.

User Interface, http://www.webopedia.com/TERM/U/user_interface.html as of Feb. 14, 2008.

Object, http://databases.about.com/od/administration/g/object_def.htm as of Feb. 15, 2008.

Application programming interface, http://en.wikipedia.org/wiki/Application_programming_interface as of Feb. 13, 2008.

Extensibility, http//en.wikipedia.org/wiki/Extensibility as of Feb. 13, 2008.

Web service, http://en.wikipedia.org/wiki/Web_service as of Feb. 13, 2008.

* cited by examiner

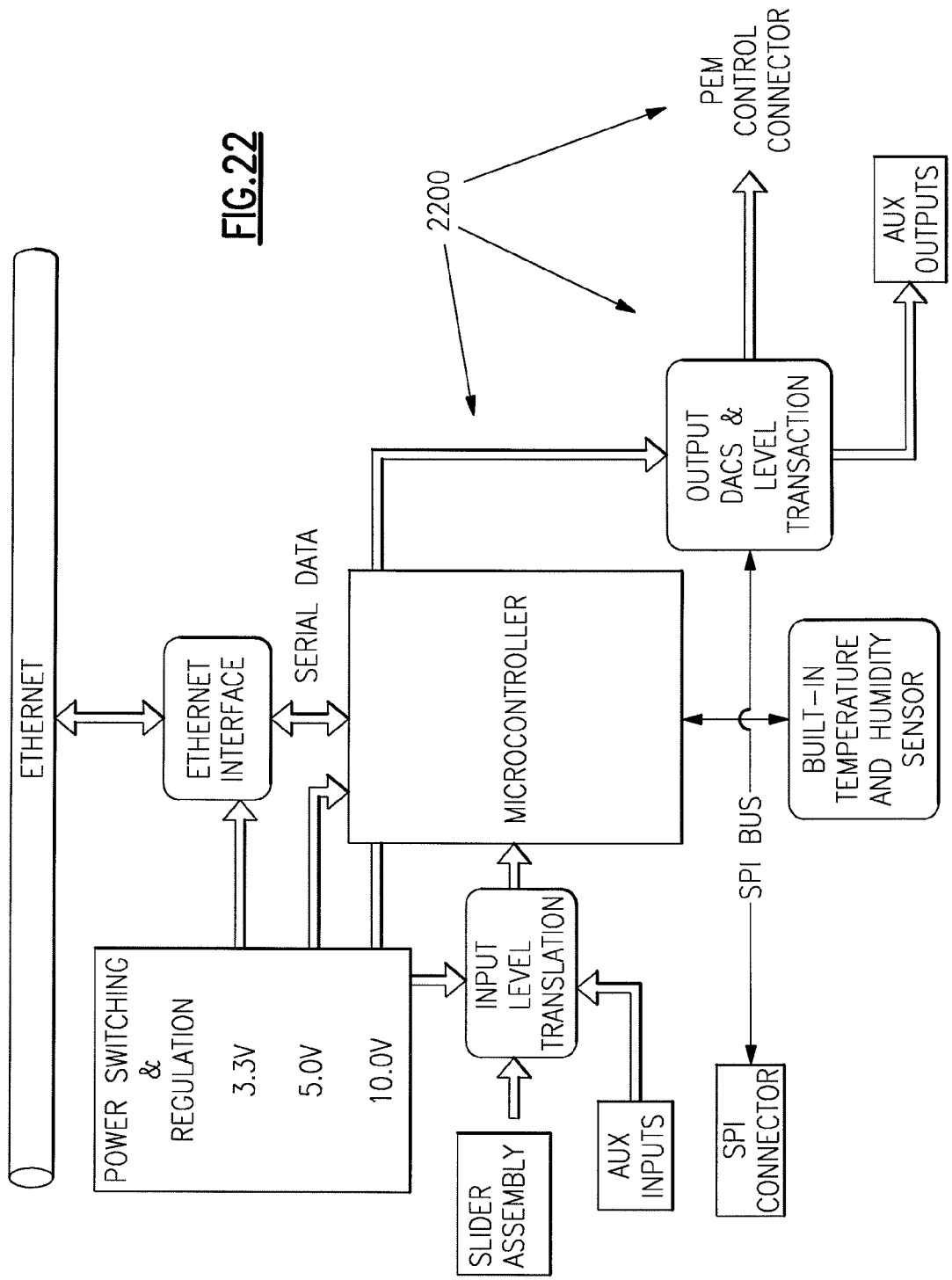

OPEN WEB SERVICES-BASED INDOOR CLIMATE CONTROL SYSTEM

CROSS-REFERENCE TO RELATED APPLICATIONS

This application claims priority to U.S. Provisional Patent Application Ser. No. 60/892,513, filed Mar. 1, 2007, the entirety of which is hereby incorporated by reference.

BACKGROUND OF THE INVENTION

1. Field of Invention

The present invention relates generally to a building automation system, and, more particularly, to an Internet-centric, open, extensible software and hardware framework supporting all aspects of control and monitoring of a smart building ecosphere. The present invention further relates to an "intelligent," real-time control system capable of both autonomous process control and interaction with system users and system administrators, which is configured to accommodate functional extensions and a broad array of sensors and control devices.

2. Description of Prior Art

Digital convergence of communication networks has advanced in recent years. Voice and video communications are now well established on Internet Protocol ("IP") networks and are quickly becoming as ubiquitous as basic information retrieval and e-commerce services. The global information infrastructure is essentially IP based, with all higher layers of network stack, diverse as they are, using the IP transport layer.

Digital convergence is even more striking in the domain of end-user devices. The functions of cell phones, PDAs, digital still cameras and camcorders, as well as Internet access are now all contained in a single readily available and affordable product. This convergence process will accelerate with mobile dual IP/GSM phones and fourth generation wireless converged networks. By 2010, it is anticipated that there will be hundreds of essential productivity applications, each running on devices of every size and communicating over seamlessly converged, ubiquitous wireless and optical networks with nearly unlimited bandwidth.

In contrast, convergence in the field of building automation and control is much slower, to a point that building automation systems ("BAS") seem to be non-participants in the communication and media exchange convergence. BAS are computer-based systems that monitor and control, e.g., security, fire, heating and cooling, and other major systems of a building.

The world of building and process automation is dominated by BACnet/LonTalk networks, which, although packet-based, implement a design philosophy alien to IP, with application logic supported by low-level network layers. Web-based interfaces to some of the existing systems and BACnet migration to Ethernet transport are superficial at best. The industrial application development frameworks (ADFs) are mostly proprietary and carry substantial royalties. This situation stifles innovation and makes true digital convergence of BASes an arduous process, with significant negative economic impact.

Indoor climate control systems are conventional. All of the foregoing patent-related document(s) are hereby incorporated by reference herein in their respective entirety(ies). For example, US patent application 2006/0026972 ("Masui") discloses a climate control system including: (i) an operation information processing section 11; (ii) a central remote controller 5; (iii) operation setting buttons 8a,8b,8c; (iv) transmission lines 6, 13; (v) display unit 9; (vi) a management information processing section 12a; (vii) a plurality of air conditioners 1,2; (viii) a remote monitor terminal 15; and (ix) a transmission medium 14. The central remote controller divides the air conditioners into several groups. The central remote controller collects and monitors operation information of the air conditioner. In the remote monitor terminal browser software (or a computer program of a Web browser) is installed as general-purpose software. The remote monitor terminal 15 remotely monitors the operation of the air conditioner by receiving the operation information transmitted through the transmission medium. The remote monitor terminal transmits control information to control the operation of the air conditioner. A general-purpose personal computer is used as the remote monitor terminal. A Local Area Network (LAN) or a wireless LAN (WLAN) is used as the transmission medium. The transmission medium can be connected to the personal computer. The management information processing section 12a receives and relays the control information transferred from the remote monitor terminal, and transfers the information to the air conditioner to control the operation of the air conditioner. Some embodiments disclosed in Masui also include a carbon dioxide concentration sensor for use with the air conditioner control system. Masui also discloses that information is collected such as an outlet temperature of a compressor, a pipe temperature, and a frequency of the compressor from the outdoor air conditioner units, and room temperature from the indoor units. Masui compares information collected by its various sensors to target values.

U.S. Pat. No. 7,055,759 ("Wacker") discloses a climate control system with PDA configuration of thermostats. The Wacker system may be used to remotely set and adjust a climate control system, including such climate control variables as temperatures, humidity, sensors, volume of air movement, fan or air mover behavior, the percentage of added fresh air, modulated and non-modulated control of valves and dampers, stages of cooling and heating at various zones, control of heat pumps, heaters and air conditioners, modes of occupied, unoccupied or standby of respective spaces in a building, for day and night, at selected times, on certain days, for specific buildings at particular locations and so on.

U.S. Pat. No. 5,097,672 ("Takenaka") discloses a climate control system including a spot air-conditioner including a blow-off duct. The blow-off duct is rotatably mounted on an air-conditioner. Takenaka also includes a human body detection device, which is provided at the blow-off duct. The detection device detects the presence of a person to be air-conditioned. Comfortable localized air-conditioning can be achieved because a wind direction control device controls a duct drive device of the blow-off duct in response to detected motion and/or location of the human body. The blow-off duct is rotated in accordance with the movement of the person to be air-conditioned.

US patent application 2006/0111816 ("Spalink") discloses a computerized climate control system. In the Spalink system, sensed data is received at a local processor in the building. The sensed data is associated with the climate in the building, weather outside the building and/or occupants of the building. The received sensed data is compared with corresponding predictive data associated with the climate in the building, weather outside the building and/or occupants of the building. Parameters associated with the climate of the building are adjusted at the local processor based on a result of the comparison.

U.S. Pat. No. 6,832,120 ("Frank et al.) discloses a control system.

There is a need to go beyond the proprietary or vertically specialized networks, protocols, and application frameworks typical of the current industrial automation systems.

There is also a need for digital convergence of building control, through a BAS, with IP networks (e.g., Internet network). Further, there is a need for faster, cheaper, and more efficient implementation of these automation systems.

Therefore, it would be useful and desirable to have a system to meet the above-mentioned needs.

SUMMARY OF THE INVENTION

In accordance with an embodiment of the present invention, a system is provided which addresses all of the above mentioned needs. In particular, a customized environmental control framework ("the system") is provided. The system comprises a software and hardware framework (made up of a plurality of interconnected software and hardware component modules) that supports the process of creating smart building systems. These smart building systems have the goal of increasing the productivity of the occupants of the building by providing personalized environmental zones while keeping the cost of maintenance and utilities at the same level as or lower than traditional building automation systems. While the system as described herein relates to environmental controls and human efficiency issues, the system has a clear general and universal technological advantage over current proprietary industrial solutions, and provides a sustainable foundation for, e.g., future collaborative development of smart building software by academic and industrial consortia and alliances.

In accordance with an embodiment of the present invention, a system is provided which is vendor-independent, and uses only open-source tools and components, unless none are available, in which case public standards can be used.

A system with a broad functionality, covering important aspects of building automation, is provided. More particularly, a system is provided with a specific functionality of climate environmental control in a space where users can express their preferences for several factors and realize them using personal environmental modules, while the system is responsible for global optimization and resolution of potential conflicts. The system relates to mapping BAS functionality into a pervasive Internet technology stack. The system also contemplates implementing a predictive model in the control module of the system.

The system's functionality comprises (a) adjusting environment variables to increase occupants' productivity; (b) tracking space occupants; (c) maintaining knowledge of the physical space including information about zones; (d) monitoring environmental factors in zones; (e) allowing individuals to communicate personal environmental preferences (temperature, noise, humidity, and the like); (f) providing a visual interface (e.g., similar to a weather map) to monitor the space/zones and their parameters; and (g) possessing the ability to self-adjust based on user preferences and output from an inference engine.

The system (a) supports interaction of the building automation elements with the human occupants of the space, and (b) has ability to make "smart" decisions in response to ever changing conditions in the building as reported by a plurality of sensor devices.

An embodiment of the present invention is focused on the design of the system's architecture, as well as the systems implementation, based on IP and open source technologies. The system supports the following features: Heterogeneous sensors and devices: It is possible to connect arbitrary IP-based sensors and devices to the system with minimal implementation, configuration, deployment, and maintenance effort; Personalized and dynamic environment: The system is able to customize environmental properties of the building spaces to align them with the preferences declared by the individual users. Environmental preferences form an environmental profile of an individual user that would travel with the individual across the building space; Customizable goal-oriented control: The system is able to apply reasoning to maintain the environmental parameters (temperature, humidity, etc.) of the building within specified parameters. The reasoning logic can be customizable, so that various strategies can be implemented, analyzed, and compared; Manual administrative control: The system provides means for an authorized personnel administrator to monitor the status of the system and set the global, overriding goals for the system and, means for direct control of specific devices can be provided; Potential of integration with IT infrastructure: The system provides interfaces for embedding it in the larger enterprise IT infrastructure; and Extensibility: It is possible to add new or replace existing system components using common software engineering skills.

In brief, the following technologies have been used to assemble and integrate the system of an embodiment of the present invention: Web Services—communication among system components; BACNet—base for internal device description; CLIPS—open-source inference-engine platform; Java 2 Enterprise Edition—set of APIs for building enterprise applications; Open Source technology stack: JBoss—J2EE Application Server; Struts—Web Application framework; Axis—Web Services framework; Hibernate—Persistence framework; Hypersonic—Database Management System; JMS—Java Messaging System; AJAX—Web GUI implementation methodology.

In accordance with an embodiment of the present invention, the system's implementation is based on the Java 2 Enterprise Edition (J2EE), which is used as a general programming platform for most server-side components of the system [(other general programming platforms such as MS .Net or PHP could be used). This implementation is related to the following features and properties of J2EE: (a) support for transactional access to the relational database management systems (DBMS); (b) well-defined communication mechanisms such as RMI, HTTP, Web-Services, and JMS; (c) mechanisms for accessing directory services such as LDAP; (d) J2EE is a set of specifications instead of products; the code is therefore easy to port to various implementations of J2EE; (e) Inclusion or integration with technologies that provide scalability, security, and fault tolerance; (f) J2EE is widely used as a platform for enterprise software systems; and (g) a selection of mature open-source implementations of J2EE platform is available.

As noted supra, the overall system design is Internet-centric, uses Web Services, and assumes IP addressability of all system elements, including sensors and control devices. All system functions can be implemented as Web Services and all real-time signaling can use pervasive messaging technologies proven effective in mainstream communication systems, such as JMS. (Sensors and control devices used with the system can be Internet Protocol-based, but the XML-coded device data structures can be based on the BACnet networking standard.). This design follows the need to provide an efficient mechanism ensuring an easier and faster process of bringing building automation systems into the fold of global digitally-converged communication infrastructure. Further, the system preferably uses pervasive Internet network and open-source subsystems, applications, and application development tools.

As such, the system framework is unique, since it makes a clean break with proprietary BAS technologies while maintaining a high degree of compatibility. The preferred embodiment of the system framework provides the first implementation of a fully digitally-converged BAS.

In accordance with a preferred embodiment of the present invention, all real-time signaling use pervasive messaging technologies already proven effective in mainstream communication systems. In a preferred embodiment, sensors and control devices compatible with the system are IP-based since the device data structures are rigorously derived from the BACnet paradigm.

In accordance with an embodiment of the present invention, a modular approach was adopted for the design of the system's architecture, where the system components reside on IP network nodes. A Smart Building Framework is at the core of the system. It constructs and maintains an up-to-date model, which represents the controlled environment. It allows components of the system to accurately interpret the data gathered from the devices and influence the environment as intended. The Smart Building Framework, which exposes its services using Web Services methodology, is implemented using the J2EE platform. It is deployed on a J2EE application server (e.g. JBoss) and communicates with a DBMS (e.g. Hypersonic). Third-party modules can connect to the Smart Building Framework over the network and access its services via a Web Services application-programming interface (API).

In accordance with an embodiment of the present invention, all other system components interact with the Smart Building Framework (including devices) through its set of web services. The following essential components of a preferred embodiment have been implemented: an Inference Engine implements the control logic of the Smart Building System; a Smart Device is a software wrapper for any real or virtual device that needs to be connected to the Smart Building System. It can be either deployed as a part of the real device software or it can run on a separate network node the real device connects to; an Administration Interface provides a graphical user interface (GUI) for monitoring and controlling the Smart Building System. It has tools for defining target environmental parameters for the system (goal-oriented approach), as well as specific device settings (direct device control overriding settings calculated and enforced by the Inference Engine). It is implemented by a Web-based application (Java Servlet, HTML, and JavaScript) that interacts with the Smart Building Framework to access the information about the system state; and (see FIG. 15) a Personalization Interface provides a GUI for regular users of the system. It allows users to specify their environmental preferences that the system tries to enforce. It is deployed on the JBoss J2EE application server.

In accordance with an embodiment of the present invention, the design of the system relates to a set of assumptions about a controlled space, called an environmental model. The controlled space is a physical space where the system monitors/controls environmental factors/characteristics such as temperature, humidity, light, noise, and the like.

The assumptions may include the following: the controlled space shall be divided into rooms; each room shall be divided into one or more environmental zones; only one environmental profile shall be active in an environmental zone; active environmental profile in the environmental zone shall describe the environmental settings for this zone (temperature, humidity, light, etc); an environmental zone shall have default environmental profile associated with it; only one instance of environmental preferences shall be associated with each user; the following factors influence active environmental profile in the environmental zone: 1) environmental preferences of the users present in the environmental zone, 2) default environmental profile of the zone, 3) commands from the Inference Engine, and 4) commands from the administrator; information about the location of the devices shall have granularity of the environmental zone; an environmental zone shall have user presence information associated with it; and an environmental zone shall have a list of neighboring environmental zones associated with it.

Other definitions which relate to basic concepts of a preferred embodiment of the present invention include: User presence—identity of the user (or users) present in the environmental zone. Identity equal to "null" indicates that no users are present; Environmental zone—a unit of space controlled by the system, which assumes that all environmental factors have uniform values within the environmental zone; Environmental profile—a set of key/value pairs that describe environmental parameters in the environmental zone, e.g., temperature=60, humidity=75, etc. The system strives to maintain environmental parameters of the zone within a given range from the values specified by the environmental profile; Environmental preference—a set of key/value pairs that describe environmental parameters selected by a space occupant/system user. Environmental preference of the user present in the environmental zone affects the environmental profile associated with this zone; Device—any hardware or software entity that can generate or accept data. The system receives information about environmental parameters of the environmental zone, and influences these parameters through devices installed in the zone; Sensor device—A device that generates data; System event—Action initiated by the system; Anomaly—Out of ordinary situation that potentially can have a negative impact on the building occupants, the building, or the System; Environmental control: control of at least one environmental characteristic; environmental characteristics include, but are not necessarily limited to: (i) relative humidity; (ii) absolute humidity; (iii) temperature; (iv) background, or white, noise; (v) light; (vi) air purification; and/or (vi) air flow; Environmental control appliance: any device for controlling at least one environmental characteristic; Environmental control sensor: any device for sensing at least one environmental characteristic; and biometric identification: identifying a person (or other animal) by evaluating at least one distinguishing biological feature including, but not limited to fingerprints, retina and iris patterns, voice, and DNA. A system in accordance with an embodiment of the present invention could be readily adapted to provide a reference implementation of protocols being designed in the arduous industrial standard setting process practiced by the ASHRAE BACnet/XML Working Group, oBIX, and CABA. Re-use of existing IT infrastructure: Most of the server-side components of the Smart Building system of an embodiment of the present invention run on a standard J2EE-compliant application server commonly used in the enterprise. Any relational DBMS can be used. As a result, the server-side components can be deployed and integrated with an existing IT infrastructure. Standard TCP/IP-based networks can be used to connect devices; Extensibility: Since all components of the system communicate through well-defined interfaces, they can be easily replaced or updated. New components can be created or existing ones modified using well know programming languages (e.g., Java) and communication technologies (e.g., web-services). A Java API is provided for creating new Smart Devices to simplify development even further. API's in other languages can be easily created; Integration with enterprise systems: The systems based on the Smart Building platform of an EPI can be controlled through a web-services interface.

As a result, they become one more element in the Service Oriented Architcture (SOA) palette in the organization; Support for legacy devices: Adding legacy devices (BACNet, LONTalk) is possible through gateways. Representation of devices in the platform as well as the communication protocol between Smart Device and Smart Building platform are based on BACNet concepts, therefore effort required to develop an adapter can be reduced; Blending of real and virtual worlds: Devices connected to the Smart Building Platform can be both real and virtual. This creates the possibility of making other components of the enterprise software infrastructure behave as virtual devices. For example, a corporate calendar can behave as a device that prepares conference room for a meeting before the meeting participants arrive; and Scalability and reliability: Making Web-based and J2EE based applications scalable and fault tolerant is a relatively well-understood field.

BRIEF DESCRIPTION OF THE DRAWINGS

The present invention will be more fully understood and appreciated by reading the following Detailed Description in conjunction with the accompanying drawings, in which:

FIG. 22 is a schematic of a PEM interface according to an embodiment of the present invention.

DETAILED DESCRIPTION

Figure 1:
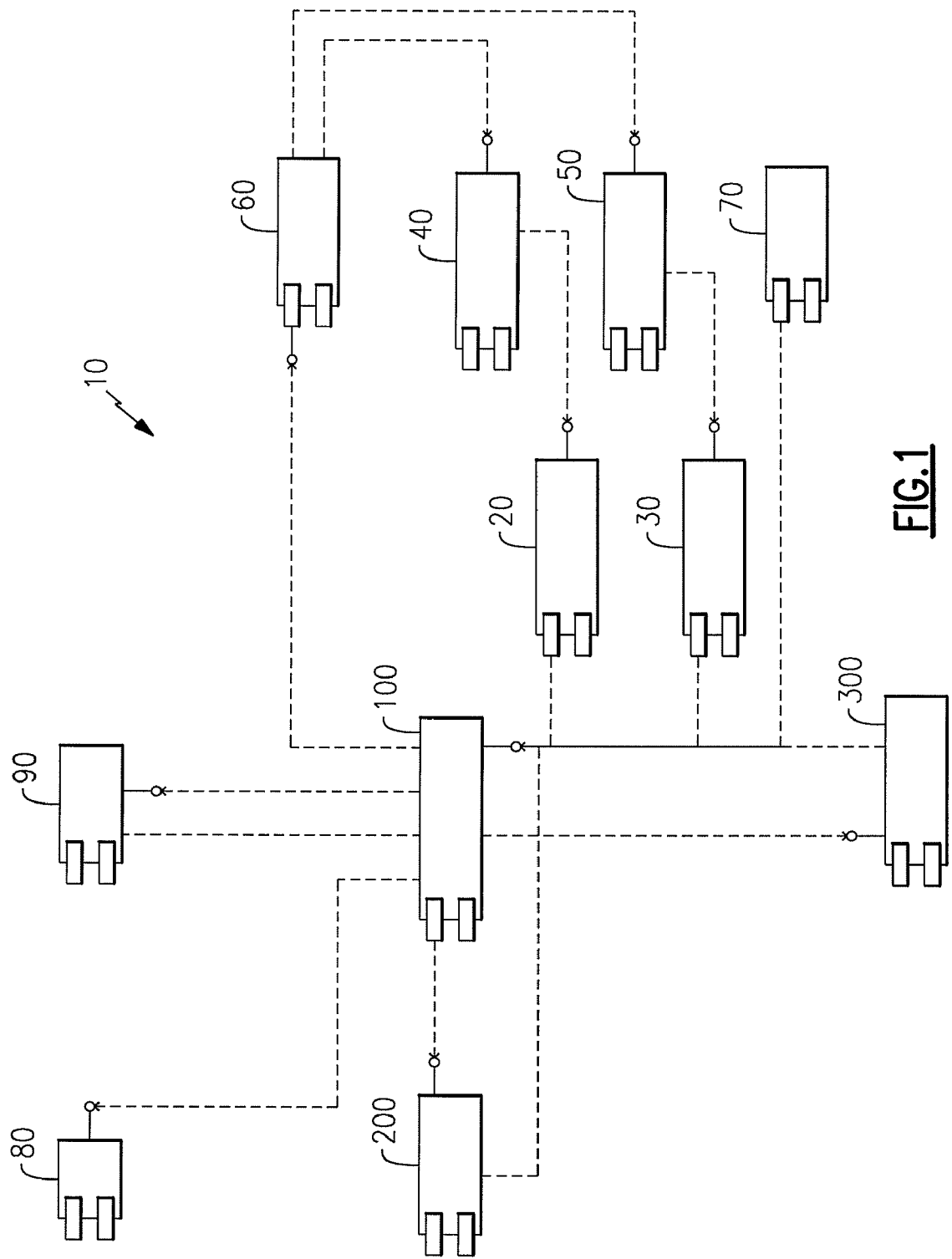
FIG. 1 is a schematic diagram illustrating the major components/modules of the system according to an embodiment of the present invention.

The present invention will be more fully understood and appreciated by reading the following Detailed Description in conjunction with the accompanying drawings, wherein like reference numerals refer to like components.

In accordance with an embodiment of the present invention, the system is divided into a number of software and hardware module components. A high-level design description of the preferred embodiment of the system will be described including system component functionality, any exposed interfaces, and dependencies, followed by a more detailed description of the system. Platform specific issues that have an impact on the design of the preferred embodiment of the system are also described.

Turning to FIG. 1, a high-level diagram of the major components/modules of the system according to an embodiment of the present invention is illustrated. For each component, the communication interfaces and dependencies are depicted. The description of each interface contains information about the technology used for its implementation.

The communication pattern between system modules in the preferred embodiment of the invention is based entirely on the Web Services model. This applies to both "read" and "write" operations, as described below. In addition, since devices and other modules can generate events that require handling, two mechanisms are implemented to propagate event information: for time-critical events, JMS (JMS engine is an integral part of the JBoss Application Server) is used; for event supporting services, such as archiving, a pooling mechanism under Web Services is used.

As shown in FIG. 1, the preferred embodiment of the system 10 comprises a number of components that are categorized as server side, client side, and device infrastructure components. Server side components/modules comprise a smart building framework 100, an administration Web application 20, a personalization Web application 30, an inference engine 200, and a DBMS. Client side components/modules comprise an administration Web User Interface (UI) 40, a personalization Web User Interface (UI) 50, a notification agent 60, a profile manager 70, and a presence agent 95 (not shown). Device infrastructure components include at least one smart device and at least one real device 97 (not shown).

The software modules provide services corresponding to the system requirements described herein.

The system is extensible, as it can accommodate External Applications 300 of any kind. A good example might be an energy optimization engine, a computational fluid dynamics application, or a set of web services reaching out to external data sources, such as a weather forecast or dynamic energy pricing schedules.

Smart Building Framework 100 is the central/core component of the system to which all other system components connect. Smart Building Framework 100 implements the following services: device status monitoring and data collection; device data archiving and retrieval; access to and manipulation of an object-oriented representation of the system state; event-based communication among system entities; and system configuration.

Most of the services described above are exposed through a set of web service APIs. The following definitions are employed herein which relate to a set of web service APIs of an embodiment of the present invention: Device Web Service: allows external devices to connect to the system. External devices use this service to register their presence and to report changes in their state; Object Access Web Service: provides access to object-oriented representation of the system state maintained by the framework. The Object Access interface can be used to both read and write properties of the objects maintained by the system. Write operations on the system state may translate into commands issued to the components of the system controlled by the Smart Building Framework 100. The service is also used by system components that need to access the information about the system entities (for example, Inference Engine 200 or Administration Interface 40); Event Access Web Service: implements a messaging system for sending prioritized, point-to-point or system-wide alerts related to the state of the system. For example, the Inference Engine 200 might send an alert to the Administration Interface 40 component, if the readings from the external devices exceed a certain threshold. Both sending and retrieving operations are supported. The service is used by all system components that need to send and/or retrieve alerts; and Archive Web Service: allows starting and stopping archiving of the data submitted by the external devices connected to the system. It also allows retrieval of the archived information. The Archive Web Service is used by the system entities that rely on the archived information about devices.

The web services implemented by the Smart Building Framework 100 can be accessed not only by the components of the Smart Building system but also by other external (remote) entities that need to access the information about the status of the building infrastructure.

All components of the preferred embodiment of the system can learn about the system-state changes through polling functionality embedded in all implemented web services. This approach is simple and works well with standard web infrastructure. To handle propagation of time-critical events, a server-side component implementing JMS-based notifications provided as shown in FIG. 1. Each component interested in receiving notifications from the Smart Building framework 100 can embed JMS client functionality. This also applies to the wrapper for devices and to the Inference Engine 200, as well as to the Administration and Personalization Interfaces. The JMS messages may carry either actual module commands, or a request for a module to poll the message sender for information.

Smart Building Framework 100 also provides communication, management, and monitoring services to other system components. Smart Building Framework 100 provides the following functionality: Access/modification of the current settings of the System components; Access/modification of the description and state of the controlled space (that includes information about Environmental Zones, Users, and Devices); Access to the archived information about the controlled space; Subscription to the real-time notifications about changes in the controlled space; and User authentication services. This functionality is used by the Administration Web Application 20, Personalization Web Application 30, Profile Manager 70, and Inference Engine 200 (through Control Interface) to implement their services. The provided interface can be used by External Applications 300 to control the System. Moreover, Smart Building Framework 100 sends notifications about system events and pending actions to the Inference Engine 200 and Notification Agents 60. Notifications can also be sent to External Applications 300.

Smart Building Framework 100 controls Smart Devices 90 connected to the System. Smart Device 90 needs to register with the Smart Building Framework 100 before it can be used by the System (through Device Interface). After registration, Smart Building Framework 100 can send notifications to the Smart Device 90 about pending actions. Smart Device 90 can send updates to Smart Building Framework 100 about changes in its states and can query Smart Building Framework 100 about pending actions (through Device Interface). Smart Building Framework 100 uses DBMS 80 to store all the information required by the System.

As shown in FIG. 1, interfaces associated with Smart Building Framework 100 include device interface and control interface. Dependencies associates with Smart Building Framework 100 include Data Access interface implemented by DBMS 80, Engine Notifications interface implemented by Inference Engine 200, Device Notifications interface implemented by Smart Device 90, Event Notifications interface implemented by Notification Agent 60, and Application Notifications interface implemented by External Applications 300.

Administration Web Application 20 implements the server side of the Administration Interface of the System. When a user submits the access URL in a Web browser, Administration Web Application 20 generates the Administration Web UI 40 and later handles all requests sent by Administration Web UI 40 during the administrative session. Administration Web Application 20 uses Control Interface implemented by Smart Building Framework 100 to handle the requests that require information about the System or that require changing the System state. An interface associated with Administration Web Application 20 includes Administration Web Interface 20. A dependency associated with Administration Web Application 20 includes Control Interface implemented by Smart Building Framework 100.

Personalization Web Application 30 implements the server side of the User Interface of the System. When the user submits the access URL in a Web browser, Personalization Web Application 30 generates the Personalization Web UI 50 and later handles all requests sent by Personalization Web UI 50 during the session. Personalization Web Application 30 uses Control Interface implemented by Smart Building Framework 100 to handle the requests that require information about the System or that require changing the System state.

An interface associated with Personalization Web Application 30 includes Personalization Web Interface. A dependency associated with Personalization Web Application 30 includes Control Interface implemented by Smart Building Framework 100.

The Inference Engine 200 implements the "brain" of the Smart Building system, i.e., the Inference Engine 200 provides the "intelligence" driving the Smart Building Framework 100. The Inference Engine 200 makes decisions based on information received from Smart Building Framework 100 and it drives the Smart Building Framework 100 to implement the decisions. While the devices connected to the framework 100 might be autonomous enough to make their own limited decisions, there exists a range of decisions that are beyond the capabilities of any single device. The Inference Engine 200 fills that gap by gathering information from the entire framework 100, making decisions based on the gathered data and then controlling the framework 100 to execute the decisions.

The Inference Engine 200 communicates with the rest of the Smart Building Framework 100 via a set of web-service interfaces. These allow it to extract information necessary for making a decision, and then to control the framework 100 to execute a decision taken. In particular, the framework interfaces allow: reading device input; controlling (writing to) devices; reading and modifying current environmental data; and sending system alerts. Since the communication mechanism is documented, it is possible to replace the engine 300 with another agent that would drive the framework.

The Inference Engine's 300 main functionality, the decision making, is split into decision beans. The application schedules a bean to execute at a specified time after the application start. From then on, a bean is in charge of its own scheduling. In addition to making decisions, the beans can also be used for simpler tasks, for example, to translate the information retrieved from the devices into current condition data.

The entire decision logic may be implemented as one complex bean, or as a several (possibly many) simpler beans. The Inference Engine 200 supports any approach. Typically, when a bean is executed, it will gather required data, analyze them and send the results (a decision) back to the framework 100. The bean can then ask the Inference Engine 200 to be scheduled again at some later time.

Simple decision beans can be implemented as Java objects. In the case of large systems and complex decision beans, the capabilities of the Java language might prove to be insufficient. For these scenarios, a rule engine can be integrated to allow the use of a more sophisticated decision making mechanism. The rule engine that can be used, CLIPS, can improve over Java in the areas of (a) processing more advanced condition statements, (b) resolving the conflicts among multiple conditions, and (c) general performance of complex-condition processing. Both Java and CLIPS decision beans can be used simultaneously.

In accordance with an embodiment of the present invention, a very simple example of a CLIPS script is provided below. There is no limit to the complexity of the rules that can be incorporated into the entire framework, and some of the rules that have been implemented are rather complex.

The data retrieved from the framework 100 are supplied to the script as CLIPS facts. The output of the script is also facts that are asserted or retracted based on the input:

```
;;;====================================================
======================
;;; This script establishes user presence in a zone based on a reading from
a presence sensor
;;; Input facts - presence-sensor; Output facts - zone-user
;;;====================================================
======================
;;; DEFTEMPLATES
(deftemplate presence-sensor
    (slot status)
    (slot user-id)
    (slot activity))
(deftemplate zone-user
    (slot user-id))
;;; RULES
(defrule current-user ""
    (presence-sensor (status active) (user-id ?u) (activity ?a))
    =>
    (assert (zone-user (user-id ?u)))
    (printout t "user present is: " ?u crlf))
```

It is important to note that the Smart Building Framework 100 insulates Inference Engine 200 from the details of the System implementation, so that the only component the Inference Engine 200 knows about is the Smart Building Framework 100 itself. An important feature of the Inference Engine 200 is its scriptability, i.e. the possibility of adding new decision modules to extend its capabilities.

An interface associated with the Inference Engine 200 includes engine notifications. A dependency associated with the Inference Engine 200 includes Control Interface implemented by Smart Building Framework 100.

DBMS 80 provides permanent storage and retrieval of the following types of information: Configuration: Information needed by the components of the System to initialize and find resources required by the System; System objects: Information about Environmental Zones, Users, and Devices managed by the System; Current state of the System: Information about the current status of the System objects; and System state history: Information about status of the System objects recorded by the System in the past. An interface associated with DBMS 80 includes Data Access Interface.

Administration Web UI 40 allows the System administrator to configure, control, and monitor the System through graphical user interface (GUI). An Interface associated with Administration Web UI 40 includes Admin User Event Notification. A dependency associated with Administration Web UI 40 includes Administration Web Interface implemented by Administration Web App 20.

Personalization Web UI 30 allows the System user to modify and monitor her personal environmental preferences through graphical user interface (GUI). An interface associated with Personalization Web UI 30 includes User Event Notification. A dependency associated with Personalization Web UI 30 includes Personalization Web Interface implemented by Personalization Web App 30.

Notification Agent 60 receives System notifications on behalf of an active user. A number of Notification Agents 60 may be running in the deployed system, each handling notifications for one user. Notification Agent 60 accepts notifications from the Smart Building Framework 100 and passes them to Personalization Web UI 50 or Administration Web UI 40 (depending on which one is currently running on the client machine). If neither Personalization Web UI 50 nor Administration Web UI 40 is activated when Notification Agent 60 receives a notification from the Smart Building Framework 100, Notification Agent 60 is responsible for launching Personalization Web UI 50 or Administration Web UI 40 (indicated by the configuration) and ensuring that the notification is received by one of these components. An interface associated with Notification Agent 60 includes Event Notification. Dependencies associated with Notification Agent 60 include User Event Notification implemented by Personalization Web UI 50 and Admin User Event Notification implemented by Administration Web UI 40.

Profile Manager 70 allows a user to set her System credentials and store them on the client machine for streamlined System login procedure. Profile Manager 70 provides graphical user interface for entering credentials and it communicates with Smart Building Framework 100 to verify them. Profile Manager 70 also allows a user to set her local preferences. Dependencies associated with the profile manager include Control Interface implemented by Smart Building Framework 100.

Presence Agent is a type of Smart Device 90. It detects the presence of the user in the Environmental Zone. Usually it is deployed on a PC machine and it is activated whenever the user logs in to her operating system account. Presence Agent retrieves user's credentials stored on the machine by the Profile Manager 70 and notifies Smart Building Framework 100 about identity of the logged in user. In an alternative embodiment of the present invention, the Presence Agent may be extended to include keyboard activity monitoring. An interface associated with presence agent includes Device Notifications. A dependency associated with presence agent includes Device Interface implemented by Smart Building Framework 100.

Smart Device 90 represents a single Real Device in the System. The Smart Device 90 component of the system is a Java wrapper implementing a generalized API used to communicate with real devices. This module provides a two-way translation between device proprietary protocols (if any) and Web Services used by the Smart Building Framework 100 and it may implement a JMS client. A driver for each real device in the system is a specialization of the Smart Device 90. As mentioned supra, an XML-coded BACnet data model can be used to describe device data structures. The reasons for this data model's use include (a) BACnet is a public standard under a committee control, (b) its device data structures represent decades of domain-specific engineering experience, and (c) the particular choice of the device data model is not really relevant to the goals of the present invention (Use of such data structures does not imply that the system is compatible with BACnet network protocol layers, although, since the device data structures are rigorously derived from the BACnet paradigm the system could be relatively easily adapted to access and control most of the existing BACnet BAS infrastructures.).

A number of Smart Devices 90 may be running in the deployed System. Smart Device 90 communicates with the Real Device using device-specific protocol. As a result, each type of the Real Device to be used by the System may require different implementation of the Smart Device 90.

Smart Device 90 communicates with the Smart Building Framework 100. It receives notifications from the Smart Building Framework 100 about the system events targeted for the device. It sends information to Smart Building Framework 100 about changes in its status. It also queries Smart Building Framework 100 about actions that the device needs to execute. A specific implementation of Smart Device 90 may encapsulate services required by the Smart Building Framework 100 but not implemented directly by the Real Device. For example, Smart Device 90 may have to implement a service that sends updates to Smart Building Framework 100 about the changes in the Real Device state. An Interface associated with Smart Device 90 includes Device Notifications. Dependencies associated with Smart Device 90 include Device Interface implemented by Smart Building Framework 100 and Proprietary Real Device Interface implemented by Real Device.

Real Device (not shown) is equivalent to the device as defined supra. An interface associated with real device includes Proprietary Interface. Several real devices can be implemented to interact with the system, including a Universal Device (as a template for future development of device drivers), a Presence Agent identifying personnel entering a controlled space, a simulated A/C heater-thermometer device simulating temperature changes according to a simple physical model driven by input from the Inference Engine 200, as well as a PEM (Personal Environment System) controller. PEM is an example of a commercial product designed to provide an individually controlled work environment, as more fully described infra.

An example of a Real Device that the system is configured to control includes the Personal Environments System (PEM) from Johnson Controls. The PEM allows a user/employee to customize his/her workspace environment by manually selecting: air temperature (mixing supplied and ambient air); air supply to the desktop (fan speed); radiant heat panel output; background noise masking; and task lighting level. In its basic configuration, the module is locally controlled and not networked. It can be connected to a data bus, but cost of the manual controller and proprietary software may be a factor.

Figure 2A:
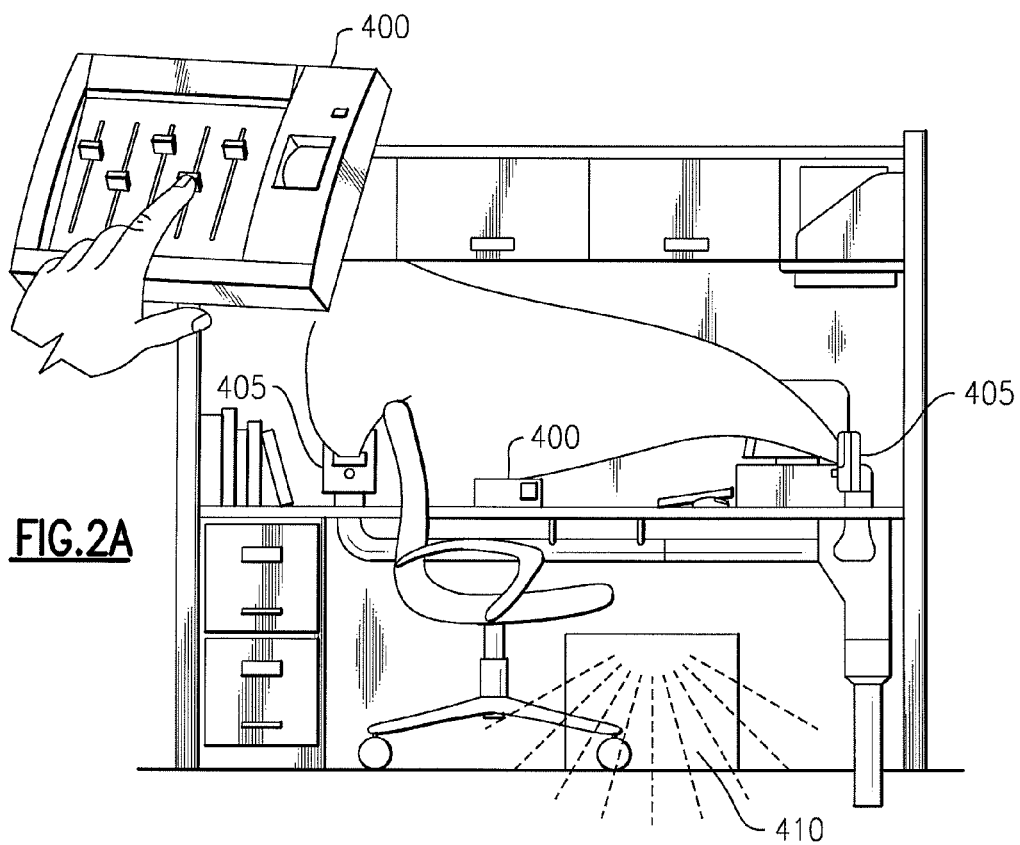
FIG. 2a-2b are diagrams of a workspace environment that is enhanced by the use of a PEM device.
Figure 2B:
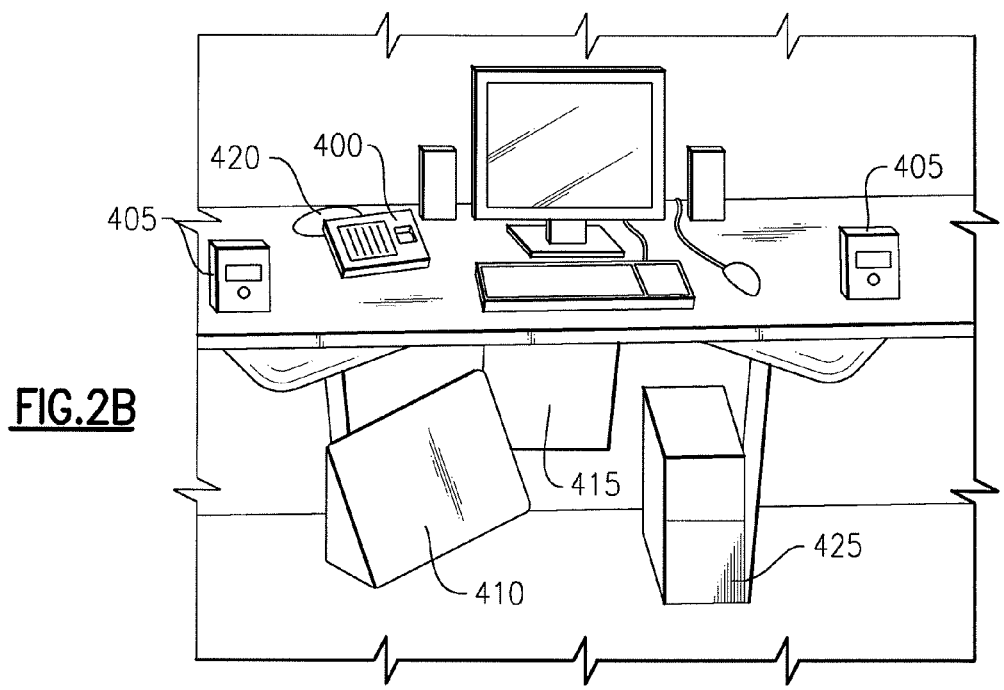

As shown in FIG. 2a-2b, a workspace environment is illustrated that is enhanced by the PEM through the use of the PEM manual controlled desktop control unit 400. The PEM includes a PEM vent 405, PEM heater 410, and main unit 415. An integrated occupancy sensor shuts the system down when users are away from their workstations. PEM allows an individual to create an optimal work environment and increase productivity. PEM Controls temperature, air flow, lighting and acoustic levels; Supplies conditioned air to the desktop; and Controls radiant heat panel, diffusers, fan and electronics unit, particle filter, and air temperature.

PEM devices can be connected to a network. The basic requirements for a networked PEM controller are: (1) provide a network interface to the controller, preferably via TCP/IP; (2) read the data from manual device; (3) override the data from manual device by remote control data; (4) retain the manual control function by inserting SW interface enabling direct connection between input and output via the framework.

In accordance with an embodiment of the present invention, an IP based device interface controller 420 is provided for a proprietary device such as the PEM. This PEM Interface 420, for example, is inserted between the "User Control Unit"/slider assembly 400 (panel with sliders—PEM manual controlled desktop control unit as shown in FIG. 2a) and "Fan and Electronics Unit" 415 (the main PEM unit). It can be accessed remotely using TCP/IP protocol and allows to read/write settings for: Temperature Selection; Task Lighting; Background Noise; Fan Speed; Radiant Heat; Occupied/Unoccupied Status; and Temperature and Humidity.

When active, the based device interface controller 420 overrides manual user preferences, and instead adjusts the environmental parameters to the user preferences stored by the system, subject to optimizations necessary to take into account preferences of users in other cubicles and energy usage constraints in the controlled space. The system's Inference Engine 200 implements the optimization procedures. Manual controls are replaced by a small application running on the user's workstation 425, which, however, can be deactivated by a system operator. The PEM interface controller 420 is activated by user login to the workstation, although it can also be started by a signal when the building security system reports that the user is entering the building security gate, for example.

The system of an embodiment of the present invention offers certain niceties, such as biometrics identifying the person and transferring his/her environmental preferences to the proper cubicle, together with the person's VoIP phone number. The PEM controller 420 implements a complete HTTP server on top of the IP stack, and is simply connected to the office LAN. The application running on the server communicates with controller's A/D and D/A converters, providing full control of PEM control elements, as well as providing additional temperature and humidity sensors plus several auxiliary industrial standard 0-10V inputs and outputs as shown in FIG. 2c.

Figure 2C:
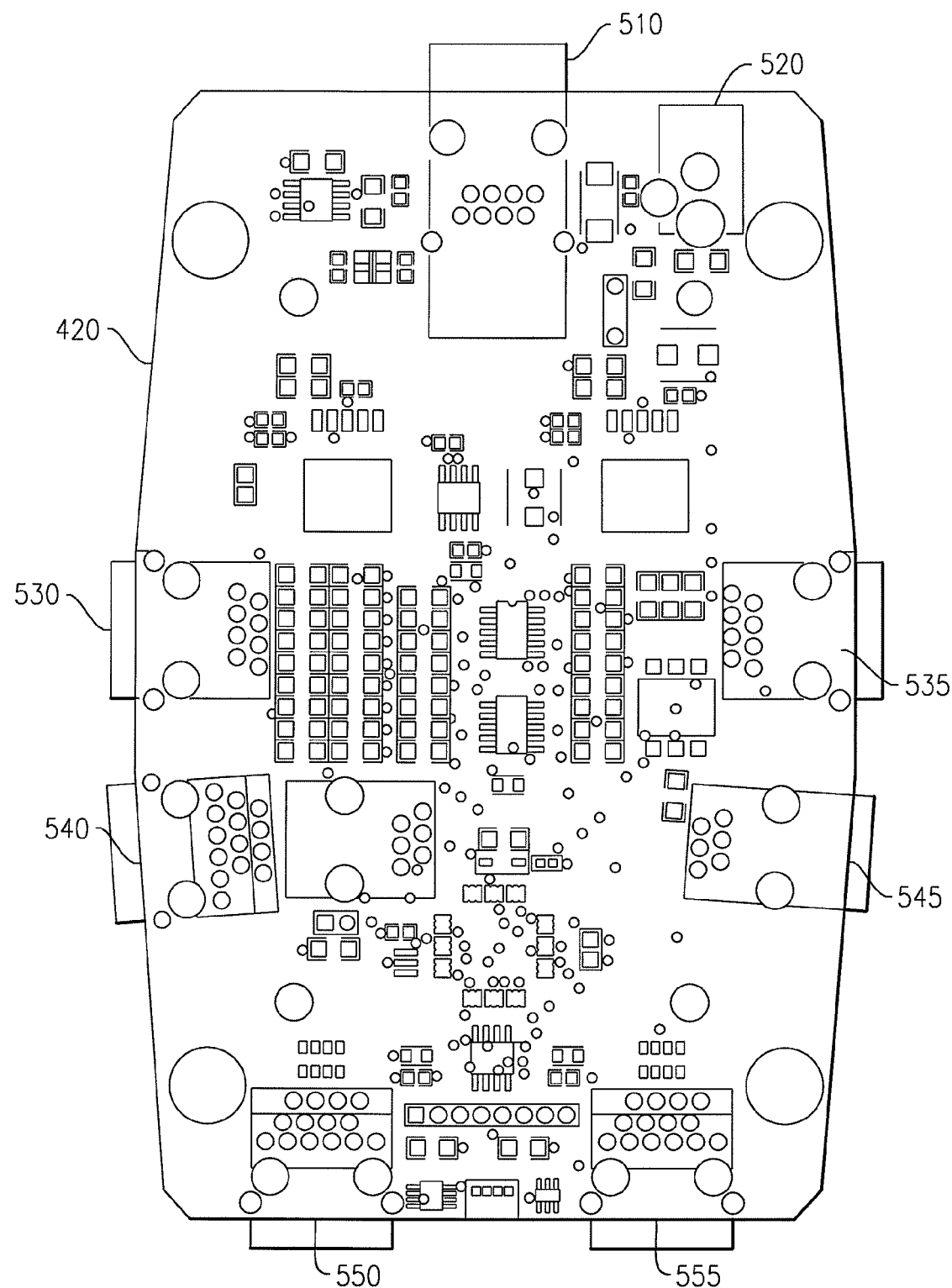
FIG. 2c is a diagram of a PEM interface controller, according to an embodiment of the present invention.

Turning to FIG. 2c, a PEM interface board is illustrated. The two connectors along the top edge are the Ethernet interface 510 (XPORT from Lantronix) and external power jacks 520. The two connectors in the middle of each side are the two PEM connectors 530/535. The PEM slider unit plugs into the connector 530 on the left. The main PEM unit plugs into the connector 535 on the right. The next set of connectors are 4 extra analog inputs 540 (0-10V) on the left, and 3 extra DAC outputs 545 on the right. The two connectors along the bottom edge are special purpose ports 550. Also along that bottom edge are footprints 555 for two different temperature devices and a SHT75 temperature/humidity sensor.

This integration of PEM Unit (Personal Environments System enhanced by PEM Interface) into the SmartBuilding Framework 100 of an embodiment of the present invention will now be described. The resulting software module is called PEM Device.

In order to control PEM Unit over the network, the Unit has to be switched into computer-controlled mode. This is achieved by sending command 99 and a byte containing value of 1.

In accordance with an embodiment of the present invention, the original PEM may be enhanced with a temperature and humidity sensor, e.g., SHT75 from Sensirion. Here is the list of PEM commands relevant to SHT75: 94 Start humidity measurement; 95 Read humidity (2 bytes—H,L—12 bits resolution); 96 Start temperature measurement; 97 Read temperature (2 bytes—H,L—14 bits resolution);

PEM Unit supports several environmental parameters that can be controlled by PEM Device software. The following commands allow the PEM device to read and write the values of these parameters (the values have 10-bit resolution; they are packed in 2 bytes (H,L) order): A0, D0 Temperature setting; A1, D1 Task lighting; A2, D2 White noise; A3, D3 Fan speed; and A4, D4 Radiant heating.

PEM has an occupancy sensor. Its value can be read/write by 2 commands: B0 read state of occupancy sensor; and E0 set occupancy state. Occupancy state must be set to 1 in order for PEM unit to be operational. Otherwise the unit switches to standby. Setting occupancy state does not affect the reading of actual occupancy. In order words, the occupancy can be set to 1 with command E0 but command B0 still returns 0 if no one is present in the area.

A more detailed design and implementation of the system components is provided below, in accordance with a preferred embodiment of the present invention. Technologies used to implement system components are also described. A description of each System component contains a discussion of its structure, internal and external communications, and technology used for the implementation.

Figure 3:
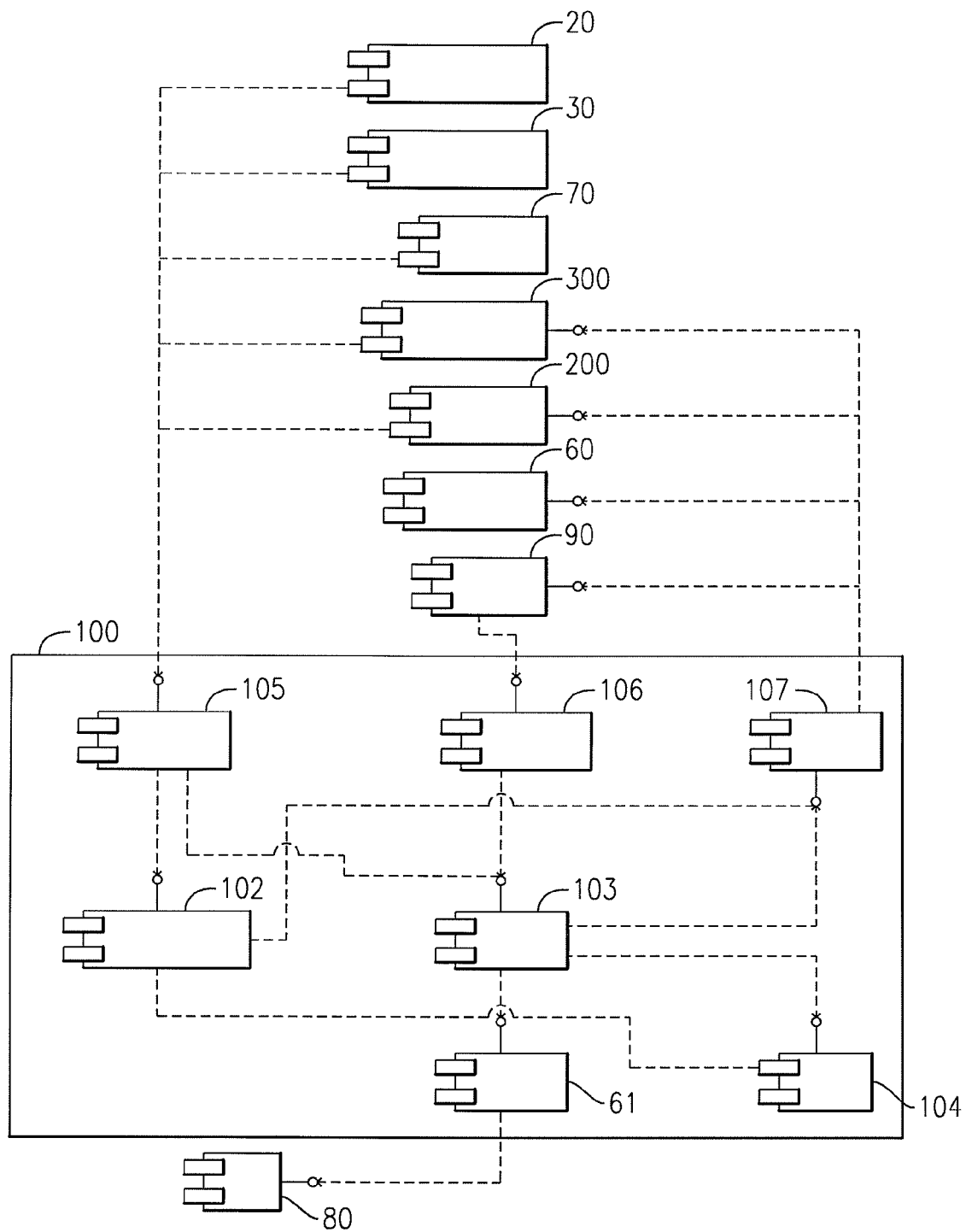
FIG. 3 is a schematic diagram illustrating the components of the Smart Building Framework according to an embodiment of the present invention.

Smart Building Framework 100 is implemented as a J2EE application. This implies that Smart Building Framework 100 is deployed on a J2EE compliant Application Server. Smart Building Framework 100 consists of several components: Data Access 101, System Configuration 102, System State 103, Archiving 104, Control Services 105, Device Services 106, and Notifications 107 (see FIG. 3). Smart Building Framework 100 provides two external interfaces: Control Interface and Device Interface.

Data Access 101 encapsulates details of the data persistence implementation. It implements Data Access local interface that provides a set of transactional data operations to other Smart Building Framework 100 components. Data Access 101 is implemented as a stateless session bean and it runs in the EJB container of the Application Server. Data Access 101 uses Hibernate object/relational data mapping package (version 2.1) to store and retrieve information from the DBMS. Hibernate internally uses SQL and JDBC to access the DBMS 80.

System Configuration 102 manages System configuration information. The configuration information includes the following types of information: System users and their properties; System devices and their properties; Environmental zones controlled by the System and their properties; Resources required by the System to run; and System component settings (for example, Smart Building Framework 100 settings, Inference Engine 200 settings). System Configuration 102 implements Configuration Operations interface that provides access to the information described above. Moreover, System Configuration has the ability to notify other System components about configuration changes through notifications mechanism implemented by the Notifications 107 component. System Configuration 102 uses services of Data Access O101 (through Data Access interface) to store and retrieve System configuration information. System Configuration 102 is implemented as stateless session bean and it runs in the EJB container of the Application Server.

System State 103 provides a view of the current state of the controlled space in a form of an object model. The information contained in such a model includes (but is not limited to): Users present in the environmental zones. For example, user A is present in environmental zone 1, and Devices active in the environmental zones; device PEM01 is active in environmental zone 1, and Current readings from active devices; the last reading from the device thermometer01 was 75 degrees, and Current status of active devices; and/or, heating module in device PEM01 is on.

System State 103 continuously updates the model with input provided by Device Services 106 (which gathers information from Smart Devices 90). Access to the model is available through State Operations interface implemented by System State 103. System State 103 allows changing the state of the controlled space through actions. Whenever the modification of the state of the controlled space is required, an Action object should be submitted to System State 103. System State 103 holds a list of pending actions for the controlled space and it is responsible for sending the notifications (through Notifications 107 component) to the Smart Devices 90 that are the objects of an action. System State 103 uses services of Data Access 101 (through Data Access interface) to store and retrieve the information about the current state of the controlled space. System State 103 is responsible for archiving the state of the controlled space. System State 103 uses Archiving 104 component for that purpose (through Archiving Operations interface). System State 103 can be queried about the current and past state of the controlled space. Whenever required, System State 103 uses services of Archiving 104 component to handle such queries. System State 103 is implemented as stateless session bean and it runs in the EJB container of the Application Server.

Archiving 104 component is a helper component for System State 103. Archiving 104 component manages archived information about the state of the controlled space. It implements Archiving Operations interface that allows updating the archived information as well as running queries about the past conditions in the controlled space. Archiving 104 component uses services of Data Access 101 (through Data Access interface) to store and retrieve the information. Archiving 104 component is implemented as plain Java object and it runs in the EJB container of the Application Server.

Control Services 105 component implements Web Services layer (Control Interface) of the Smart Building Framework 100 that allows other components of the System to access Configuration Operations interface (implemented by System Configuration 102) and State Operations interface (implemented by System State 103). Control Services 105 component is implemented as a plain Java object. Axis SOAP engine (version 1.2) is used to expose it as a Web service end-point. Control Services 105 component runs in the Web container of the Application Server.

Device Services 106 component implements Web Services layer (Device Interface) of the Smart Building Framework 100 that allows Smart Devices 90 to access State Operations interface (implemented by System State 103). Device Services 106 component is implemented as a plain Java object. Axis SOAP engine (version 1.2) is used to expose it as a Web service end-point. Device Services 106 component runs in the Web container of the Application Server.

Notifications 107 component encapsulates logic and manages resources needed to send notifications about system events to Smart Devices 90, Inference Engine 200, and Notification Agents 60. Notifications 107 can be also sent to External Applications 300. Notifications 107 component implements Notification Operations interface that allows System State 103 and System Configuration 102 components to trigger notification dispatch to the selected recipients. Notifications 107 component is implemented as stateless session bean and it runs in the EJB container of the Application Server. It uses Java Message Service (JMS) implemented by JBoss (version 4.0) to send the notifications.

Figure 4:
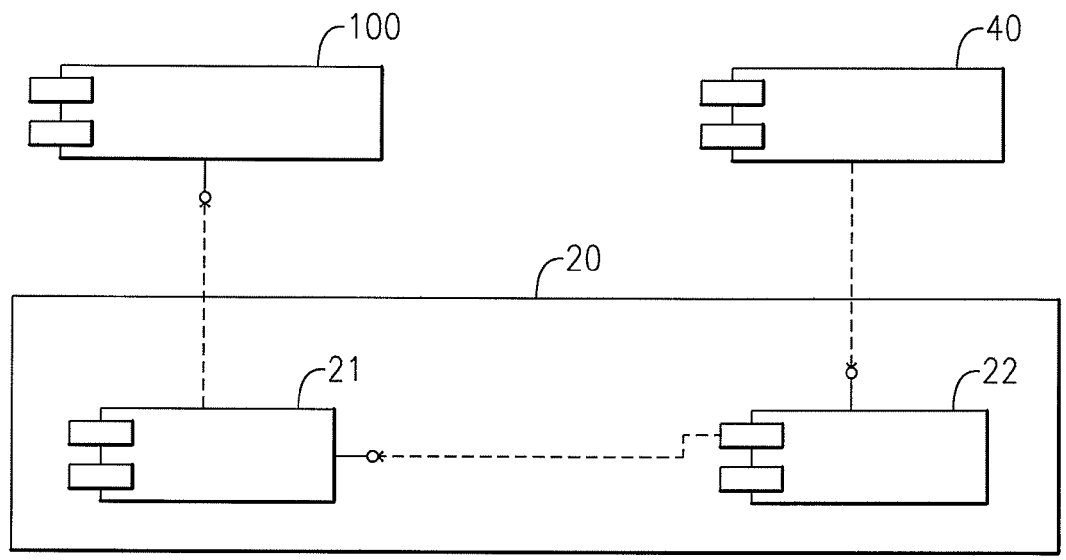
FIG. 4 is a schematic diagram illustrating the components of the Administration Web Application according to an embodiment of the present invention.

Administration Web Application 20 is implemented as a J2EE Web Application. This implies that Administration Web Application 20 runs in the J2EE compliant Web container. Administration Web Application 20 consists of two components: Services Delegate 21 and Presentation Logic 22 (see FIG. 4). Administration Web Application 20 provides one external interface: Administration Web Interface.

Services Delegate 21 implements local Control Interface that replicates functionality of the remote Control Interface provided by Smart Building Framework 100. Whenever a method is called on the local Control Interface, Services Delegate 21 contacts Smart Building Framework 100 and calls corresponding method on the remote interface (unless the requested information is available from the local cache). Services Delegate 21 implements caching of the data returned by the Smart Building Framework 100. It also has ability to re-try the failed calls to the remote interface. Services Delegate is implemented in Java (plain object) and uses Java API for XML-based RPC (JAX-RPC) to communicate with Smart Building Framework.

Presentation Logic 22 implements Administration Web Interface, through which it accepts HTTP requests from the Web Browser and from the Administration Web UI 40 component. In response to the requests from the Web Browser, the Presentation Logic 22 generates HTML/SVG/JavaScript document that enables Web Browser to render Administration Web UI 40. In response to the requests from the Administration Web UI 40, the Presentation Logic 22 generates XML documents with the requested information and returns them to the Administration Web UI 40. In the process of creating the XML documents, Presentation Logic 22 uses services of Services Delegate (through local Control Interface). Presentation Logic 22 is implemented using Struts framework (version 1.2).

Figure 5:
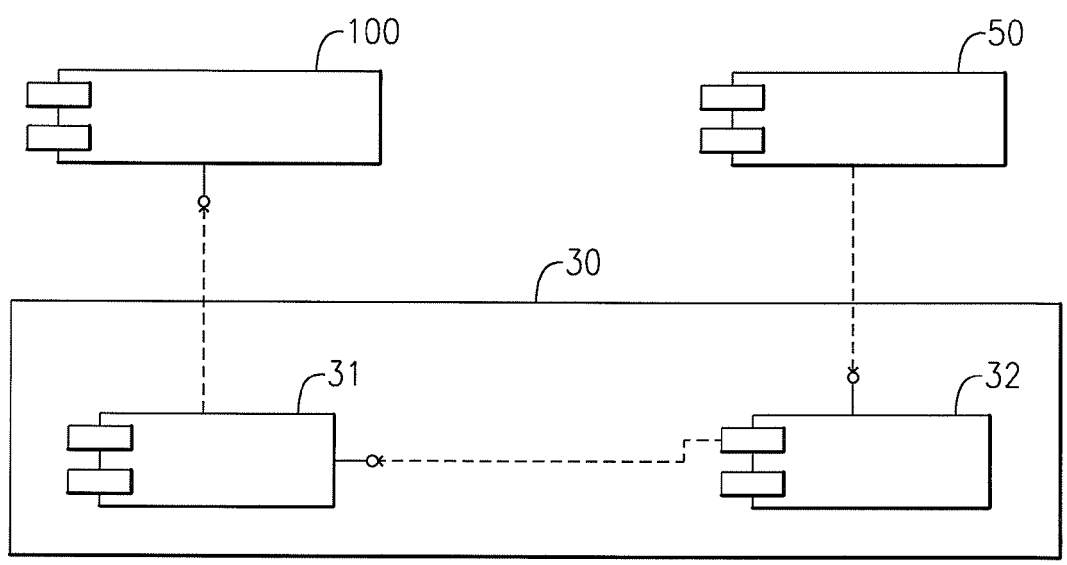
FIG. 5 is a schematic diagram illustrating the components of the Personalization Web Application according to an embodiment of the present invention.

Personalization Web Application 30 uses the same design approach as the Administration Web Application 20 (see FIG. 5). Personalization Web Application 30 differs in the implementation of the Presentation Logic 32 (to provide personalization functionality). Presentation Logic 32 implements Personalization Web Interface (instead of Administration Web Interface), which is used by Presentation Web UI 50. Technology used to implement Personalization Web Application 30 is the same as in the case of Administration Web Application 20. Personalization Web Application 30 provides one external interface: Personalization Web Interface.

The System is able to use any third-party JDBC-compliant DBMS 80 as a data storage solution, e.g., Hypersonic database may be used. Database structures (tables, indexes, sequences) that are required to implement System data-processing operations are created automatically by the Hibernate package. The structures are created from the specifications contained in the Hibernate mapping files (XML format). DBMS 80 provides external interface (JDBC) used by the Smart Building Framework 100 to access the data. As already mentioned in the description of the Smart Building Framework 100, the System does not access the database directly, but it uses Hibernate package for that purpose. Moreover, the System takes advantage of the database connection pooling capability of JBoss Application Server.

Figure 6:
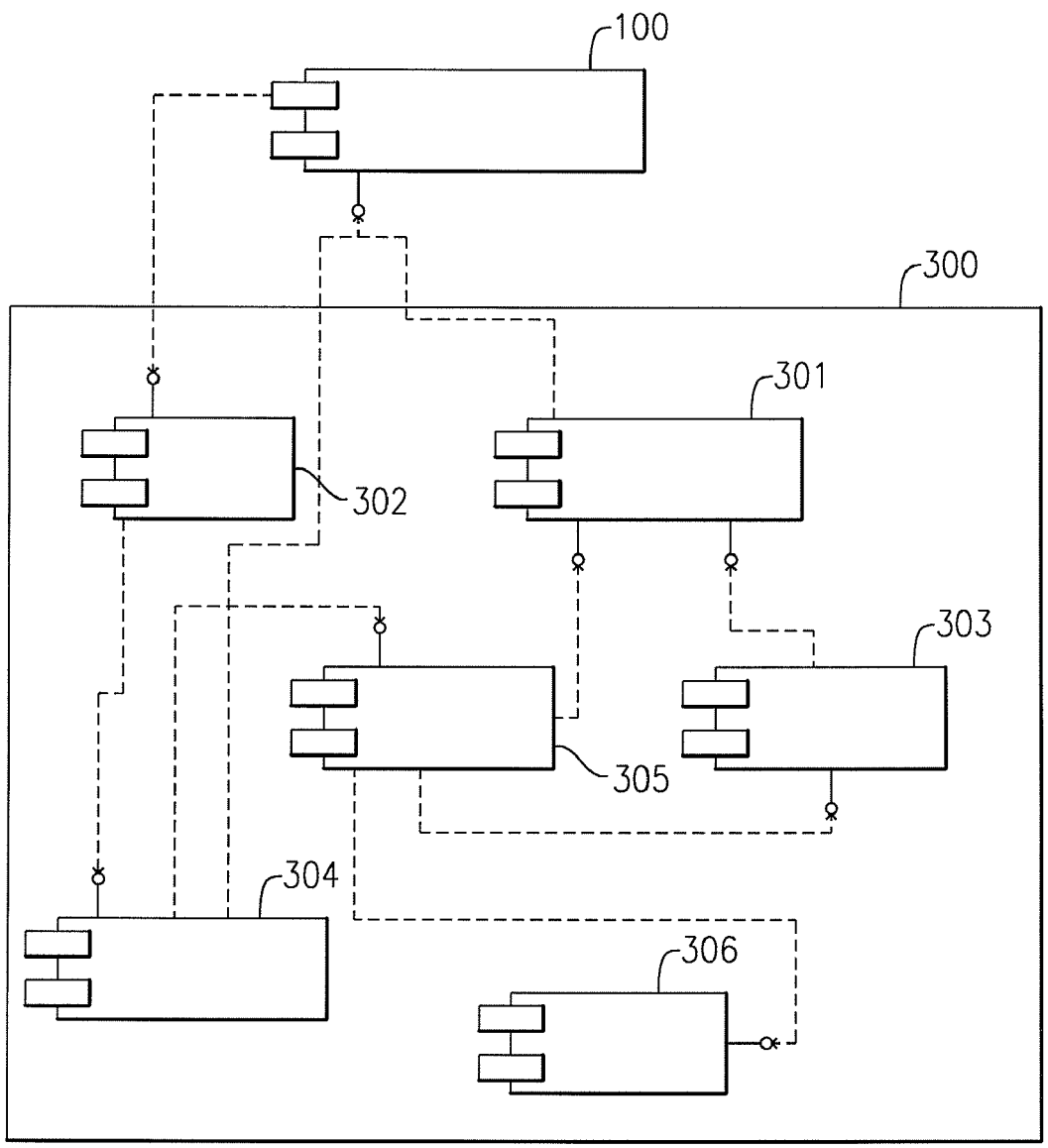
FIG. 6 is a schematic diagram illustrating the components of the Inference Engine according to an embodiment of the present invention.

Inference Engine 200 component is implemented as a stand alone JAVA application (e.g., mixed Java and native code module). It consists of several sub-components: Web Services Client 301, JMS Client 302, Data Processing 303, Manager/Scheduler 304, Decision Engine 305 and Decision Beans 306 (see FIG. 6). It is important to note that even though certain components do not communicate directly, they are nevertheless interdependent. For example, a decision algorithm described by a Decision Bean 306 might depend on data processing functionality implemented by Data Processing 303.

Web Services Client 301 implements the details of Web Services communication. It is expected that it will only be used to communicate with Smart Building Framework 100 Web Services interfaces, and as a result its internal interface will closely resemble the interfaces exposed by the Smart Building Framework 100. Web Services Client 301 is implemented in Java.

JMS Client 302 provides an interface to Smart Building Framework 100 notification mechanism. It handles other components' subscription requests and receives and forwards notifications as necessary. JMS Client 302 is implemented in Java.

Manager/Scheduler 304 controls the functionality of the entire Inference Engine 200 component. It receives notifications from JMS Client 302, uses Web Services Client 302 to retrieve configuration data from Smart Building Framework 100 and initiates execution of Decision Beans 306 by Decision Engine 305. As a result of receiving a notification, Manager/Scheduler 304 might: Retrieve configuration data from Smart Building Framework 100; or Initiate an execution of Decision Bean 106. Manager/Scheduler 304 is implemented in Java.

Data Processing 303 component is used by Decision Engine 305 for data retrieval. It, in turn, uses Web Services client 301 to extract data from Smart Building Framework 100. Data Processing 303 module is necessary to prepare data for Decision Engine 305, as the information retrieved from the framework 100 will likely require further processing. For example, the framework 100 will provide a history of certain property, while the engine might require an average value of the property. Data Processing 303 is implemented in Java.

Decision Engine 305 component makes decisions by executing Decision Beans 306. A Decision Bean 306 execution is initiated by Manager/Scheduler 304. During the execution of a bean, Decision Engine 305 might request data from Data Processing 303 module (as required by the decision algorithm). A result of a decision might be: A request to Manager/Scheduler 304 to schedule an execution of a Decision Bean 306 (the same or a different one) at certain time; A request to Manager/Scheduler 304 to schedule an execution of a Decision Bean 306 when certain notification arrives; or A request to Web Services Client 301 to request Smart Building Framework 100 action. Decision Engine 305 component is implemented using Java and an embedded rule engine, for example CLIPS.

A Decision Bean 306 represents an algorithm for making a decision. It contains a script for the embedded rule engine and information about notifications that are required by the script. A Decision Bean 306 is examined by Manager/Scheduler 304 (for information about notifications) and executed by Decision Engine 305. Although a Bean 306 does not contain an explicit description of required data processing functionality, its execution might result in Decision Engine 305 requesting information from Data Processing 303 module. Decision Beans 306 are implemented in Java.

An execution example is provided below to demonstrate interaction between the internal components of the Inference Engine 200, as described supra: A user present in a controlled environmental zone requests a temperature of 70 F. The current temperature in the zone is 65 F. (1) Manager/Scheduler 304 will receive a notification of change; (2) Manager/Scheduler 304 will initiate execution of a Decision Bean 306 that might approve or reject the temperature change request; (3) Decision Engine 305 executing the selected Decision Bean 306 will request user and environmental zone data from Data Processing 303 module; (4) Data Processing 303 module will request the data from Web Service Client 301. This scenario assumes that Decision Engine 305 approved the change; (5) Decision Engine 305 will request (from Manager/Scheduler 304) an execution of Decision Bean 306 that can control temperature adjustment. (6) Manager/Scheduler 304 will initiate execution of a Decision Bean 306 that will control temperature adjustment; (7) Decision Engine 305 executing the Bean 306 will request zone temperature data; (8) Based on the current temperature and the desired temperature, the Decision Engine 305 will request action from Web Service Client 301. This scenario assumes that Decision Engine 305 will request switching on a heater placed in given environmental zone; and (9) Decision Engine 305 will request Manager/Scheduler 304 to schedule an execution of the same Decision Bean 306 in the future (e.g. 60 seconds) to verify results of the action.

Figure 7:
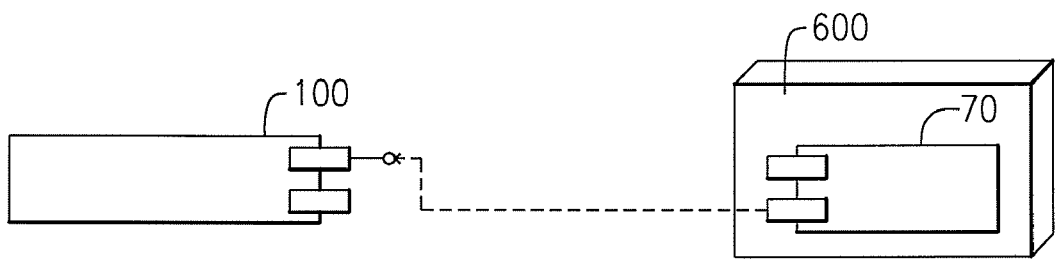
FIG. 7 is a schematic diagram illustrating the primary role of Profile Manager according to an embodiment of the present invention.

The Primary role of Profile Manager 70 (see FIG. 7) is to make sure that user's credentials exist and are valid. Profile Manager 70 accesses credentials stored in User Profile using file system functions and presents them to Smart Building Framework 100 using a Web Services interface. If credentials are non-existent or invalid Profile Manager 70 displays a GUI for a user to enter correct credentials and repeats the authentication procedure. Valid user credentials are then stored by Profile Manager 70 in User Profile for the use by the other client-side components. Profile Manager 70 is implemented as a Java application and uses Java API for XML-based RPC (JAX-RPC) to communicate with Smart Building Framework 100. Profile Manager 70 can be started upon user logon at the user station 650.

Figure 8:
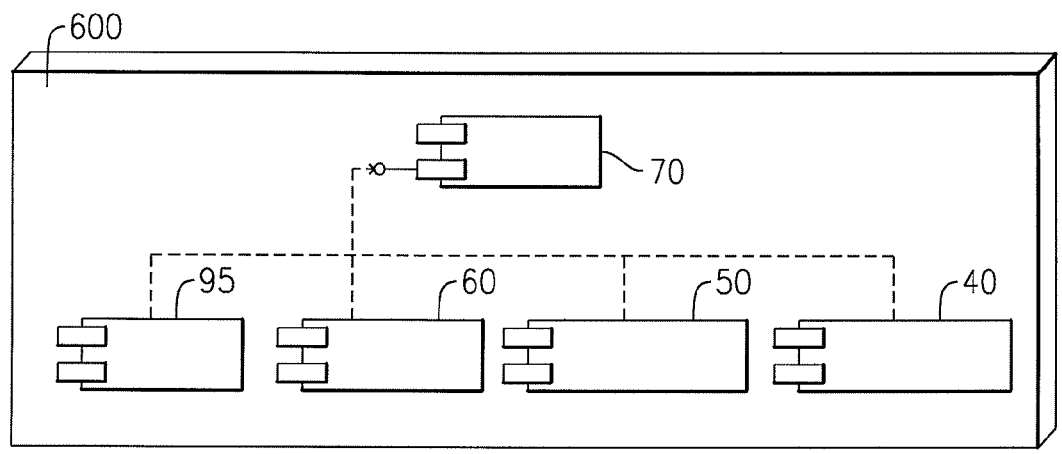
FIG. 8 is a schematic diagram illustrating that some client-side components rely on Profile Manager and User Profile for successful authentication to Smart Building Framework according to an embodiment of the present invention.

All other client-side components rely on Profile Manager 70 and User Profile described infra for successful authentication to Smart Building Framework 100 (See FIG. 8). Profile Manager 70 relieves them from having GUI to query for user credentials and from managing credentials secure storage on the local machine. Other components may start simultaneously with Profile Manger 70—when User Profile does not exist yet. In such cases, those components will quietly wait for User Profile to be created and to contain valid credentials before starting their operations. User Profile is not a software component. As explain herein, User Profile is rather a file with the user-related information. User Profile is created and controlled by Profile Manager 70. Other components of the system access User Profile information either through Profile Manager 70 or directly from the file system in read-only mode.

Although, at this point, the data to be stored in User Profile is related to user credentials, User Profile is designed to be a generic information repository that stores any data not suitable for the server-side storage. User Profile is a file-based repository and its format is based on XML. Only Profile Manager 70 has the right to modify User Profile, other components can only read it. Profile Manager 70 provides User Profile Access interface. Alternatively, access to User Profile may be implemented via file system functions.

Figure 9:
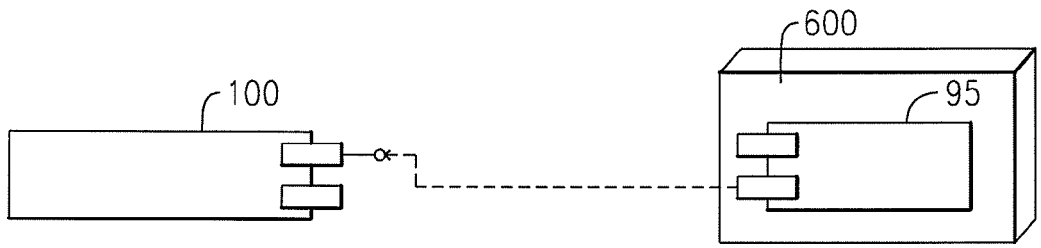
FIG. 9 is a schematic diagram illustrating the primary role of Presence Agent according to an embodiment of the present invention.

Presence Agent 95 announces an identified user presence to Smart Building Framework 100 to provide a customized environmental zone for the user (see FIG. 9). Presence Agent 95 is considered a Sensor Device (type of Smart Device) by Smart Building Framework 100 and uses the same communication means (Device Interface via Web Services) as other Smart Devices. Presence Agent 95 is implemented as a Java application and uses Java API for XML-based RPC (JAX-RPC) to communicate with Smart Building Framework 100. If a tight integration with Microsoft Windows is required (for example, to monitor user keystrokes) Presence Agent 95 may be re-implemented based on Microsoft .NET platform. Additionally, Presence Agent 95 may use JMS if asynchronous communication with Smart Building Framework 100 is required. At this point, such requirement has not been identified. Presence Agent 95 does not provide any external interface.

Figure 10:
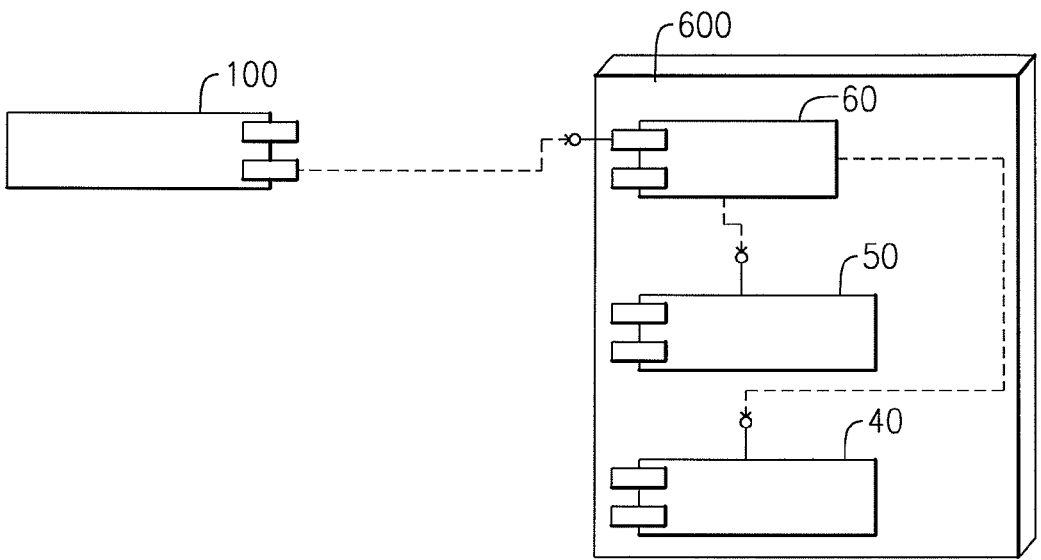
FIG. 10 is a schematic diagram illustrating the primary role of Notification Agent according to an embodiment of the present invention.

Notification Agent 60 subscribes on behalf of the user to alerts/notifications issued by Smart Building Framework (see FIG. 10). It exposes its Event Notification (JMS) interface to the Framework 100. Received notifications are then passed to the subscribed client-side modules (e.g., UI Notification Module from Administration Web UI 40 component or from Personalization Web UI 50 component) through a local communication channel. The rationale behind Notification Agent 60 is to provide asynchronous communication means between Smart Building Framework 100 and the client-side components that is not currently well supported by traditional Web Services (SOAP/HTTP). Newer Web Services solutions based on SOAP/TCP, SOAP/XMPP, or WS-Notification are not mature enough to be used at this time. Notification Agent 60 is implemented as a Java application and uses Java Messaging Service (JMS). Notification Agent 60 provides Event Notifications interface for communication with Smart Building Framework 100.

The Administration Web User Interface 40 (UI) is the client-side "front-end" component that allows the system administrator to observe and interact with the System. It is implemented as a lightweight HTML and JavaScript web application that runs entirely within the Web browser. The Administration Web UI 40 utilizes Adobe's SVG Viewer ActiveX component to present the administrator with an interactive graphical representation of the System. Data flow within the Administration Web UI 40 component is handled by the UI Communication Module 41 and the UI Notification Module 42. These client-side helper modules provide the Administration Web UI 40 with communication channels to and from the other components closer to the core of System.

Figure 11:
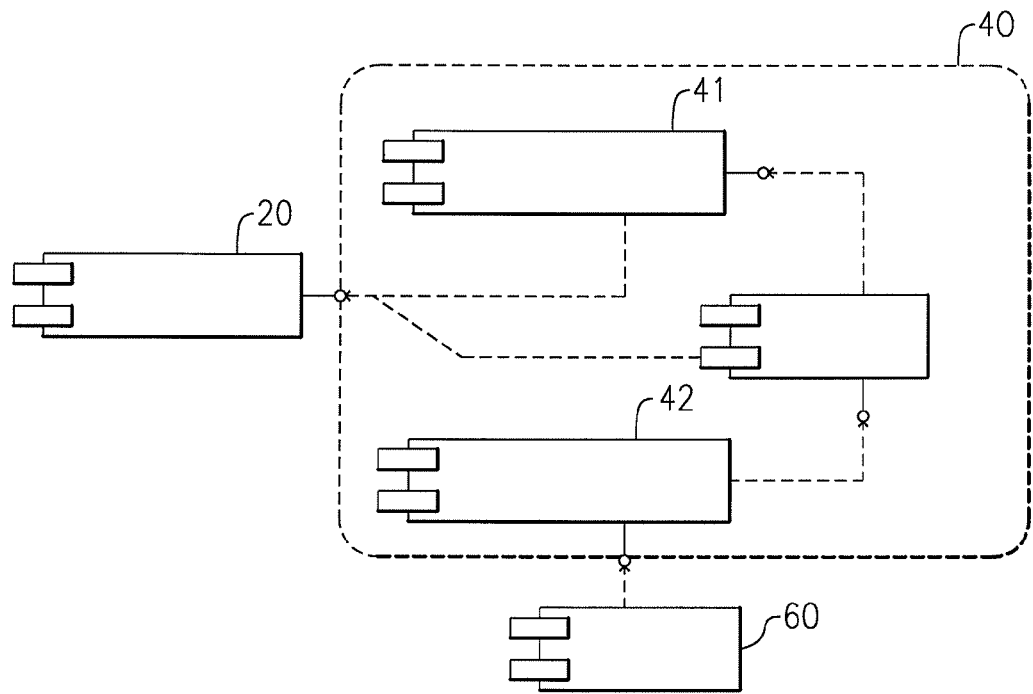
FIG. 11 is a schematic diagram illustrating the components of the Administration Web UI according to an embodiment of the present invention.

During regular use of the Administration Web UI 40, the administrator's interaction with the visualization area and other user interface components generates requests that must be sent to the server for a response. As seen in FIG. 11, the Administration Web UI 40 forwards such requests towards the server by calling a function on the JavaScript interface exposed by the UI Communication Module 41. The UI Communication Module 41 is then responsible for packaging the request in a standard format and sending it as an HTTP request to the server-side's Administration Web App 20 via the external interface it provides. In response to its requests, the UI Communication Module 41 receives XML documents containing the information requested from the Administration Web App 20. The UI Communication Module 41 then disseminates the information in the response to update the Administration Web UI 40 as needed. For instance, part of the System visualization may be updated to show the effect of some administrator interaction or a popup window may open to display the results of an administrator inquiry of a user's environmental preferences history. The request-response data flow handled via the UI Communication Module 41 enables the Administration Web UI 40 to reflect the results of administrator-initiated actions. However, an equally important feature of the Administration Web UI 40 is to notify the administrator of events or alerts that originate within the System itself. The UI Notification Module 42, an ActiveX component, handles the flow of this data. The UI Notification Module 42 receives asynchronous notifications from the Notification Agent 60 over a local TCP connection. These notifications are next passed to the Administration Web UI 40 via the triggering of JavaScript callback functions that the Administration Web UI 40 previously registered. These functions act as event handlers upon invocation, notifying the administrator in the appropriate manner.

Figure 12:
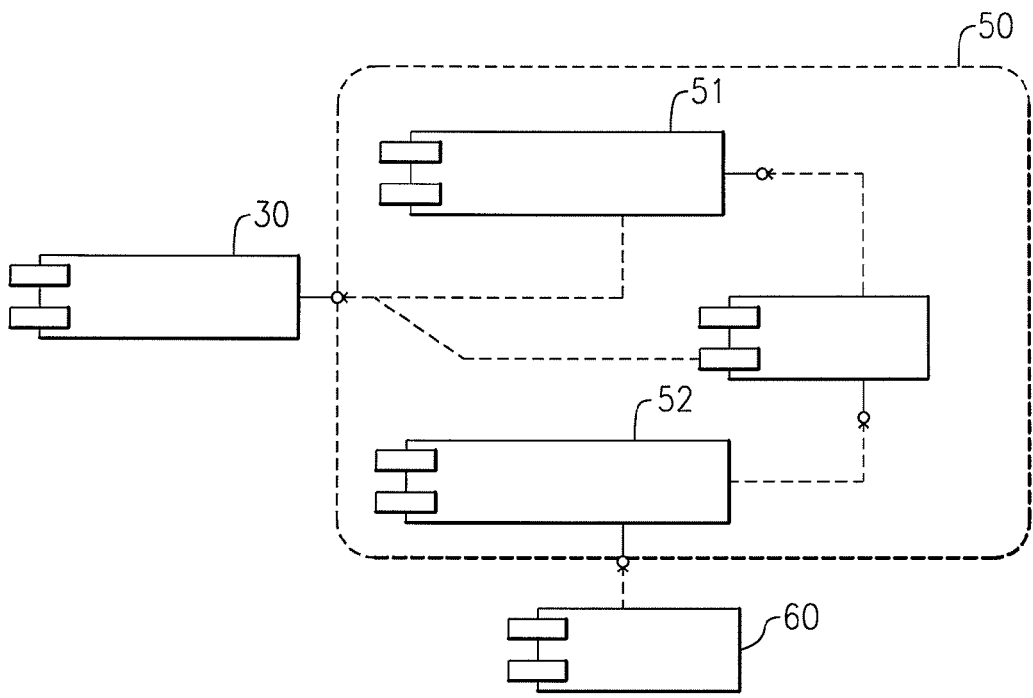
FIG. 12 is a schematic diagram illustrating the components of the Personalization Web UI according to an embodiment of the present invention.

As seen in FIG. 12, the Personalization Web UI 50 is the client-side "front-end" component for users. It enables users to view their current environmental conditions and view or set their environmental preferences. In addition, the Personalization Web UI 50 displays notifications from the System to users. The Personalization Web UI 50 is implemented in the same manner as the Administration Web UI 40 is, but without any SVG-based visualization component. Data flow within the Personalization Web UI 50 is handled by the UI Communication Module 51 and the UI Notification Module 52 in the same way as in the Administration Web UI 40. User interaction with the Personalization Web UI 50 is limited to standard web interface components such as sliders and form input boxes.

Figure 13:
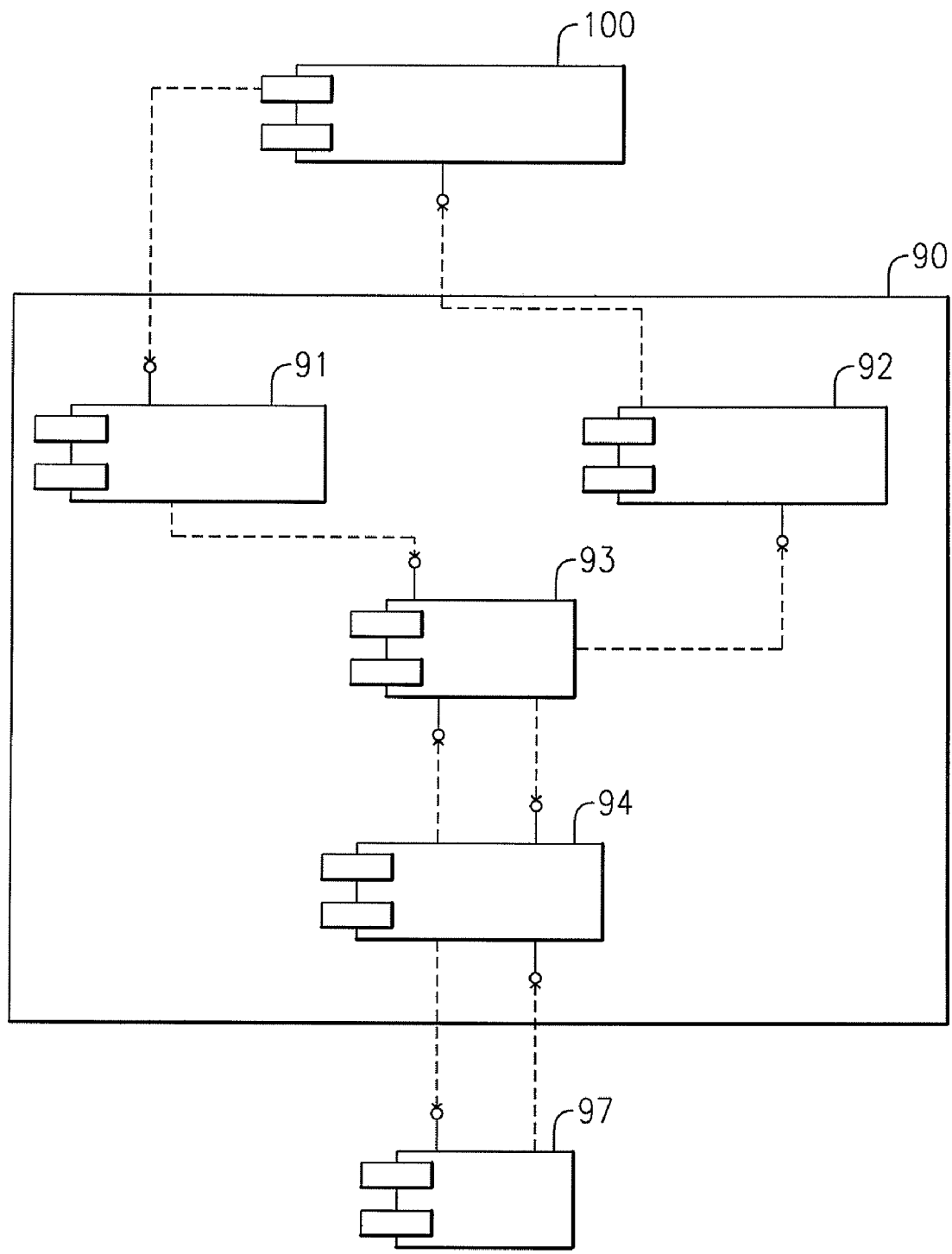
FIG. 13 is a schematic diagram illustrating the components of the Smart Device according to an embodiment of the present invention.

Smart Device 90 is a software module running on a PC platform providing a software interface between the Smart Building Framework 100 and the Real Device 97 (e.g., thermometer) (see FIG. 13). The module can run on a user workstation located in the environmental zone or on an arbitrary machine having access to the subnet hosting device controllers. In general, Smart Device 90 object is a data router with filtering capability and with additional capability to generate notifications and originating data transfers in responses to changes obtained from the device.

Smart Device 90 is implemented as a Java application. It interfaces both to the Smart Building Framework 100 and to Real Device. Since Smart Device 90 is a port of the framework client, it should be lightweight and is not expected to require any infrastructure such as local web or application server. For this reason the object communicates with the framework using two protocols: JMS for incoming messages and Web services (SOAP) for outgoing messages.

Communication with the Real Device 97 is device specific. For example, since PEM controller implements full TCP/IP stack and programmable EPROM, the connection between the device object and PM controller is via a simple TCP socket.

Since the Smart Device's 90 main function is to represent the Real Device 97 it is important to select a flexible internal data model. Smart Device 90 provides two external interfaces: Device Notifications and Real Device Event Listener.

Notifications Client 91 provides an interface to Smart Building Framework 100 notification mechanism. It handles other components' subscription requests and receives and forwards notifications as necessary. Notifications Client 91 is implemented in Java using JMS technology (component described in the implementation of Inference Engine 200 as JMS Client 302 can be re-used).

Web Services Client 92 implements the details of Web Services communication. It is expected that it will only be used to communicate with Smart Building Framework 100 Web Services interfaces, and as a result its internal interface will closely resemble the interfaces exposed by the Smart Building Framework 100. Web Services Client 92 is implemented in Java using Java API for XML-based RPC technology (component described in the implementation of Inference Engine 200 as Web Services Client 301 can be re-used).

Real Device Driver 94 implements the details of communication with the Real Device 97. It is able to send commands/queries to the Real Device 97 and receive notifications from the Real Device 97. Device-specific protocol is used for communication with the Real Device 97. Real Device Driver 94 can obtain information about Real Device 97 properties and supported services from the Real Device 97 (if the Real Device 97 supports such a functionality). The retrieved information is mapped to the device data format used by the System. Real Device Driver 94 is implemented in Java.

Device Logic 93 implements the main processing logic of the Smart Device 90. It accepts notifications from the Notifications Client 91. It communicates with the Smart Building Framework 100 through Web Services Client 92. It communicates with the Real Device 97 through Real Device Driver 94. Device Logic 93 is able to retrieve information about the Real Device 97 properties and supported services from the Real Device Driver 94 or from the configuration file. This information is used during execution of commands received from the Smart Building Framework 100. Device Logic 93 implements a set of logical services that are used by the Smart Building Framework 100 to interact with the Smart Device 90. The selection of the services is dependent on the capabilities of the Real Device 97 itself (specified as a list of properties and supported services). Real Device Driver 94 is implemented in Java.

The general communication pattern of the Smart Device 90 object of a preferred embodiment of the present invention is as follows: (1) Object accepts JMS messages: instructing the object to modify values of writeable data structure elements not directly affecting real device settings (example: Change of Value (COV) element instructing the object to notify framework if the attached sensor reading changed more than COV), Instructing the object to provide a value associated with a sensor, and Instructing the object to modify the value of a control element; (2) Object uses web services interface to: Provide values of sensor data if the data change exceeded COV, Respond to the request for data values, and Query the framework for the new value of the control element; (3) and Object communicates with the device controller by: Sending proprietary protocol messages to device to set new value of the parameters, and Polling the device in predefined interval to obtain information about change of sensor values (This may or may not be necessary depending on the controller protocol).

A short description of the technologies used for the implementation of the system components of a preferred embodiment of the present invention, is provided infra: Axis: An open source SOAP engine developed by Apache Software Foundation; Struts: An open source framework for creating presentation logic for Web applications. Distributed by Apache Software Foundation; Hibernate: Object/relational persistence and query service for Java. Open source; JBoss Application Server: Java 2 Enterprise Edition (J2EE) application server. Open Source; Hypersonic: SQL relational database engine written in Java. Open Source; CLIPS: Expert system tool. Provides an environment for the construction of rule and object based expert systems; AJAX: Asynchronous JavaScript and XML refers to a technique for developing web applications using JavaScript, XML, and similar technologies; SVG: Scalable Vector Graphics is a language for describing 2-D graphics in XML; and JMS: Java Message Service. Java API for creating, sending, receiving, and reading messages.

A description of the external interfaces (interfaces exposed by the system to the external actors) of a preferred embodiment of the system is provided. The system offers three different views to the external actors: user perspective, administration perspective, and external application perspective.

Figure 21:
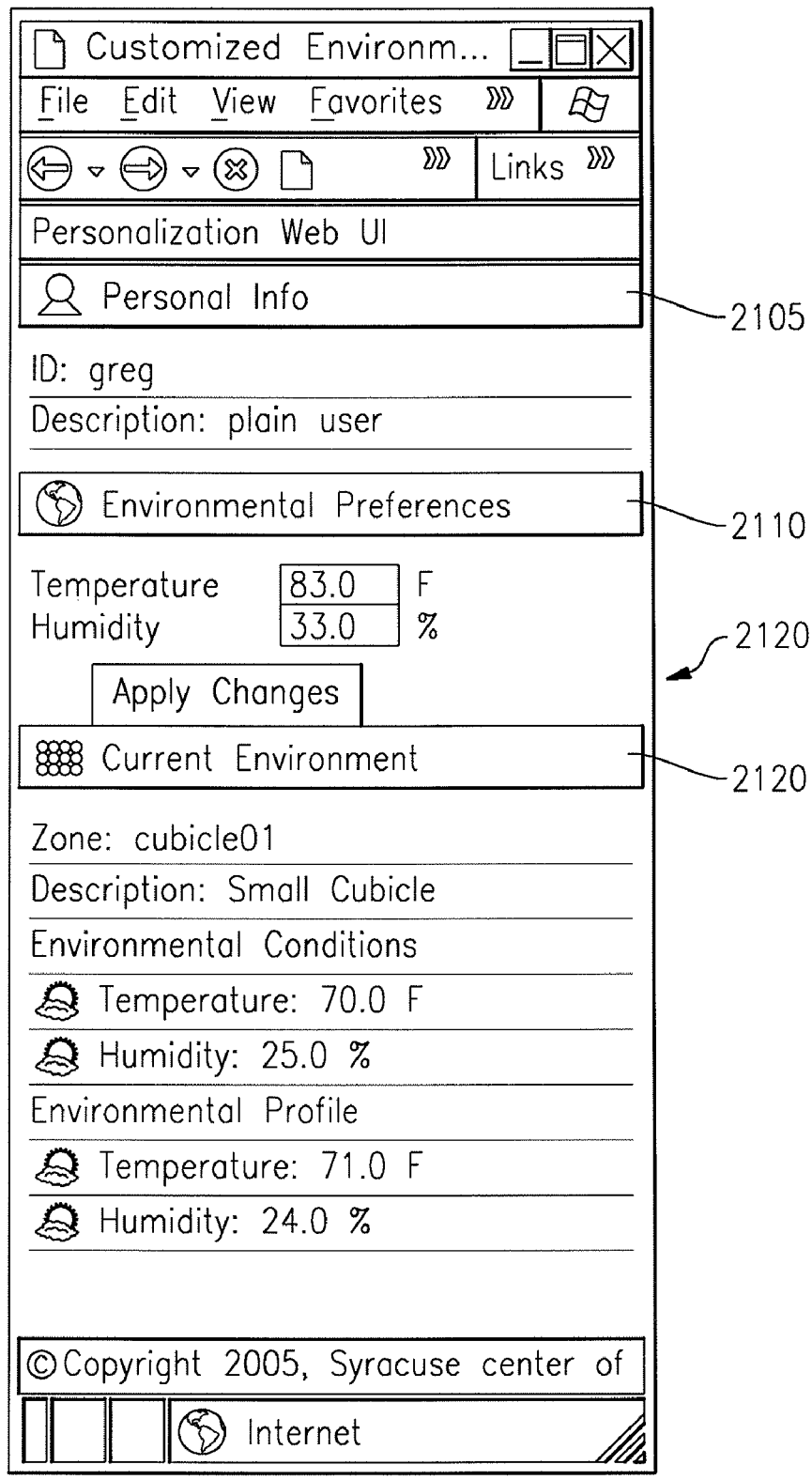
FIG. 21 is a representation illustrating a User Interface according to an embodiment of the present invention.

User Perspective is the view of the System exposed to a regular user. The System provides a graphical User Interface 2100 (see FIG. 21) that allows a user to access the System functionality. This User Interface 2100 shows personal information 2105, Environmental Preferences 2110, and Current Environment information 2120 including environmental zone, description, environmental conditions, and environmental profile. User Interface functionality is implemented by the Personalization Web UI 50 component of the System.

The following functionality is available to the user through the User Interface offered by the System: User shall be able to set her environmental preferences; User shall be able to read current environmental profile of her environmental zone; User shall be able to read her current environmental preferences 2110; User shall be able to read current environmental conditions 2120; and Notifications about system events shall be displayed.

User Interface (GUI) implements the following features: User shall be able to modify her environmental preferences through a slider widget (See FIG. 2, 400); Information about current environmental profile of her environmental zone shall be displayed in a table; Information about user's current environmental preferences shall be displayed in a table; Information about current environmental conditions shall be displayed in a table; Notifications about system events shall be displayed in a separate window; and Notifications about system events shall be complemented by auditory notification mechanisms.

Administration Perspective is a view of the System exposed to the System administrator. The System provides graphical Administration Interface that allows an administrator to configure, manage, and monitor the System. Administration Interface functionality is implemented by the Administrator Web UI 40 component of the System.

The following functionality is available to the administrator through the Administrator's Interface implemented by the System: Administrator's Interface shall control all aspects of the System operation; and Administrator's Interface shall provide access to all the information maintained by the System.

Figure 14:
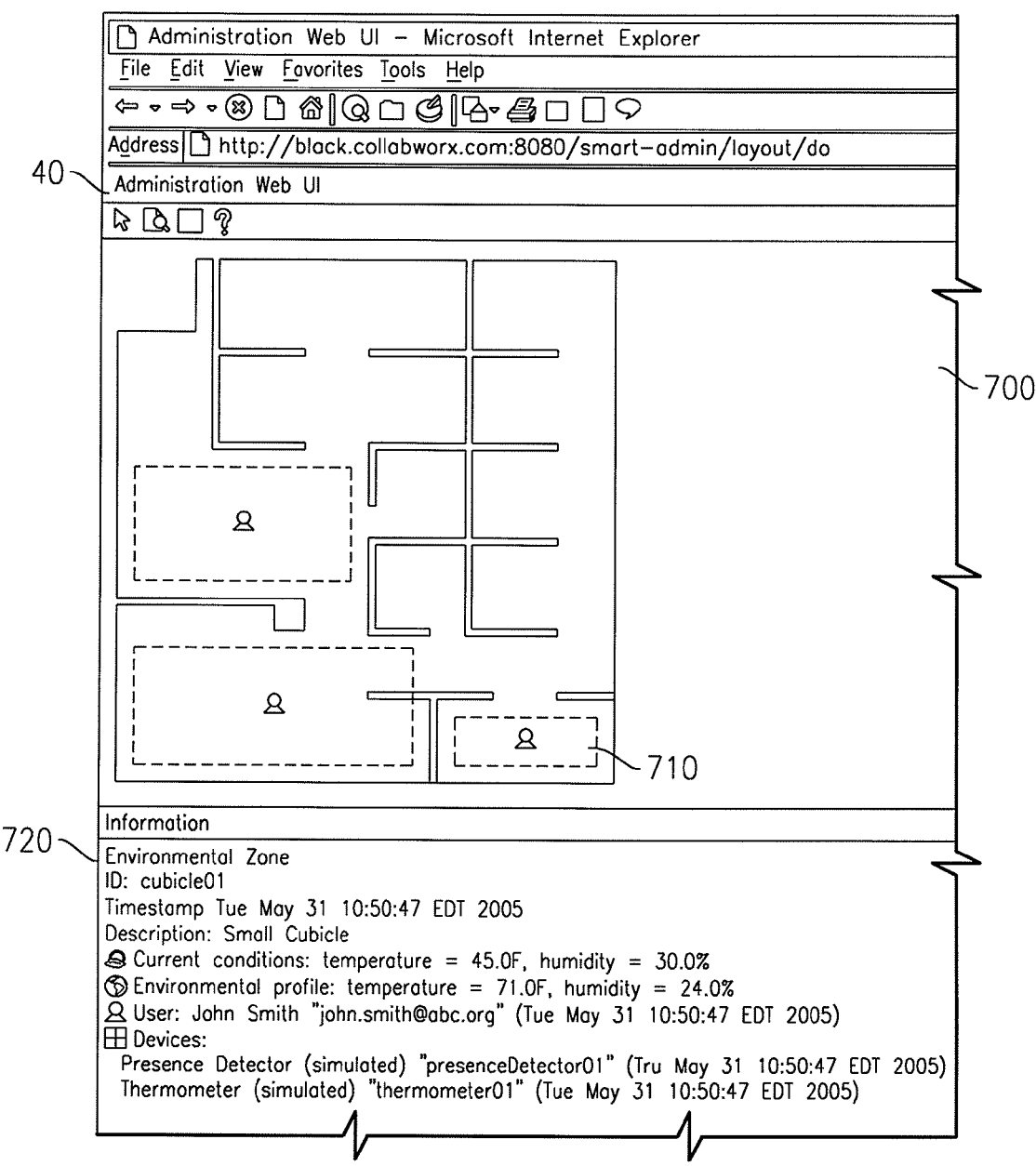
FIG. 14 is a representation illustrating part of the Administrative Interface that shows a graphical layout of a room according to an embodiment of the present invention.

As seen in FIG. 14, part of the Administrative Interface, which shows a graphical layout of a room 700, is illustrated. Cubicle01 710 with user John Smith, along with other cubicles, is shown. The environmental zone 720 of Cubicle01 710 is also shown which illustrates the current conditions of Cubicle01 710, along with the environmental profile, user, and listed devices.

Administration Interface (GUI) implements the following features: Information about each room in the controlled space shall be displayed as a graphical layout with representation of walls, cubicles, and other physical obstacles; Information about each environmental zone in the room shall be displayed as an outline of the area covered by this zone imposed on the layout of the room; Information about environmental profile for each environmental zone shall be displayed within the outline of the corresponding zone; Information about current environmental conditions for each environmental zone shall be displayed within the outline of the corresponding zone; Information about environmental preferences of the users present in the environmental zones shall be displayed within the outline of the corresponding zone; All devices and users in the controlled space shall be displayed as graphical objects imposed on the representation of the room and placed within the outline of the zone where they are located; Appearance of active object (device, environmental zone, user) shall differ from the appearance of inactive object; Information about devices, environmental zones, and active users in the controlled space shall be available and upon selecting the graphical object that represents them; Information about user's properties shall be available shall be displayed in form of a list; Information about user's environmental preferences shall be displayed in form of a table; Information about user's environmental preferences history shall be displayed in form of a chart; Changes to the information (for example, temperature read-out from the sensor) about all devices, environmental zones, and users in the controlled space shall be available in "real time"; Changes to the status (active/inactive) of all devices, environmental zones, and users in the controlled space shall be displayed in real time; and Administrator's Interface shall be able to display the difference between environmental preferences of the user present in the environmental zone and environmental profile calculated by the System for this zone. Administrator's Interface shall have controls to adjust the environmental profile in any environmental zone to the desired level.

External Application Perspective is a view of the System exposed to the external application 300 that needs to access the System functionality. An external application 300 can access the System through Control Interface implemented by the Smart Building Framework 100 component. Control Interface is implemented as a Web service. External application may also register for the notifications about changes in the System state. The System uses JMS technology for distributing notifications. External application 300 has access to the same functionality as the System administrator. External application perspective is a programmatic interface and graphical user interface is not associated with it.

Data formats/models used by the system will now be described. Data models for environmental zones, devices, and users are discussed.

An Environmental Zone data contains information that allows the System to: Uniquely identify the zone; Provide human-readable name and description of the zone; Derive a list of neighboring zones (the list might potentially be empty as a zone might have 0 neighbors); and Identify the environmental profile associated with the zone.

The user data model can be based on X.500 (ISO and ITU-T standard) user schema, for example. X.500 directories can be accessed using Lightweight Directory Access Protocol (LDAP). "Table 1—User Properties," specifies subset of X.500 attribute types used in the System, as shown below.

TABLE 1

User Properties
The following subset of X.500 attribute types is used in a preferred embodiment of the System for the description of users:

| X.500 Identifier | Description |
| --- | --- |
| Cn | user's full name |
| givenName | user's first name |
| Sn | user's last name |
| Title | title of a person in their organizational context |
| Description | additional description of the user. |
| O | organization the user belongs to |
| Ou | name of an organizational unit |
| C | two-letter ISO 3166 country code |
| L | name of a locality, such as a city, county or other geographic region |
| St | full name of a state or province |
| Street | physical street address |
| postalCode | ZIP code |
| postOfficeBox | P.O. Box |
| houseIdentifier | identifies a building within a location |

TABLE 1-continued

User Properties
The following subset of X.500 attribute types is used in a preferred embodiment of the System for the description of users:

| X.500 Identifier | Description |
| --- | --- |
| postalAddress | full address to the location where user can accept package delivery |
| telephoneNumber | user's telephone number |
| facsimileTelephoneNumber | user's fax number |
| userPassword | hashed user password |
| userCertificate | user certificate (in binary form) |
| cACertificate | certification authority certificate (in binary form) |

Data model used by a preferred embodiment of the System to describe properties of the devices and operations applicable to the devices is based on the BACnet standard. The BACnet standard is widely adopted in the building automation industry. Its flexible data format allows the system to describe any device in terms of predefined data structures. Description of non-BACnet devices can be easily converted to BACnet format. The System uses following BACnet objects to describe device properties: Analog Input Object; Analog Output Object; Binary Input Object; Binary Output Object; Device Object; and Event Enrollment Object.

Other BACnet objects are not applicable in context of the System since their functionality is taken over by various components of the System. For example, Smart Building Framework 100 handles scheduling and trend logging (which are described by separate objects in BACnet standard). In certain cases, the BACnet-based data format used by the System is extended to contain entries about information validity period. This extension is needed to enable archiving information about the state of the System.

See "Table 2—Examples of Device Descriptions" below, for examples of device descriptions expressed in the format used by a preferred embodiment of the System.

TABLE 2

Examples of Device Descriptions
This Table contains examples of two devices - (1) Thermometer (a simple device) and (2) JC PEM (a complex device) in the data format used by the System.

| Property | Value | R/O | Type | Comment |
| --- | --- | --- | --- | --- |
| 1. Device Object: Temperature Sensor (Thermometer) | | | | |
| Object_Identifier | (Device, Instance 1) | R | BACnetObjectIdentifier | Unique throught the whole system, numeric code, 32 bits |
| Object_Name | "Temerature Sensor #1" | R | CharacterString | Unique throught the whole system |
| Object_Type | DEVICE | R | BACnetObjectType | must be DEVICE |
| System_Status | OPERATIONAL | R | BACnetDeviceStatus | OPERATIONAL or NON_OPERATIONAL |
| Vendor_Name | "Vendor, Inc." | R | CharacterString | manufacturer |
| Vendor_Identifier | ??? | R | Unsigned16 | unique vendor number assigned by ASHARE |
| Model_Name | "TEMP_S" | R | CharacterString | model name |
| Firmware_Revision | 1.0 | R | CharacterString | firmware revision of SenSyr controller |
| Application_Software_Version | 1.0 | R | CharacterString | software version on SenSyr controller |
| Location | "Office CST 3-201, Cubicle A" | O | CharacterString | physical location of the device |
| Description | "USB Temperature sensor" | O | CharacterString | additional description |
| Protocol_Version | 1 | R | Unsigned | BACnet version |
| Protocol_Revision | 1 | R | Unsigned | BACnet revision |

TABLE 2-continued

Examples of Device Descriptions
This Table contains examples of two devices - (1) Thermometer (a simple device) and (2) JC
PEM (a complex device) in the data format used by the System.

| | | | | |
|---|---|---|---|---|
| Protocol_Services_Supported | 12, 14 | R | BACnetServicesSupported | list of supported services: Read Propert (12), Read Property Multiple (14), Write Property (15) |
| Protocol_Object_Types_Supported | 0 | R | BACnetObjectTypesSupported | list of supported object types: Analog Input (0), Analog Output(1), Binary Input(3), Binary Output(4) |
| Object_List | Analog Input #1 | R | BACnetARRAY [N]of BACnetObjectIdentifier | List of Bacnet 32-bit Object Identifiers |
| Max_APDU_Length_Accepted | 0 | R | Unsigned | N/A |
| Segmentation_Supported | SEGMENTED_BOTH | R | BACnetSegmentation | N/A |
| Max_Segments_Accepted | | O | Unsigned | N/A |
| VT_Classes_Supported | | O | List of BACnetVTClass | N/A |
| Active_VT_Sessions | | O | List of BACnetVTSession | N/A |
| Local_Time | | O | Time | N/A |
| Local_Date | | O | Date | N/A |
| UTC_Offset | | O | INTEGER | N/A |
| Daylight_Savings_Status | | O | BOOLEAN | N/A |
| APDU_Segment_Timeout | | O | Unsigned | N/A |
| APDU_Timeout | 0 | R | Unsigned | N/A |
| Number_Of_APDU_Retries | 0 | R | Unsigned | N/A |
| List_Of_Session_Keys | | O | List of BACnetSessionKey | N/A |
| Time_Synchronization_Recipients | | O | List of BACnetRecipient | N/A |
| Max_Master | | O | Unsigned(1 . . . 127) | N/A |
| Max_Info_Frames | | O | Unsigned | N/A |
| Device_Address_Binding | IP address | R | List of BACnetAddressBinding | BACnet device address; may be IP in our case |
| Database_Revision | 0 | R | Unsigned | revision number of the device database |
| Configuration_Files | | O | BACnetARRAY [N] of BACnetObjectIdentifier | N/A |
| Last_Restore_Time | | O | BACnetTimeStamp | N/A |
| Backup_Failure_Timeout | | O | Unsigned16 | N/A |
| Active_COV_Subscriptions | | O | List of BACnetCOVSubscription | N/A |
| Slave_Proxy_Enable | | O | BACnetArray [N] of BOOLEAN | N/A |
| Manual_Slave_Address_Binding | | O | List of BACnetAddressBinding | N/A |
| Auto_Slave_Discovery | | O | BACnetArray [N] of BOOLEAN | N/A |
| Slave_Address_Binding | | O | List of BACnetAddressBinding | N/A |
| Profile_Name | | O | CharacterString | N/A |
| Analog Input #1: Thermometer | | | | |
| Object_Identifier | (Analog Input, Instance 1) | R | BACnetObjectIdentifier | numeric code, 32 bits, unique within the device |
| Object_Name | "Thermometer" | R | CharacterString | unique within the device |
| Object_Type | ANALOG_INPUT | R | BACnetObjectType | must be ANALOG_INPUT |
| Present_Value | 72 | R | REAL | current settings in Units |
| Description | "Thermometer" | O | CharacterString | description |
| Device_Type | | O | CharacterString | N/A |
| Status_Flags | {FALSE, FALSE, FALSE, FALSE} | R | BACnetStatusFlags | {IN_ALARM, FAULT, OVERWRITTEN, OUT_OF_SERVICE} |
| Event_State | NORMAL | R | BACnetEventState | NORMAL or FAULT |
| Reliability | | O | BACnetReliability | N/A |
| Out_Of_Service | FALSE | R | BOOLEAN | TRUE or FALSE |
| Update_Interval | | O | Unsigned | N/A |
| Units | Degrees-Fahrenheit | R | BACnetEngineeringUnits | measurement units of this object |
| Min_Pres_Value | −20 | O | REAL | the lowest setting |
| Max_Pres_Value | 110 | O | REAL | the highest setting |
| Resolution | 0.01 | O | REAL | the smallest recognizable change in Present_Value in engineering units |
| COV_Increment | 0.1 | O | REAL | the minimum change in Present_Value that will cause a COVNotification to be issued to subscriber COV-clients |

TABLE 2-continued

Examples of Device Descriptions
This Table contains examples of two devices - (1) Thermometer (a simple device) and (2) JC
PEM (a complex device) in the data format used by the System.

| | | | | |
|---|---|---|---|---|
| Time_Delay | | O | Unsigned | N/A |
| Notification_Class | | O | Unsigned | N/A |
| High_Limit | | O | REAL | N/A |
| Low_Limit | | O | REAL | N/A |
| Deadband | | O | REAL | N/A |
| Limit_Enable | | O | BACnetLimitEnable | N/A |
| Event_Enable | | O | BACnetEventTransitionBits | N/A |
| Acked_Transitions | | O | BACnetEventTransitionBits | N/A |
| Notify_Type | | O | BACnetNotifyType | N/A |
| Event_Time_Stamps | | O | BACnetARRAY [3] of BACnetTimeStamp | N/A |
| Profile_Name | | O | CharacterString | N/A |

2. Johnson Controls PEM

PEM—Personal Environment Module from Johnson Controls, Inc (from JC product datasheet).
Gives individual employees the ability to customize their cubicle environments; From
desktop control unit (UCU), individuals can select their own settings for air temperature, air
flow, radiant heat, lighting and background noise masking; Allows an individual to improve
work environment and increase productivity
An integrated occupancy sensor shuts the system down when they're away from their
workstations for about 15 min, saving energy
User Control Unit (UCU, connected to FEU by RJ45 socket) allows to control
air temperature level
air supply (fan speed for air movement)
radiant heater for leg and foot warming
background noise masking
task light level or on/off control
occupancy sensor
Control I/O connector (RJ45)
(1) low voltage ground
(2) DC power supply from FEU (12.6 VDC)
(3) air temperature level (0-10 VDC)
(4) task light control (0-10 VDC)
(5) background noise masking (0-5 VDC)
(6) 12 VDC - unoccupied, 4 VDC - occupied
(7) air supply - fan speed (0-10 VDC)
(8) radiant heater for leg and foot warming (0-10 VDC)
Air temperature is determined by the proportion of conditioned air supplied by the
HVAC system which is combined with office ambient air
Air supply is regulated by the fan located in the FEU
Background noise masking is provided through 2 speakers located inside the FEU;
pseudo white noise adjusted between 0-45 dB

| Property | Value | R/O | Type | Comment |
|---|---|---|---|---|
| Device Object: JC PEM | | | | |
| Object_Identifier | (Device, Instance 1) | R | BACnetObjectIdentifier | Unique throught the whole system, numeric code, 32 bits |
| Object_Name | "JC Personal Environment System #1" | R | CharacterString | Unique throught the whole system |
| Object_Type | DEVICE | R | BACnetObjectType | must be DEVICE |
| System_Status | OPERATIONAL | R | BACnetDeviceStatus | OPERATIONAL or NON_OPERATIONAL |
| Vendor_Name | "Johnson Controls, Inc." | R | CharacterString | manufacturer |
| Vendor_Identifier | ??? | R | Unsigned16 | unique vendor number assigned by ASHARE |
| Model_Name | "PE-FEU-DSA111" | R | CharacterString | model name |
| Firmware_Revision | 1.0 | R | CharacterString | firmware revision of SenSyr controler |
| Application_Software_Version | 1.0 | R | CharacterString | software version on SenSyr controler |
| Location | "Office CST 3-201, Cubicle A" | O | CharacterString | physical location of the device |
| Description | "FEU, Suplied Air, 115 VAC, 60 Hz, w/o N2" | O | CharacterString | additional description |
| Protocol_Version | 1 | R | Unsigned | BACnet version |
| Protocol_Revision | 1 | R | Unsigned | BACnet revision |
| Protocol_Services_Supported | 12, 15 | R | BACnetServicesSupported | list of supported services: Read Propert (12), Read Property Multiple (14), Write Property (15) |

TABLE 2-continued

Examples of Device Descriptions
This Table contains examples of two devices - (1) Thermometer (a simple device) and (2) JC
PEM (a complex device) in the data format used by the System.

| | | | | |
|---|---|---|---|---|
| Protocol_Object_Types_Supported | 0, 1, 3, 4 | R | BACnetObjectTypesSupported | list of supported object types: Analog Input (0), Analog Output(1), Binary Input(3), Binary Output(4) |
| Object_List | Analog Input #1, Analog Input #2, Analog Input #3, Analog Input #4, Analog Input #5, Analog Output #1, Analog Output #2, Analog Output #3, Analog Output #4, Analog Output #5, Binary Input #1, Binary Output #1, Analog Input # 6 | R | BACnetARRAY [N]of BACnetObjectIdentifier | List of Bacnet 32-bit Object Identifiers |
| Max_APDU_Length_Accepted | 0 | R | Unsigned | N/A |
| Segmentation_Supported | SEGMENTED_BOTH | R | BACnetSegmentation | N/A |
| Max_Segments_Accepted | 0 | O | Unsigned | N/A |
| VT_Classes_Supported | | O | List of BACnetVTClass | N/A |
| Active_VT_Sessions | | O | List of BACnetVTSession | N/A |
| Local_Time | | O | Time | N/A |
| Local_Date | | O | Date | N/A |
| UTC_Offset | | O | INTEGER | N/A |
| Daylight_Savings_Status | | O | BOOLEAN | N/A |
| APDU_Segment_Timeout | | O | Unsigned | N/A |
| APDU_Timeout | 0 | R | Unsigned | N/A |
| Number_Of_APDU_Retries | 0 | R | Unsigned | N/A |
| List_Of_Session_Keys | | O | List of BACnetSessionKey | N/A |
| Time_Synchronization_Recipients | | O | List of BACnetRecipient | N/A |
| Max_Master | | O | Unsigned(1 . . . 127) | N/A |
| Max_Info_Frames | | O | Unsigned | N/A |
| Device_Address_Binding | IP address | R | List of BACnetAddressBinding | BACnet device address; may be IP in our case |
| Database_Revision | 0 | R | Unsigned | revision number of the device database |
| Configuration_Files | | O | BACnetARRAY [N] of BACnetObjectIdentifier | N/A |
| Last_Restore_Time | | O | BACnetTimeStamp | N/A |
| Backup_Failure_Timeout | | O | Unsigned16 | N/A |
| Active_COV_Subscriptions | | O | List of BACnetCOVSubscription | N/A |
| Slave_Proxy_Enable | | O | BACnetArray [N] of BOOLEAN | N/A |
| Manual_Slave_Address_Binding | | O | List of BACnetAddressBinding | N/A |
| Auto_Slave_Discovery | | O | BACnetArray [N] of BOOLEAN | N/A |
| Slave_Address_Binding | | O | List of BACnetAddressBinding | N/A |
| Profile_Name | | O | CharacterString | N/A |
| Analog Input #1: Temperature Selection (0-10 VDC) | | | | |
| Object_Identifier | (Analog Input, Instance 1) | R | BACnetObjectIdentifier | numeric code, 32 bits, unique within the device |
| Object_Name | "Air Temperature In" | R | CharacterString | unique within the device |
| Object_Type | ANALOG_INPUT | R | BACnetObjectType | must be ANALOG_INPUT |
| Present_Value | 5.5 | R | REAL | current settings in Units |
| Description | "Temperature Selection" | O | CharacterString | description |
| Device_Type | | O | CharacterString | N/A |
| Status_Flags | {FALSE, FALSE, FALSE, FALSE} | R | BACnetStatusFlags | {IN_ALARM, FAULT, OVERWRITTEN, OUT_OF_SERVICE} |
| Event_State | NORMAL | R | BACnetEventState | NORMAL or FAULT |
| Reliability | | O | BACnetReliability | N/A |
| Out_Of_Service | FALSE | R | BOOLEAN | TRUE or FALSE |
| Update_Interval | | O | Unsigned | N/A |
| Units | VDC | R | BACnetEngineeringUnits | measurement units of this object |
| Min_Pres_Value | 0 | O | REAL | the lowest setting |
| Max_Pres_Value | 10 | O | REAL | the highest setting |
| Resolution | 0.01 | O | REAL | the smallest recognizable change in Present_Value in engineering units |

TABLE 2-continued

Examples of Device Descriptions
This Table contains examples of two devices - (1) Thermometer (a simple device) and (2) JC
PEM (a complex device) in the data format used by the System.

| Property | Value | R/W/O | Type | Description |
|---|---|---|---|---|
| COV_Increment | 0.1 | O | REAL | the minimum change in Present_Value that will cause a COVNotification to be issued to subscriber COV-clients |
| Time_Delay | | O | Unsigned | N/A |
| Notification_Class | | O | Unsigned | N/A |
| High_Limit | | O | REAL | N/A |
| Low_Limit | | O | REAL | N/A |
| Deadband | | O | REAL | N/A |
| Limit_Enable | | O | BACnetLimitEnable | N/A |
| Event_Enable | | O | BACnetEventTransitionBits | N/A |
| Acked_Transitions | | O | BACnetEventTransitionBits | N/A |
| Notify_Type | | O | BACnetNotifyType | N/A |
| Event_Time_Stamps | | O | BACnetARRAY [3] of BACnetTimeStamp | N/A |
| Profile_Name | | O | CharacterString | N/A |
| Analog Output #1: Temperature Selection (0-10 VDC) | | | | |
| Object_Identifier | (Analog Output, Instance 1) | R | BACnetObjectIdentifier | numeric code, 32 bits, unique within the device |
| Object_Name | "Air Temperature Out" | R | CharacterString | unique within the device |
| Object_Type | ANALOG_OUTPUT | R | BACnetObjectType | must be ANALOG_OUTPUT |
| Present_Value | 5.5 | W | REAL | current settings in Units |
| Description | "Temperature Selection" | O | CharacterString | description |
| Device_Type | | O | CharacterString | N/A |
| Status_Flags | {FALSE, FALSE, FALSE, FALSE} | R | BACnetStatusFlags | {IN_ALARM, FAULT, OVERWRITTEN, OUT_OF_SERVICE} |
| Event_State | NORMAL | R | BACnetEventState | NORMAL or FAULT |
| Reliability | | O | BACnetReliability | N/A |
| Out_Of_Service | FALSE | R | BOOLEAN | TRUE or FALSE |
| Units | VDC | R | BACnetEngineeringUnits | measurement units of this object |
| Min_Pres_Value | 0 | O | REAL | the lowest setting |
| Max_Pres_Value | 10 | O | REAL | the highest setting |
| Resolution | 0.01 | O | REAL | the smallest recognizable change in Present_Value in engineering units |
| Priority_Array | ??? | R | BACnetPriorityArray | |
| Relinquish_Default | ??? | R | REAL | |
| COV_Increment | 0.1 | O | REAL | the minimum change in Present_Value that will cause a COVNotification to be issued to subscriber COV-clients |
| Time_Delay | | O | Unsigned | N/A |
| Notification_Class | | O | Unsigned | N/A |
| High_Limit | | O | REAL | N/A |
| Low_Limit | | O | REAL | N/A |
| Deadband | | O | REAL | N/A |
| Limit_Enable | | O | BACnetLimitEnable | N/A |
| Event_Enable | | O | BACnetEventTransitionBits | N/A |
| Acked_Transitions | | O | BACnetEventTransitionBits | N/A |
| Notify_Type | | O | BACnetNotifyType | N/A |
| Event_Time_Stamps | | O | BACnetARRAY [3] of BACnetTimeStamp | N/A |
| Profile_Name | | O | CharacterString | N/A |
| Analog Input #2: Fan Speed Selection (0-10 VDC) | | | | |
| Object_Identifier | (Analog Input, Instance 2) | R | BACnetObjectIdentifier | numeric code, 32 bits, unique within the device |
| Object_Name | "Fan Speed In" | R | CharacterString | unique within the device |
| Object_Type | ANALOG_INPUT | R | BACnetObjectType | must be ANALOG_INPUT |
| Present_Value | 5.5 | R | REAL | current settings in Units |
| Description | "Fan Speed Selection" | O | CharacterString | description |
| Device_Type | | O | CharacterString | N/A |
| Status_Flags | {FALSE, FALSE, FALSE, FALSE} | R | BACnetStatusFlags | {IN_ALARM, FAULT, OVERWRITTEN, OUT_OF_SERVICE} |
| Event_State | NORMAL | R | BACnetEventState | NORMAL or FAULT |
| Reliability | | O | BACnetReliability | N/A |
| Out_Of_Service | FALSE | R | BOOLEAN | TRUE or FALSE |
| Update_Interval | | O | Unsigned | N/A |
| Units | VDC | R | BACnetEngineeringUnits | measurement units of this object |
| Min_Pres_Value | 0 | O | REAL | the lowest setting |
| Max_Pres_Value | 10 | O | REAL | the highest setting |

TABLE 2-continued

Examples of Device Descriptions
This Table contains examples of two devices - (1) Thermometer (a simple device) and (2) JC
PEM (a complex device) in the data format used by the System.

| | | | | |
|---|---|---|---|---|
| Resolution | 0.01 | O | REAL | the smallest recognizable change in Present_Value in engineering units |
| COV_Increment | 0.1 | O | REAL | the minimum change in Present_Value that will cause a COVNotification to be issued to subscriber COV-clients |
| Time_Delay | | O | Unsigned | N/A |
| Notification_Class | | O | Unsigned | N/A |
| High_Limit | | O | REAL | N/A |
| Low_Limit | | O | REAL | N/A |
| Deadband | | O | REAL | N/A |
| Limit_Enable | | O | BACnetLimitEnable | N/A |
| Event_Enable | | O | BACnetEventTransitionBits | N/A |
| Acked_Transitions | | O | BACnetEventTransitionBits | N/A |
| Notify_Type | | O | BACnetNotifyType | N/A |
| Event_Time_Stamps | | O | BACnetARRAY [3] of BACnetTimeStamp | N/A |
| Profile_Name | | O | CharacterString | N/A |
| Analog Output #2: Fan Speed Selection (0-10 VDC) | | | | |
| Object_Identifier | (Analog Output, Instance 2) | R | BACnetObjectIdentifier | numeric code, 32 bits, unique within the device |
| Object_Name | "Fan Speed Out" | R | CharacterString | unique within the device |
| Object_Type | ANALOG_OUTPUT | R | BACnetObjectType | must be ANALOG_OUTPUT |
| Present_Value | 5.5 | W | REAL | current settings in Units |
| Description | "Fan Speed Selection" | O | CharacterString | description |
| Device_Type | | O | CharacterString | N/A |
| Status_Flags | {FALSE, FALSE, FALSE, FALSE} | R | BACnetStatusFlags | {IN_ALARM, FAULT, OVERWRITTEN, OUT_OF_SERVICE} |
| Event_State | NORMAL | R | BACnetEventState | NORMAL or FAULT |
| Reliability | | O | BACnetReliability | N/A |
| Out_Of_Service | FALSE | R | BOOLEAN | TRUE or FALSE |
| Units | VDC | R | BACnetEngineeringUnits | measurement units of this object |
| Min_Pres_Value | 0 | O | REAL | the lowest setting |
| Max_Pres_Value | 10 | O | REAL | the highest setting |
| Resolution | 0.01 | O | REAL | the smallest recognizable change in Present_Value in engineering units |
| Priority_Array | ??? | R | BACnetPriorityArray | |
| Relinquish_Default | ??? | R | REAL | |
| COV_Increment | 0.1 | O | REAL | the minimum change in Present_Value that will cause a COVNotification to be issued to subscriber COV-clients |
| Time_Delay | | O | Unsigned | |
| Notification_Class | | O | Unsigned | |
| High_Limit | | O | REAL | |
| Low_Limit | | O | REAL | |
| Deadband | | O | REAL | |
| Limit_Enable | | O | BACnetLimitEnable | |
| Event_Enable | | O | BACnetEventTransitionBits | |
| Acked_Transitions | | O | BACnetEventTransitionBits | |
| Notify_Type | | O | BACnetNotifyType | |
| Event_Time_Stamps | | O | BACnetARRAY [3] of BACnetTimeStamp | |
| Profile_Name | | O | CharacterString | |
| Analog Input #3: Radiant Heat Panel Selection (0-10 VDC) | | | | |
| Object_Identifier | (Analog Input, Instance 3) | R | BACnetObjectIdentifier | numeric code, 32 bits, unique within the device |
| Object_Name | "Radiant Heat In" | R | CharacterString | unique within the device |
| Object_Type | ANALOG_INPUT | R | BACnetObjectType | must be ANALOG_INPUT |
| Present_Value | 5.5 | R | REAL | current settings in Units |
| Description | "Radiant Heat Selection" | O | CharacterString | description |
| Device_Type | | O | CharacterString | N/A |
| Status_Flags | {FALSE, FALSE, FALSE, FALSE} | R | BACnetStatusFlags | {IN_ALARM, FAULT, OVERWRITTEN, OUT_OF_SERVICE} |
| Event_State | NORMAL | R | BACnetEventState | NORMAL or FAULT |
| Reliability | | O | BACnetReliability | N/A |
| Out_Of_Service | FALSE | R | BOOLEAN | TRUE or FALSE |
| Update_Interval | | O | Unsigned | N/A |
| Units | VDC | R | BACnetEngineeringUnits | measurement units of this object |
| Min_Pres_Value | 0 | O | REAL | the lowest setting |

TABLE 2-continued

Examples of Device Descriptions
This Table contains examples of two devices - (1) Thermometer (a simple device) and (2) JC
PEM (a complex device) in the data format used by the System.

| | | | | |
|---|---|---|---|---|
| Max_Pres_Value | 10 | O | REAL | the highest setting |
| Resolution | 0.01 | O | REAL | the smallest recognizable change in Present_Value in engineering units |
| COV_Increment | 0.1 | O | REAL | the minimum change in Present_Value that will cause a COVNotification to be issued to subscriber COV-clients |
| Time_Delay | | O | Unsigned | N/A |
| Notification_Class | | O | Unsigned | N/A |
| High_Limit | | O | REAL | N/A |
| Low_Limit | | O | REAL | N/A |
| Deadband | | O | REAL | N/A |
| Limit_Enable | | O | BACnetLimitEnable | N/A |
| Event_Enable | | O | BACnetEventTransitionBits | N/A |
| Acked_Transitions | | O | BACnetEventTransitionBits | N/A |
| Notify_Type | | O | BACnetNotifyType | N/A |
| Event_Time_Stamps | | O | BACnetARRAY [3] of BACnetTimeStamp | N/A |
| Profile_Name | | O | CharacterString | N/A |
| Analog Output #3: Radiant Heat Panel Selection (0-10 VDC) | | | | |
| Object_Identifier | (Analog Output, Instance 3) | R | BACnetObjectIdentifier | numeric code, 32 bits, unique within the device |
| Object_Name | "Radiant Heat Out" | R | CharacterString | unique within the device |
| Object_Type | ANALOG_OUTPUT | R | BACnetObjectType | must be ANALOG_OUTPUT |
| Present_Value | 5.5 | W | REAL | current settings in Units |
| Description | "Radiant Heat Selection" | O | CharacterString | description |
| Device_Type | | O | CharacterString | N/A |
| Status_Flags | {FALSE, FALSE, FALSE, FALSE} | R | BACnetStatusFlags | {IN_ALARM, FAULT, OVERWRITTEN, OUT_OF_SERVICE} |
| Event_State | NORMAL | R | BACnetEventState | NORMAL or FAULT |
| Reliability | | O | BACnetReliability | N/A |
| Out_Of_Service | FALSE | R | BOOLEAN | TRUE or FALSE |
| Units | VDC | R | BACnetEngineeringUnits | measurement units of this object |
| Min_Pres_Value | 0 | O | REAL | the lowest setting |
| Max_Pres_Value | 10 | O | REAL | the highest setting |
| Resolution | 0.01 | O | REAL | the smallest recognizable change in Present_Value in engineering units |
| Priority_Array | ??? | R | BACnetPriorityArray | |
| Relinquish_Default | ??? | R | REAL | |
| COV_Increment | 0.1 | O | REAL | the minimum change in Present_Value that will cause a COVNotification to be issued to subscriber COV-clients |
| Time_Delay | | O | Unsigned | |
| Notification_Class | | O | Unsigned | |
| High_Limit | | O | REAL | |
| Low_Limit | | O | REAL | |
| Deadband | | O | REAL | |
| Limit_Enable | | O | BACnetLimitEnable | |
| Event_Enable | | O | BACnetEventTransitionBits | |
| Acked_Transitions | | O | BACnetEventTransitionBits | |
| Notify_Type | | O | BACnetNotifyType | |
| Event_Time_Stamps | | O | BACnetARRAY [3] of BACnetTimeStamp | |
| Profile_Name | | O | CharacterString | |
| Analog Input #4: Task Lighting Selection (0-10 VDC) | | | | |
| Object_Identifier | (Analog Input, Instance 4) | R | BACnetObjectIdentifier | numeric code, 32 bits, unique within the device |
| Object_Name | "Task Lighting In" | R | CharacterString | unique within the device |
| Object_Type | ANALOG_INPUT | R | BACnetObjectType | must be ANALOG_INPUT |
| Present_Value | 5.5 | R | REAL | current settings in Units |
| Description | "Task Lighting Selection" | O | CharacterString | description |
| Device_Type | | O | CharacterString | N/A |
| Status_Flags | {FALSE, FALSE, FALSE, FALSE} | R | BACnetStatusFlags | {IN_ALARM, FAULT, OVERWRITTEN, OUT_OF_SERVICE} |
| Event_State | NORMAL | R | BACnetEventState | NORMAL or FAULT |
| Reliability | | O | BACnetReliability | N/A |
| Out_Of_Service | FALSE | R | BOOLEAN | TRUE or FALSE |
| Update_Interval | | O | Unsigned | N/A |
| Units | VDC | R | BACnetEngineeringUnits | measurement units of this object |

TABLE 2-continued

Examples of Device Descriptions
This Table contains examples of two devices - (1) Thermometer (a simple device) and (2) JC
PEM (a complex device) in the data format used by the System.

| | | | | |
|---|---|---|---|---|
| Min_Pres_Value | 0 | O | REAL | the lowest setting |
| Max_Pres_Value | 10 | O | REAL | the highest setting |
| Resolution | 0.01 | O | REAL | the smallest recognizable change in Present_Value in engineering units |
| COV_Increment | 0.1 | O | REAL | the minimum change in Present_Value that will cause a COVNotification to be issued to subscriber COV-clients |
| Time_Delay | | O | Unsigned | N/A |
| Notification_Class | | O | Unsigned | N/A |
| High_Limit | | O | REAL | N/A |
| Low_Limit | | O | REAL | N/A |
| Deadband | | O | REAL | N/A |
| Limit_Enable | | O | BACnetLimitEnable | N/A |
| Event_Enable | | O | BACnetEventTransitionBits | N/A |
| Acked_Transitions | | O | BACnetEventTransitionBits | N/A |
| Notify_Type | | O | BACnetNotifyType | N/A |
| Event_Time_Stamps | | O | BACnetARRAY [3] of BACnetTimeStamp | N/A |
| Profile_Name | | O | CharacterString | N/A |
| Analog Output #4: Task Lighting Selection (0-10 VDC) | | | | |
| Object_Identifier | (Analog Output, Instance 4) | R | BACnetObjectIdentifier | numeric code, 32 bits, unique within the device |
| Object_Name | "Task Lighting Out" | R | CharacterString | unique within the device |
| Object_Type | ANALOG_OUTPUT | R | BACnetObjectType | must be ANALOG_OUTPUT |
| Present_Value | 5.5 | W | REAL | current settings in Units |
| Description | "Task Lighting Selection" | O | CharacterString | description |
| Device_Type | | O | CharacterString | N/A |
| Status_Flags | {FALSE, FALSE, FALSE, FALSE} | R | BACnetStatusFlags | {IN_ALARM, FAULT, OVERWRITTEN, OUT_OF_SERVICE} |
| Event_State | NORMAL | R | BACnetEventState | NORMAL or FAULT |
| Reliability | | O | BACnetReliability | N/A |
| Out_Of_Service | FALSE | R | BOOLEAN | TRUE or FALSE |
| Units | VDC | R | BACnetEngineeringUnits | measurement units of this object |
| Min_Pres_Value | 0 | O | REAL | the lowest setting |
| Max_Pres_Value | 10 | O | REAL | the highest setting |
| Resolution | 0.01 | O | REAL | the smallest recognizable change in Present_Value in engineering units |
| Priority_Array | ??? | R | BACnetPriorityArray | |
| Relinquish_Default | ??? | R | REAL | |
| COV_Increment | 0.1 | O | REAL | the minimum change in Present_Value that will cause a COVNotification to be issued to subscriber COV-clients |
| Time_Delay | | O | Unsigned | |
| Notification_Class | | O | Unsigned | |
| High_Limit | | O | REAL | |
| Low_Limit | | O | REAL | |
| Deadband | | O | REAL | |
| Limit_Enable | | O | BACnetLimitEnable | |
| Event_Enable | | O | BACnetEventTransitionBits | |
| Acked_Transitions | | O | BACnetEventTransitionBits | |
| Notify_Type | | O | BACnetNotifyType | |
| Event_Time_Stamps | | O | BACnetARRAY [3] of BACnetTimeStamp | |
| Profile_Name | | O | CharacterString | |
| Analog Input #5: Background Noise Masking Selection (0-5 VDC) | | | | |
| Object_Identifier | (Analog Input, Instance 5) | R | BACnetObjectIdentifier | numeric code, 32 bits, unique within the device |
| Object_Name | "Noise Masking In" | R | CharacterString | unique within the device |
| Object_Type | ANALOG_INPUT | R | BACnetObjectType | must be ANALOG_INPUT |
| Present_Value | 1 | R | REAL | current settings in Units |
| Description | "Temperature Selection" | O | CharacterString | description |
| Device_Type | | O | CharacterString | N/A |
| Status_Flags | {FALSE, FALSE, FALSE, FALSE} | R | BACnetStatusFlags | {IN_ALARM, FAULT, OVERWRITTEN, OUT_OF_SERVICE} |
| Event_State | NORMAL | R | BACnetEventState | NORMAL or FAULT |
| Reliability | | O | BACnetReliability | N/A |

TABLE 2-continued

Examples of Device Descriptions
This Table contains examples of two devices - (1) Thermometer (a simple device) and (2) JC
PEM (a complex device) in the data format used by the System.

| | | | | |
|---|---|---|---|---|
| Out_Of_Service | FALSE | R | BOOLEAN | TRUE or FALSE |
| Update_Interval | | O | Unsigned | N/A |
| Units | VDC | R | BACnetEngineeringUnits | measurement units of this object |
| Min_Pres_Value | 0 | O | REAL | the lowest setting |
| Max_Pres_Value | 5 | O | REAL | the highest setting |
| Resolution | 0.01 | O | REAL | the smallest recognizable change in Present_Value in engineering units |
| COV_Increment | 0.1 | O | REAL | the minimum change in Present_Value that will cause a COVNotification to be issued to subscriber COV-clients |
| Time_Delay | | O | Unsigned | N/A |
| Notification_Class | | O | Unsigned | N/A |
| High_Limit | | O | REAL | N/A |
| Low_Limit | | O | REAL | N/A |
| Deadband | | O | REAL | N/A |
| Limit_Enable | | O | BACnetLimitEnable | N/A |
| Event_Enable | | O | BACnetEventTransitionBits | N/A |
| Acked_Transitions | | O | BACnetEventTransitionBits | N/A |
| Notify_Type | | O | BACnetNotifyType | N/A |
| Event_Time_Stamps | | O | BACnetARRAY [3] of BACnetTimeStamp | N/A |
| Profile_Name | | O | CharacterString | N/A |
| Object_Identifier | (Analog Output, Instance 5) | R | BACnetObjectIdentifier | numeric code, 32 bits, unique within the device |
| Object_Name | "Noise Masking Out" | R | CharacterString | unique within the device |
| Object_Type | ANALOG_OUTPUT | R | BACnetObjectType | must be ANALOG_OUTPUT |
| Present_Value | 1 | W | REAL | current settings in Units |
| Description | "Noise Masking Selection" | O | CharacterString | description |
| Device_Type | | O | CharacterString | N/A |
| Status_Flags | {FALSE, FALSE, FALSE, FALSE} | R | BACnetStatusFlags | {IN_ALARM, FAULT, OVERWRITTEN, OUT_OF_SERVICE} |
| Event_State | NORMAL | R | BACnetEventState | NORMAL or FAULT |
| Reliability | | O | BACnetReliability | N/A |
| Out_Of_Service | FALSE | R | BOOLEAN | TRUE or FALSE |
| Units | VDC | R | BACnetEngineeringUnits | measurement units of this object |
| Min_Pres_Value | 0 | O | REAL | the lowest setting |
| Max_Pres_Value | 5 | O | REAL | the highest setting |
| Resolution | 0.01 | O | REAL | the smallest recognizable change in Present_Value in engineering units |
| Priority_Array | ??? | R | BACnetPriorityArray | |
| Relinquish_Default | ??? | R | REAL | |
| COV_Increment | 0.1 | O | REAL | the minimum change in Present_Value that will cause a COVNotification to be issued to subscriber COV-clients |
| Time_Delay | | O | Unsigned | |
| Notification_Class | | O | Unsigned | |
| High_Limit | | O | REAL | |
| Low_Limit | | O | REAL | |
| Deadband | | O | REAL | |
| Limit_Enable | | O | BACnetLimitEnable | |
| Event_Enable | | O | BACnetEventTransitionBits | |
| Acked_Transitions | | O | BACnetEventTransitionBits | |
| Notify_Type | | O | BACnetNotifyType | |
| Event_Time_Stamps | | O | BACnetARRAY [3] of BACnetTimeStamp | |
| Profile_Name | | O | CharacterString | |
| Binary Input #1: Occupancy Status (12 VDC unoccupied, 4 VDC occupied) | | | | |
| Object_Identifier | (Binary Input, Instance 1) | R | BACnetObjectIdentifier | numeric code, 32 bits, unique within the device |
| Object_Name | "Occupancy Status In" | R | CharacterString | unique within the device |
| Object_Type | BINARY_INPUT | R | BACnetObjectType | must be BINARY_INPUT |
| Present_Value | INACTIVE | R | BACnetBinaryPV | INACTIVE or ACTIVE |
| Description | "Occupancy Status" | O | CharacterString | description |
| Device_Type | | O | CharacterString | N/A |
| Status_Flags | {FALSE, FALSE, FALSE, FALSE} | R | BACnetStatusFlags | {IN_ALARM, FAULT, OVERWRITTEN, OUT_OF_SERVICE} |

TABLE 2-continued

Examples of Device Descriptions
This Table contains examples of two devices - (1) Thermometer (a simple device) and (2) JC
PEM (a complex device) in the data format used by the System.

| | | | | |
|---|---|---|---|---|
| Event_State | NORMAL | R | BACnetEventState | NORMAL or FAULT |
| Reliability | | O | BACnetReliability | N/A |
| Out_Of_Service | FALSE | R | BOOLEAN | TRUE or FALSE |
| Polarity | NORMAL | R | BACnetPolarity | NORMAL = 12 DVC, REVERSE = 4 VDC |
| Inactive_Text | | O | CharacterString | N/A |
| Active_Text | | O | CharacterString | N/A |
| Change_Of_State_Time | | O | BACnetDateTime | N/A |
| Change_Of_State_Count | | O | Unsigned | N/A |
| Time_Of_State_Count_Reset | | O | BACnetDateTime | N/A |
| Elapsed_Active_Time | | O | Unsigned32 | N/A |
| Time_Of_Active_Time_Reset | | O | BACnetDateTime | N/A |
| Time_Delay | | O | Unsigned | N/A |
| Notification_Class | | O | Unsigned | N/A |
| Alarm_Value | | O | BACnetBinaryPV | N/A |
| Event_Enable | | O | BACnetEventTransitionBits | N/A |
| Acked_Transitions | | O | BACnetEventTransitionBits | N/A |
| Notify_Type | | O | BACnetNotifyType | N/A |
| Event_Time_Stamps | | O | BACnetARRAY [3] of BACnetTimeStamp | N/A |
| Profile_Name | | O | CharacterString | N/A |
| Binary Output #1: Occupancy Status (12 VDC unoccupied, 4 VDC occupied) | | | | |
| Object_Identifier | (Binary Output, Instance 1) | R | BACnetObjectIdentifier | numeric code, 32 bits, unique within the device |
| Object_Name | "Occupancy Status Out" | R | CharacterString | unique within the device |
| Object_Type | BINARY_OUTPUT | R | BACnetObjectType | must be BINARY_OUTPUT |
| Present_Value | INACTIVE | W | BACnetBinaryPV | INACTIVE or ACTIVE |
| Description | "Occupancy Status" | O | CharacterString | description |
| Device_Type | | O | CharacterString | N/A |
| Status_Flags | {FALSE, FALSE, FALSE, FALSE} | R | BACnetStatusFlags | {IN_ALARM, FAULT, OVERWRITTEN, OUT_OF_SERVICE} |
| Event_State | NORMAL | R | BACnetEventState | NORMAL or FAULT |
| Reliability | | O | BACnetReliability | N/A |
| Out_Of_Service | FALSE | R | BOOLEAN | TRUE or FALSE |
| Polarity | NORMAL | R | BACnetPolarity | NORMAL = 12 DVC, REVERSE = 4 VDC |
| Inactive_Text | | O | CharacterString | |
| Active_Text | | O | CharacterString | |
| Change_Of_State_Time | | O | BACnetDateTime | |
| Change_Of_State_Count | | O | Unsigned | |
| Time_Of_State_Count_Reset | | O | BACnetDateTime | |
| Elapsed_Active_Time | | O | Unsigned32 | |
| Time_Of_Active_Time_Reset | | O | BACnetDateTime | |
| Minimum_Off_Time | | O | Unsigned32 | |
| Minimum_On_Time | | O | Unsigned32 | |
| Priority_Array | | R | BACnetPriorityArray | |
| Relinquish_Default | | R | BACnetBinaryPV | |
| Time_Delay | | O | Unsigned | |
| Notification_Class | | O | Unsigned | |
| Feedback_Value | | O | BACnetBinaryPV | |
| Event_Enable | | O | BACnetEventTransitionBits | |
| Acked_Transitions | | O | BACnetEventTransitionBits | |
| Notify_Type | | O | BACnetNotifyType | |
| Event_Time_Stamps | | O | BACnetARRAY [3] of BACnetTimeStamp | |
| Profile_Name | | O | CharacterString | |
| Analog Input #6: Thermometer | | | | |
| Object_Identifier | (Analog Input, Instance 6) | R | BACnetObjectIdentifier | numeric code, 32 bits, unique within the device |
| Object_Name | "Thermometer In" | R | CharacterString | unique within the device |
| Object_Type | ANALOG_INPUT | R | BACnetObjectType | must be ANALOG_INPUT |
| Present_Value | 72 | R | REAL | current settings in Units |
| Description | "Thermometer attached to SenSyr controller" | O | CharacterString | description |
| Device_Type | | O | CharacterString | N/A |
| Status_Flags | {FALSE, FALSE, FALSE, FALSE} | R | BACnetStatusFlags | {IN_ALARM, FAULT, OVERWRITTEN, OUT_OF_SERVICE} |

TABLE 2-continued

Examples of Device Descriptions
This Table contains examples of two devices - (1) Thermometer (a simple device) and (2) JC
PEM (a complex device) in the data format used by the System.

| | | | | |
|---|---|---|---|---|
| Event_State | NORMAL | R | BACnetEventState | NORMAL or FAULT |
| Reliability | | O | BACnetReliability | N/A |
| Out_Of_Service | FALSE | R | BOOLEAN | TRUE or FALSE |
| Update_Interval | | O | Unsigned | N/A |
| Units | Degrees-Fahrenheit | R | BACnetEngineeringUnits | measurement units of this object |
| Min_Pres_Value | −20 | O | REAL | the lowest setting |
| Max_Pres_Value | 110 | O | REAL | the highest setting |
| Resolution | 0.01 | O | REAL | the smallest recognizable change in Present_Value in engineering units |
| COV_Increment | 0.1 | O | REAL | the minimum change in Present_Value that will cause a COVNotification to be issued to subscriber COV-clients |
| Time_Delay | | O | Unsigned | N/A |
| Notification_Class | | O | Unsigned | N/A |
| High_Limit | | O | REAL | N/A |
| Low_Limit | | O | REAL | N/A |
| Deadband | | O | REAL | N/A |
| Limit_Enable | | O | BACnetLimitEnable | N/A |
| Event_Enable | | O | BACnetEventTransitionBits | N/A |
| Acked_Transitions | | O | BACnetEventTransitionBits | N/A |
| Notify_Type | | O | BACnetNotifyType | N/A |
| Event_Time_Stamps | | O | BACnetARRAY [3] of BACnetTimeStamp | N/A |
| Profile_Name | | O | CharacterString | N/A |

Note:
Object_Identifier = BACnetObjectType(10 bits) + Instance Number (22 bits)
BACnetObjectIdentifier: list on page 421 of BACnet Specification (analog_input (0), analog_output(1), digital_input (3), digital_output (4))
R: property required and readable;
O - property is optional
W - property required, readable, writable A description of Device Services supported by Smart Building Framework, according to an embodiment of the present invention is provided below. Device Services relates to information about services that can be used in the description of the devices. In particular, BACnet objects allow organizing information related to physical devices. A physical device is represented by one DEVICE object and, optionally, several other objects, appropriate to the device's functions. Each object carries a collection of information about the device. Every object consists of a set of properties and associates values. Object can be represented by a table with 2 columns.

Smart devices 90 can be asked to perform services. A Smart device 90 to which humidity sensor is attached. For example, may be asked to read humidity measurement from the sensor and provide it to the Framework 100. BACnet device is not required to implement all services. Only one service, ReadProperty, should be processed by all BACnet devices.

The Object Access Services allows any software module communicating with Smart Building Framework to read, modify and write Properties.

| Service | Description |
|---|---|
| ReadProperty | Returns a value of one property of one object. |
| ReadPropertyMultiple | Returns the values of multiple properties of multiple objects. |
| WriteProperty | Writes a value to one property of one object. |
| WritePropertyMultiple | Writes values to multiple properties of multiple objects. |

The ReadProperty service (Spec 15.5) is used by a client to request the value of one property of one Object. This service allows read access to any property of any object.

Service specification:
ReadProperty (Object Identifier, Property Identifier [Property Array Index]));
Result (success): Object Identifier, Property Identifier, Property Value;
Result (failure): Error Message: Unknown Object, Unknown Property, Property is not an Array, Invalid Array Index.

The ReadPropertyMultiple service (Spec 15.7) is used by a client to request the values of one or more specified properties of one or more Objects. This service allows read access to any property of any object. The user may read a single property of a single object, a list of properties of a single object, or any number of properties of any number of objects.
Service specification:
ReadPropertyMultiple (List of Read Access Specifications;);
List of Read Access Specifications={Object Identifier, {Property Identifier}};
Result (success): List of Read Access Results;
List of Read Access Results={Object Identifier, {Property Identifier, Property Value)}};
Result (failure): Error Message: Unknown Object, Unknown Property, Property is not an Array, Invalid Array Index.

The WriteProperty service (Spec 15.9) is used by a client to modify the value of a single specified property of an Object. This service potentially allows write access to any property of any object.
Service Specification:
WriteProperty (Object Identifier, Property Identifier [Property Array Index], Property Value);
Result (success): Change of Property Value;
Result (failure): Error Message: Unknown Object, Unknown Property, Property is not an Array, Invalid Array Index, Write Access Denied, Invalid Data Type, Duplicate Name, Duplicate Object ID, Value out of Range.

The WritePropertyMultiple service (Spec 15.10) is used by a client to modify the value of one or more specified properties of an object. This service potentially allows write access to any property of any object.
Service Specification:
ReadPropertyMultiple (List of Write Access Specifications);
List of Write Access Specifications={Object Identifier, {Property Identifier, Property Value)}};
Result (success): Change of Property Values;
Result (failure—): Error Message: Unknown Object, Unknown Property, Property is not an Array, Invalid Array Index, Write Access Denied, Invalid Data Type, Duplicate Name, Duplicate Object ID, Value out of Range.

The Alarm and Event Services report changes which might indicate problems or error conditions, such as a sensor reading out of normal range; or a change in a reading termed Change Of Value (COV). COV reporting is a useful alternative to repeatedly polling an object for some monitored value. COV reporting allows it to send out notices when a change occurs. Alarm, Event and COV notifications are generated by the software monitoring Objects directly related to control operations.

| Service | Description |
| --- | --- |
| ConfirmedCOVNotification | Tells subscribing devices of the COV that occurred in a property. |
| A SubscribeCOVProperty | Request to be told of COVs in an object |

The ConfirmedCOVNotification service (Spec 13.6) is used to notify subscribers about changes that may have occurred to the properties of a particular object. Subscriptions for COV notifications are made using the SubscribeCOVProperty service.
Service Specification:
ConfirmedCOVNotification (Subscriber Process Identifier, Monitored Object Identifier, Time Remaining, List of Values);
Subscriber Process Identifier defines the process that should receive notification;
Time Remaining defines lifetime of the subscription in seconds;
Result (success): Indicates the success of the operation.
Result (failure): Indicates the failure.

The SubscribeCOVProperty service (Spec 13.15) is used by a COV-client to subscribe for the receipt of notifications of changes that may occur to the properties of a particular object. Any object may optionally support COV reporting. If a standard object provides COV reporting, then changes of value of subscribed-to properties of the object, in some cases based on programmable increments, trigger COV notifications to be sent to one or more subscriber clients. Typically, COV notifications are sent to supervisory programs in devices or to operators or logging devices.
Service Specification:
SubscribeCOVProperty (Subscriber Process Identifier, Monitored Object Identifier; LifeTime, Monitored Property Identifier, COV Increment);
Subscriber Process Identifier defines the process that should receive notification;
Result (success). Indicates the success of the operation.
Result (failure): Indicates the failure.

A description of the installation procedures of the system (e.g., installing the System on the target deployment platform) of a preferred embodiment of the present invention is provided below.

Figure 15:
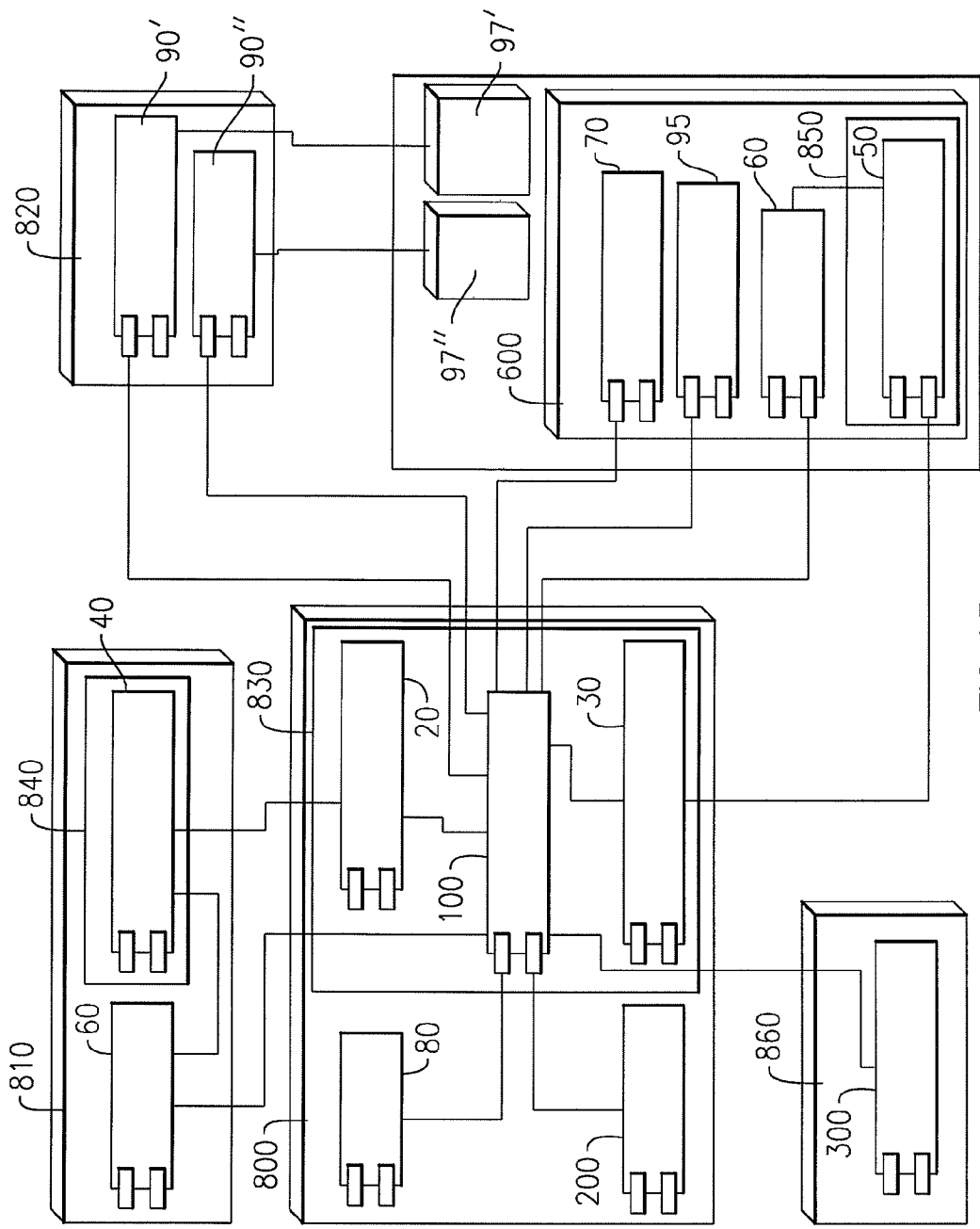
FIG. 15 is a schematic diagram illustrating the complete architecture of the deployed system including Hardware resources, software components, and network communication paths with a description of communication protocol according to an embodiment of the present invention.

In accordance with an embodiment of the present invention, the System of a preferred embodiment of the present invention comprises several components, as described supra, that are deployed on appropriate hardware platforms: Smart Building Framework 100, Administration Web Application 20, Personalization Web Application 30, Database Management System 80, Inference Engine 200, Administration Web User Interface 40, Notification Agents 60, Profile Manager 70, Personalization Web User Interface 50, and several Smart 90 and Real Devices. The complete architecture of the deployed system is presented in FIG. 15. Hardware resources as well as software components are shown. All network communication paths are identified with description of communication protocol used.

The deployment of the system requires the following machines: Smart Building Server 800; Administration Machine 810; User Workstation 600; and Smart Device Controller 820.

For the Smart Building Server 800, Microsoft Windows 2000/XP/2003 is required. The server runs a J2EE 1.4 compatible, open source JBoss Application Server 4.0.1 and Hypersonic relational database integrated with the JBoss. JBoss Application Server is available as a free download and requires at least Java 2 SDK 1.4 to run.

The Smart Building Server 800 runs the following components of the System: (1) Smart Building Framework 100 (SBF) is implemented as a J2EE application deployed on JBoss Application Server. The SBF 100 provides communication backbone for the system; accepts requests from Smart Devices 90, Administration Web Apps 20, Personalization Web Apps 30, Inference Engine 200, External Applications 300 (all use Web services); sends notifications to DBMS 80 (JDBC), Smart Devices 90 (JMS), Inference Engine 200 (JMS), Notification Agents 60 (JMS), External Applications 300 (Web services); (2) Administration Web Application 20 (AWA) is implemented as a J2EE application deployed on JBoss Application Server. The AWA 20 is the system administration Web application, which sends requests to Smart Building Framework 100 (Web Services) and accepts requests from web browsers and Administration Web UI 40 (HTTP); (3) Personalization Web Application 30 (PWA) is implemented as a J2EE application deployed on JBoss Application Server. The PWA 30 sends requests to Smart Building Framework 100 (Web Services) and accepts requests from web browsers and Personalization Web UI 50 (HTTP); (4) Hypersonic Database 80 (HDBMS) comes with JBoss Application Server distribution. The HDBMS 80 stores system configuration data; stores information about system objects and archives information generated by system objects; and (5) Inference Engine 200 (CLIPS, Java) controls devices (through Smart Building Framework 100), implements system logic, provides data to rule engine and retrieves output from rule engine, sends messages to Smart Building Framework 100 (web services), accepts notifications from Smart Building Framework 100 (JMS).

For the Administration Machine 810, Microsoft Windows 2000/XP is required. The workstation provides administration GUI interface to the System administrator. The workstation runs the following components of the System: (1) Administration Web User Interface 40 (AWUI) is running in web browser. The AWUI 40 renders UI for the system administrator and provides the central administration interface for the while Framework [?]. The AWUI 40 is using Scalable Vector Graphics and JavaScript for graphics, and includes Communication Module 41 (AJAX) and Notification Module 42 (ActiveX); and (2) Notification Agent 60 (NA) is implemented as a Java Application. The NA 60 receives notifications from the Smart Building Framework 100, passes notifications to the UI Notification Module 42, and starts Web browser with the UI component.

For User Workstation 600, Microsoft Windows 2000/XP is required. The workstation is installed in user's office (cubicle) and runs the following components of the System: (1) Personalization Web User Interface 50 (PWUI) running in Web browser. The PWUI 50 is using Scalable Vector Graphics and JavaScript for graphics, and includes Communication Module 51 (AJAX) and Notification Module 52 (ActiveX); (2) Notification Agent 60 (NA) is implemented as a Java Application. The NA 60 receives notifications from the Smart Building Framework 100, passes notifications to the UI Notification Module 52, and starts Web browser with the UI component; (3) Profile Manager 70 (PM) implemented as a Java Application. The PM 70 starts on user login, starts Presence Agent 95 and Notification Agent 60 after positive authentication, communicates with Smart Building Framework 100 to verify credentials, stores user credentials, stores local user preferences. Alternatively, Presence Agent 95 and Notification Agent 60 start simultaneously to Profile Manger 70. If user credentials are non-existent or invalid both components will wait before starting their operation; and (4) Presence Agent 95 (PE) implemented as a Java Application and works as a sensor device. The PE 95 starts upon user login to the system, retrieves user credentials from the stored user profile, notifies Smart Building Framework 100 about user logon.

For Smart Device Controller 820, Microsoft Windows 2000/XP is required. The workstation is running one or more Smart Devices 90', 90" that control physical (or simulated) sensors. Smart Device 90 (SD) represent a Real Device 97', 97" in the System, accepts messages from the real device 97', 97" using proprietary protocol, sends messages to the real device 97', 97" (proprietary protocol), sends messages to the Smart Building Framework (Web Services), accepts notifications from Smart Building Framework 100 (JMS), implements some operations required by the Smart Building Framework 100 but not implemented directly by the Real Device 97', 97".

The Default installation requires three workstations running Windows operating system. The System requires some Real Devices 97', 97" to be controlled by Smart Devices 90', 90".

Smart Building Server 800 requires Microsoft Windows 2000/XP/2003, Internet Explorer Web Browser 6.0 or higher, Java 2 SDK 1.4, JBoss Application Server 4.0.1. Smart Building Server 800 includes: Smart Building Framework 100 (SBF) implemented as a J2EE application deployed on JBoss Application Server, Administration Web Application 20 (AWA) implemented as J2EE application deployed on JBoss Application Server 830, Personalization Web Application 30 (PWA) implemented as J2EE application deployed on JBoss Application Server 830, Hypersonic Database 80 (HDBMS) that comes with JBoss Application Server distribution, and Inference Engine 200 (CLIPS, Java).

Administration Machine 810 requires: Microsoft Windows 2000/XP, Internet Explorer Web Browser 6.0 or higher, Java 2 SDK 1.4. Administration Machine 810 system components include: Administration Web User Interface 40 (AWUI) running in web browser 840, and Notification Agent 60 (NA) implemented as a Java Application.

User Workstation 600 requires Microsoft Windows 2000/XP, Internet Explorer Web Browser 6.0 or higher, Java 2 SDK 1.4. User Workstation 600 system components include: Personalization Web User Interface 50 (PWLI) running in Web browser 850, Notification Agent 60 (NA) implemented as a Java Application, Profile Manager 70 (PM) implemented as a Java Application, Presence Agent 60 (PE) implemented as a Java Application, one or more Smart Devices 95 implemented as a Java applications.

With the exception of the operating system layer, all technologies used in the System implementation of an embodiment of the present invention are open source products and do not require any license to run. A preferred embodiment of the System does not implement any licensing mechanism.

In accordance with an embodiment of the present invention, functional requirements for a preferred embodiment of the system comprising the software components, as described supra, is summarized in Table 3 below.

TABLE 3

| Category/ID | Requirement | Priority |
|---|---|---|
| Functional System Requirements for example embodiment | | |
| Framework | | |
| SG-001 | The System shall be a prototype of the software framework for creating Smart Building systems. | essential |
| Demonstration | | |
| SG-002 | The System shall illustrate the capabilities of the software framework. | essential |
| SG-003 | The System shall be an example of the real Smart Building system. | essential |
| SG-004 | It shall be possible to execute the following Demonstration Scenario using the System. | essential |
| Environment Model | | |
| Framework | | |
| EM-001 | The controlled space shall be divided into rooms. | essential |
| EM-002 | Each room shall be divided into environmental zones (in the simplest case, a room will have only one environmental zone). | essential |
| EM-003 | Only one environmental profile shall be active in an environmental zone. | essential |
| EM-004 | Active environmental profile in the environmental zone shall determine environmental settings for this zone (temperature, humidity, light, etc). | essential |
| EM-005 | An environmental zone shall have default environmental profile associated with it. | essential |
| EM-006 | A user shall have only one instance of environmental preferences associated with her. | essential |
| EM-007 | The following factors influence active environmental profile in the environmental zone: 1) environmental preferences of users present in the environmental zone 2). default environmental profile of the zone 3) commands from the inference engine 4) commands from the administrator. | essential |
| EM-008 | Information about the location of the devices shall have granularity of the environmental zone. | essential |
| EM-009 | An environmental zone shall have user presence information associated with it. | essential |
| EM-010 | An environmental zone shall have a list of neighboring environmental zones associated with it. | essential |
| Monitoring | | |
| Framework | | |
| MO-001 | The System shall be able to detect changes in the state of user presence in the controlled space. | essential |
| MO-002 | The System shall be able to detect changes in the state of the devices placed in the controlled space. | essential |

TABLE 3-continued

| Category/ID | Requirement | Priority |
|---|---|---|
| Actions | | |
| *Framework* | | |
| AC-001 | The System shall be able to change the state of the devices placed in the controlled space. | essential |
| AC-002 | The System shall have ability to notify system Administrator about a system event. | essential |
| AC-003 | The System shall have ability to notify emergency personnel about a system event. | essential |
| AC-004 | The System shall have ability to notify a specific user about a system event. | essential |
| AC-005 | The System shall have ability to notify users in the selected environmental zones about a system event. | essential |
| Data | | |
| *Framework* | | |
| DT-001 | The System shall maintain information about user's of the System. | essential |
| DT-002 | Information about a user shall include: ID, properties, current environmental preferences, history of the user preferences. | essential |
| DT-003 | The System shall maintain information about the devices in the controlled space. | essential |
| DT-004 | Information about a device shall include: ID, location (environmental zone), properties, services. | essential |
| DT-005 | The System shall have ability to store a record of properties for the selected device (for example, record of temperature readings). | essential |
| DT-006 | The System shall maintain information about the physical space of the controlled space. | essential |
| DT-007 | Information about the physical space shall be sufficient to determine the configuration of environmental zones in the controlled space and render layout of the space in the GUI. | essential |
| DT-008 | The System shall maintain information about the environmental zones present in the controlled space. | essential |
| DT-009 | Information about the environmental zone shall include: unique identifier of the zone, human-readable name and description of the zone, a list of neighboring zones (the list might potentially be empty as a zone might have 0 neighbors), the environmental profile associated with the zone. | essential |
| DT-010 | The System shall maintain information about the emergency personnel. | essential |
| DT-011 | Information about the emergency personnel shall include name, description, and contact information. | essential |
| DT-012 | The System shall provide mechanisms for retrieving/adding/removing/modifying the maintained information. | essential |
| Presence | | |
| *Framework* | | |
| PR-001 | User presence shall have three distinct states: 1). identified users are present (in particular, there could be only one user present) 2). unidentified user is present 3). no user is present. | essential |
| PR-002 | State 1) shall be determined by identified presence sensor devices. Examples of such sensor devices are a computer system requiring user login or a wireless ID tag and a receiver. | essential |
| PR-003 | State 2) shall be determined by anonymous presence sensor devices. An example of such sensor devices is a motion detector of a JC PEM unit. | essential |
| PR-004 | A group of users in the same environmental zone shall be treated as an unidentified user unless any user from the group uses an identified presence sensor device. | essential |
| PR-005 | User's presence (both identified and anonymous) shall be communicated to the system in order to optimize user's environmental zone. | essential |
| Management | | |
| *Framework* | | |
| MA-001 | It shall be possible to set the priority for each factor (see EM-007) used to determine the environmental profile for the environmental zone. | essential |
| MA-002 | The System shall implement mechanism for scheduling periodic system actions. | conditional |
| Interfaces | | |
| *Framework* | | |
| IN-001 | The System shall provide Administrator's Interface for managing the System operations. | essential |
| IN-002 | The System shall provide User's Interface for managing personal environmental preferences. | essential |
| IN-003 | The System shall provide Web Services interface for managing the System operations. | essential |
| User's Interface | | |
| *Framework* | | |
| UI-001 | User shall be able to set her environmental preferences using software interface. | essential |
| UI-002 | User shall be able to read current environmental profile of her environmental zone using software interface. | conditional |
| UI-003 | User shall be able to read her current environmental preferences using software interface. | essential |
| UI-004 | User shall be able to read current environmental conditions using software interface. | conditional |
| UI-005 | Notifications about system events shall be displayed by the user's interface. | essential |
| UI-006 | Notifications about system events shall be complemented by auditory notification mechanisms. | essential |
| Administrator's Interface | | |
| *Framework* | | |
| AD-001 | Administrator's Interface shall control all aspects of the System operation. | essential |
| AD-002 | Administrator's Interface shall provide access to all the information maintained by the System (see Data section). | essential |
| *Demonstration* | | |
| AD-003 | Information about each room in the controlled space shall be displayed as a graphical layout with representation of walls, cubicles, and other physical obstacles. | essential |
| AD-004 | Information about each environmental zone in the room shall be displayed as an outline of the area covered by this zone imposed on the layout of the room. | essential |
| AD-005 | Information about environmental profile for each environmental zone shall be displayed within the outline of the corresponding zone. | essential |

TABLE 3-continued

| Category/ID | Requirement | Priority |
|---|---|---|
| AD-006 | Information about current environmental conditions for each environmental zone shall be displayed within the outline of the corresponding zone. | essential |
| AD-007 | Information about environmental preferences of the users present in the environmental zones shall be displayed within the outline of the corresponding zone. | essential |
| AD-008 | All devices and users in the controlled space shall be displayed as graphical objects imposed on the representation of the room and placed within the outline of the zone where they are located. | essential |
| AD-009 | Appearance of active object (device, environmental zone, user) shall differ from the appearance of inactive object. | essential |
| AD-010 | Information about devices, environmental zones, and active users in the controlled space shall be available upon selecting the graphical object that represents them. | essential |
| AD-011 | Information about user's properties shall be available. | essential |
| AD-012 | Information about user's environmental preferences shall be available. | essential |
| AD-013 | Information about user's environmental preferences history shall be available. | essential |
| AD-014 | Changes to the information (for example, temperature read-out from the sensor) about all devices, environmental zones, and users in the controlled space shall be available in real time. | essential |
| AD-015 | Changes to the status (active/inactive) of all devices, environmental zones, and users in the controlled space shall be displayed in real time. | essential |
| AD-016 | Administrator's Interface shall be able to display the difference between environmental preferences of the user present in the environmental zone and environmental profile calculated by the System for this zone. | conditional |
| AD-017 | Administrator's Interface shall have controls to adjust the environmental profile in any environmental zone to the desired level. | essential |
| Devices | | |
| Framework | | |
| DV-001 | The System shall have generic interface for connecting devices (vendor-independent). | essential |
| Demonstration | | |
| DV-002 | JC PEM shall be connected to the System. | essential |
| System Security | | |
| Framework | | |
| SE-001 | Access to the Administrator's Interface shall be protected by password verification. | essential |
| SE-002 | User's identity shall be verified through login/password procedure. | essential |
| SE-003 | User's identity shall be verified through biometric procedure. | optional |
| Inference Engine | | |
| Framework | | |
| IE-001 | The System shall be able to use archived and the current information in making decisions. | essential |
| IE-002 | The decision-making logic of the System shall be scriptable and replaceable. | essential |
| Demonstration | | |
| IE-003 | The System shall implement example logic detecting an anomaly. | essential |
| IE-004 | The System shall implement example logic able to evaluate the anomaly and determine the affected environmental zones. | essential |
| IE-005 | The System shall implement example logic able to undertake actions AC-001-AC-005 depending on the results of the evaluation and affected environmental zones. | essential |
| IE-006 | The System shall implement example logic able to recover to normal operation once the anomaly response procedure has been completed. | essential |
| IE-007 | The System shall implement example logic calculating energy-efficient environmental profile for the particular environmental zone in the building. | essential |
| Deployment | | |
| Demonstration | | |
| DP-001 | The System shall be deployed on Monitoring Station and on User's Station. | essential |
| DP-002 | Administrator's Interface functionality of the System shall be available on Monitoring Station. | essential |
| DP-003 | User's Interface functionality shall be available on User's Station. | essential |
| DP-004 | JC PEM device and User's Station shall be deployed in the same environmental zone. | essential |
| DP-005 | Sensor Station shall simulate a sensor device. | optional |
| DP-006 | Device Station shall simulate a device that can be controlled remotely (e.g. boiler, heater). | optional |
| Other | | |
| Framework | | |
| OT-001 | Open source software shall be used in the System implementation wherever possible. | essential |

Figure 16:
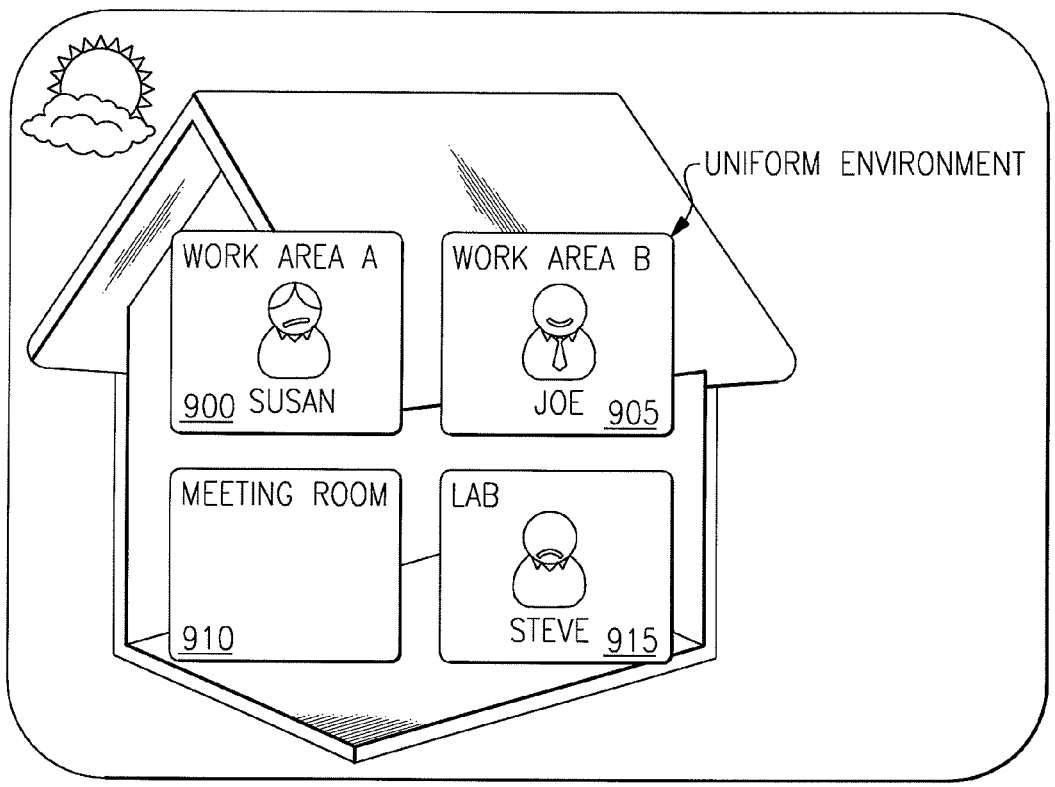
FIGS. 16-18 is a graphical diagram of a building with four rooms illustrating the systems ability to customize environmental properties of building spaces and to align them with preferences declared by the individual users according to an embodiment of the present invention.
Figure 17:
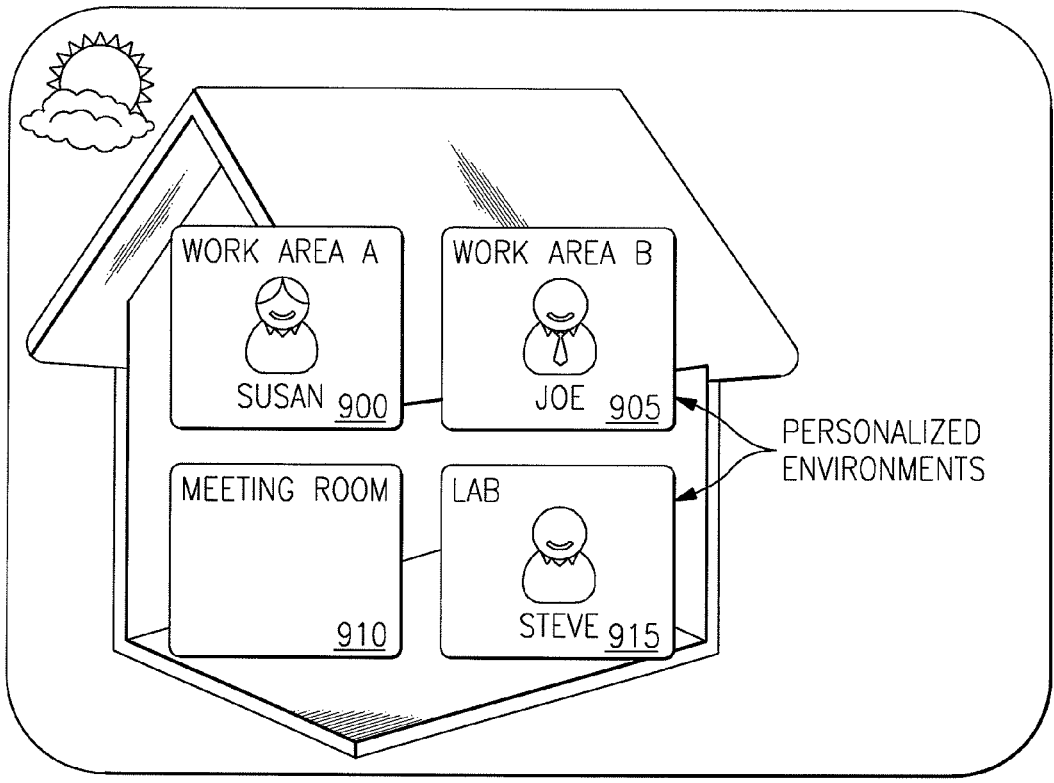
Figure 18:
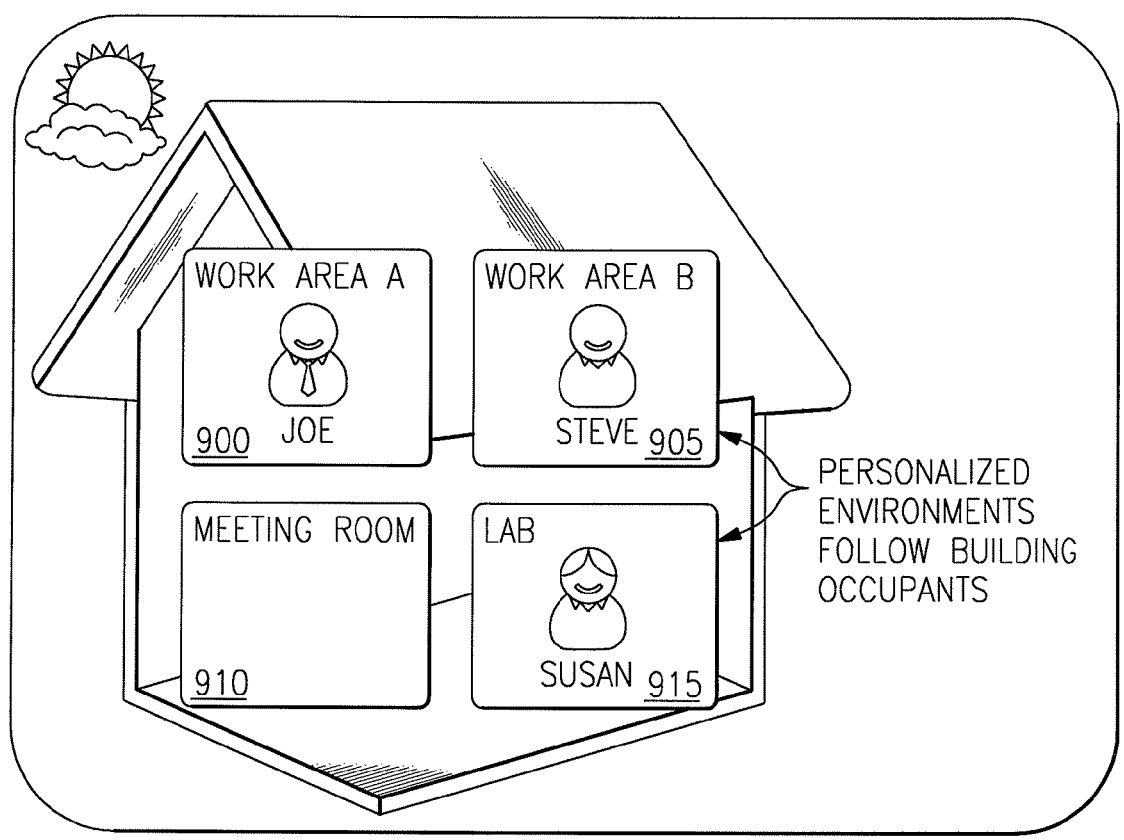

Turning to FIGS. 16-18, a building with four rooms is shown in order to illustrate the ability of the preferred embodiment of the system to customize environmental properties of building spaces and to align them with the preferences declared by the individual users. In each of FIGS. 16-18, work area A 900, work area B 905, meeting room 910, and lab 915 are shown.

FIG. 16 shows a building that does not have the system of an embodiment of the present invention. The rooms 900, 905, 910, and 915, each have a uniform environment. However, as shown in FIG. 17-18, a building which has incorporated the system of an embodiment of the present invention, individual user environmental preferences are illustrated. These environmental preferences form an environmental profile of an individual user that can travel with the individual across the building space and into different rooms.

Figure 19:
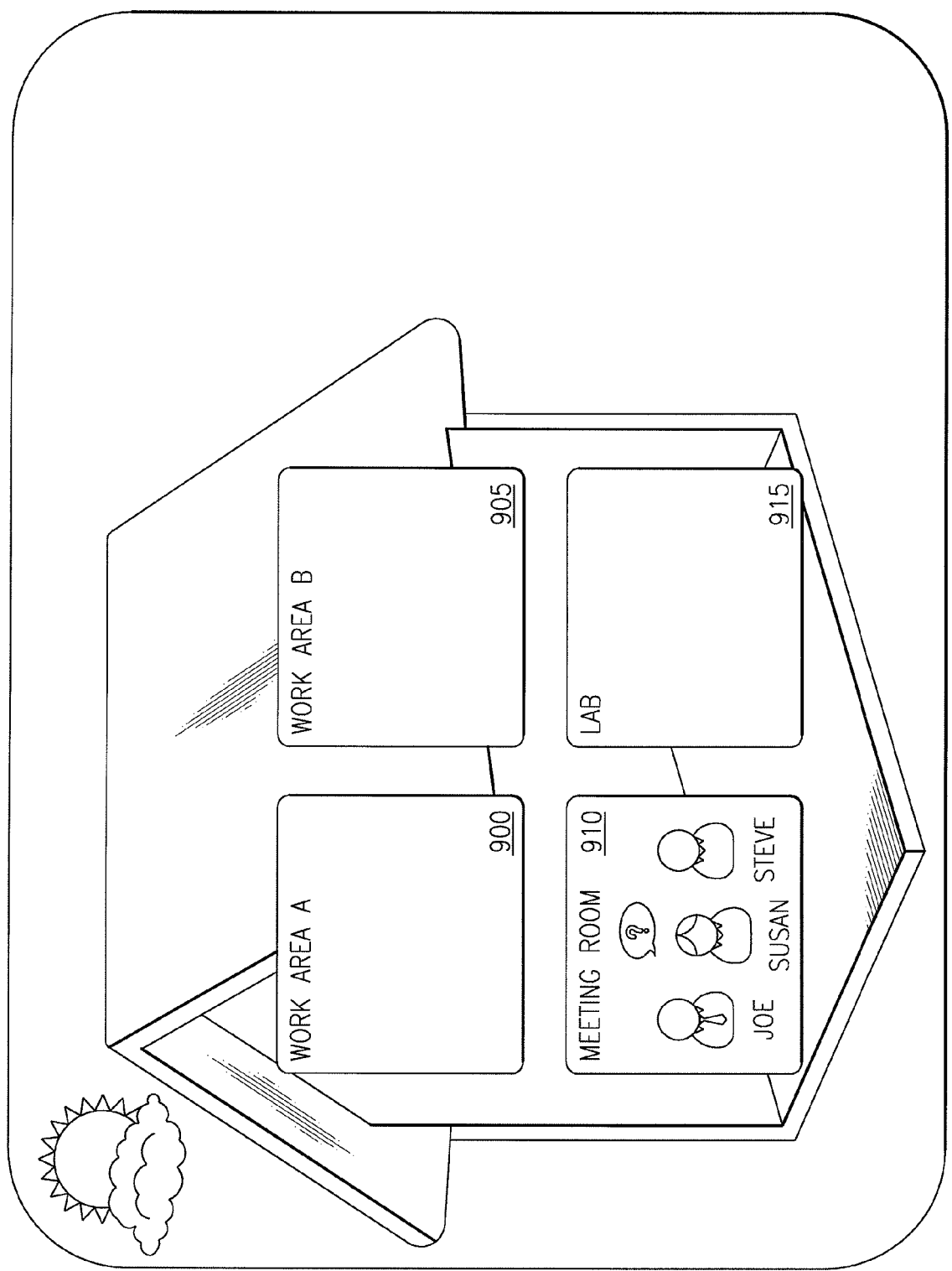
FIG. 19 is a graphical diagram of a building with four rooms illustrating factors that influence an environmental profile in an environmental zone according to an embodiment of the present invention.

Turning to FIG. 19, factors that influence an environmental profile in an environmental zone is shown. This figure illustrates the situation where environmental preferences of the users present in the environmental zone (here—meeting room 910) are factors that can influence the environmental profile of the room. Other factors that have an influence on the environmental profile of a room, are discussed supra.

Figure 20:
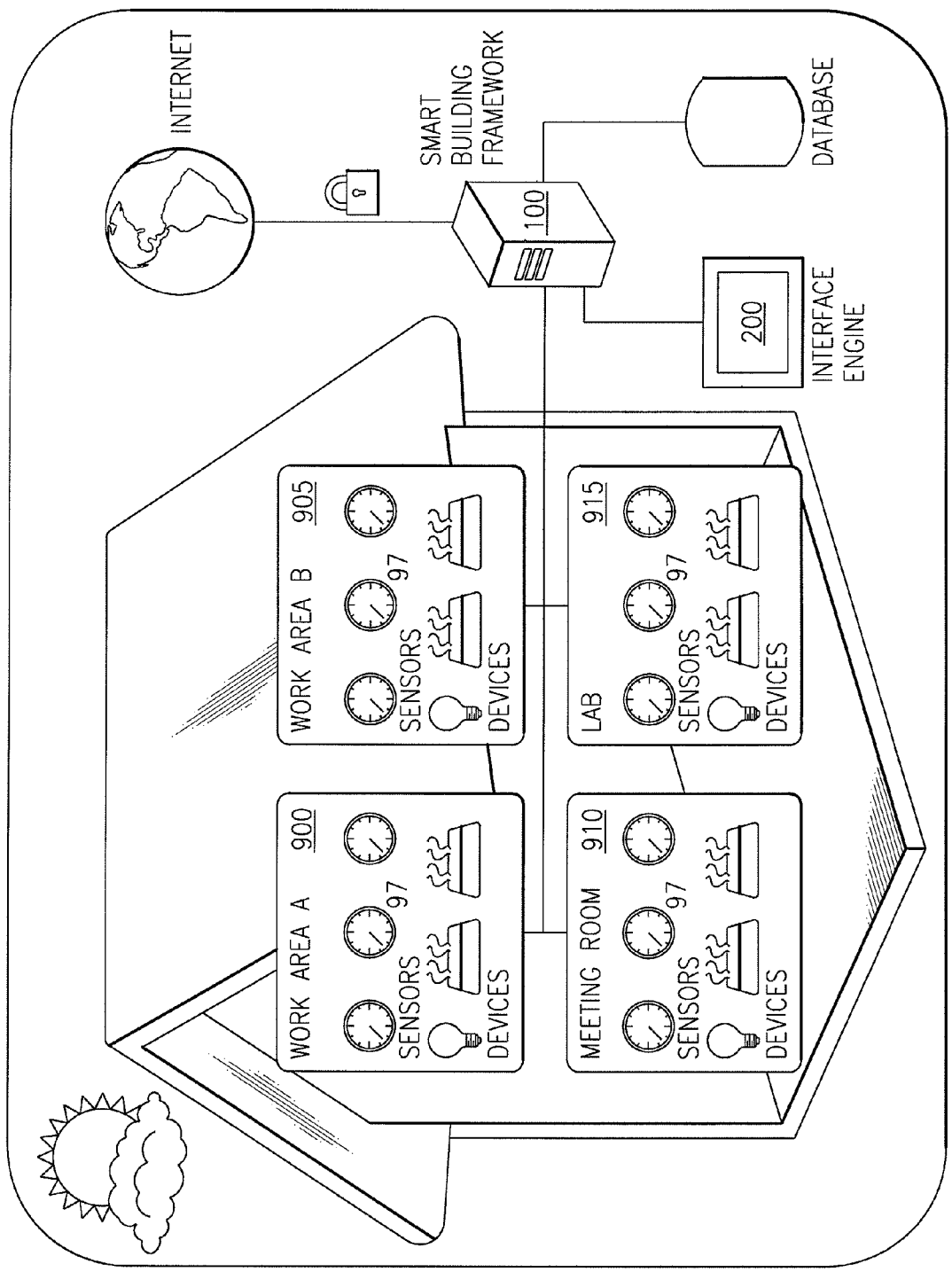
FIG. 20 is a graphical diagram of a building with four rooms illustrating the relationship between the system and a building work environment set forth in FIGS. 16-19 according to an embodiment of the present invention.

Turning to FIG. 20, the relationship between the system and a building work environment set forth in FIGS. 16-19 is shown. FIG. 20 shows that the overall system design is Internet-centric, uses Web Service, and assumes IP addressability of all system elements, including sensors and control devices (Devices 97). The connections between the Smart Building Framework 100, Inference Engine 200, Database 80 and the individual rooms 900, 905, 910, and 915 are shown.

In some applications of the environmental control system of the present invention, there may be a local computer located in or near the environmentally controlled zone (e.g., workstation). This computer may be for example, a PC. This computer may help process data from the sensor(s) or control instructions being sent to the environmental control appliance(s) (see definitions, supra).

In some applications of the present invention, some or all of the sensor(s) and/or the environmental control appliance(s) may send data to and/or receive data from remote computer(s). Sensor(s) that send data directly to remote locations should preferably have sufficient processing built in to convert raw sensor data into an Internet transmissible protocol. Environmental control appliance(s) that receive control instructions directly from remote locations should preferably have sufficient processing built in to convert control instructions in the format of an Internet transmissible protocol into physical control of the operative hardware of environmental control appliance. Further aspects of the distribution of software and/or functionality between sensor(s), control appliance(s) and any local computer will now be discussed.

In accordance with an embodiment of the present invention, raw sensor data is massaged by a local microcontroller prior to communications with the server. Any sort of "intelligent" or "smart" sensor would include some sort of processor element. In fact, the local sensor may have two levels of processor—one to handle the sensor data collection and another to support the communications protocol, such as TCP/IP. With such a scheme it's possible to substitute one protocol with another without changing the firmware supporting the other functions. For example, in the PEM interface 420, as discussed supra, it would be very easy to replace the ethernet controller module with a USB or a Bluetooth communications module.

A generalized sensor may need to have it's raw data converted to standard, calibrated units. Some sensors would require linearization of their raw data. At a minimum, the local processor handles the minutia of getting the data from the sensor. For example, reading the temperature and humidity from a Sensirion SHT7× sensor requires lots of bit-banging to properly obtain the data from the sensor. The SHT7× sensor is also an example of a smart sensor that includes some processing built into the sensor.

In any situation, the purpose of the local processing is to: 1. Provide communications with the central server. This would include any security protocols; 2. Provide sensor data and status to the central server on demand without bogging down the central server with the details of specific sensor management; 3. Optionally accept and handle alarm thresholds for sensor values so that the local smart sensor can alert the system to a critical condition; 4. Optionally provide a list of available data and services; 5. Optionally provide a local user interface to the sensor data and alarm states. For example, a local thermostat could accept settings through a local control panel and LCD, and then report any local changes to the central server.

A "PEM interface" 420 according to present invention preferably has many of these features, but its specific functionality will preferably be unique to its intended application. The PEM interface 420 shown in FIG. 22 will now be further discussed.

The PEM Interface 420 is a specialized device that preferably insinuates itself into the Johnson Controls' PEM system between the user slider control and the PEM base unit. This allows the PEM Interface 420 to report the values of the slider controls to the Smart Building System and also set these slider control parameters independent of the actual slider positions. Power is provided either from a separate wall-wart power module or directly from the PEM Interface 420. The PEM Interface 420 preferably has some built-in sensors (for example, a Dallas DS1726 temperature sensor and a Sensirion SHT75 temperature/humidity sensor). In research platform applications of the PEM Interface 420, it is preferable to provide additional analog inputs and outputs, as well as two connections to the SPI bus. These allow for the connection of other controls or sensors to the PEM Interface 420.

The Ethernet interface is preferably handled by a Lantronix XPORT interface module. This module takes care of all the Internet protocols and effectively serves as an Ethernet-to-RS232 converter. Data encryption is preferably supported. Preferably, there is a connection to the PEM Interface 420 microcontroller that allows the XPORT interface module to be reset, and another digital line that can be used to trigger the XPORT module to send an e-mail in response to some programmed event. The XPORT module preferably runs on 3.3 VDC power.

Analog outputs are preferably configured for a 0-10V range. Voltage dividers on the analog inputs allow 0-10V inputs to be scaled down to the 0-5V input range of the microcontroller's ADC. Other positive-voltage input ranges could be accommodated by changing the resistors that comprise the input voltage dividers. The PEM Interface 420 accepts the following control inputs from the standard PEM user input control: temperature, task lighting, white noise, fan, radiant heat, and occupancy. Occupancy is preferably a digital input. The user control panel has a PIR sensor circuit that changes the state of the occupancy control line when presence is detected. The other inputs are preferably analog voltage controls. The temperature control changes the temperature of the forced air. The fan control changes the speed of fans in the PEM. The task lighting control dims an attached task light. The white noise control helps mask noise exterior to the cubicle, workstation or other environmentally controlled zone. The radiant heat control changes the intensity of a radiant electric heater at the user's feet, for example.

The PEM Interface 420 preferably operates in two modes: pass-through and computer-controlled. In pass-through mode, all the analog inputs and the occupancy sensor state are preferably replicated on the PEM control input. In some preferred embodiments, no computer control at all is required. The state of the control inputs, local temperature and humidity sensors, auxiliary inputs can be monitored via the Ethernet interface. SPI device messages can also be transmitted. In computer-controlled mode, the outputs are preferably only controlled via the Ethernet interface. Changing the state of an input does not directly change the corresponding output. Output changes are transmitted to the local PEM interface via the Ethernet interface. This mode could allow for more complicated response functions of the input sliders.

Another use would be for the Smart Building System to exert local control as part of goal-seeking algorithms. For example, if the occupancy sensor (preferably an accurate occupancy sensor) monitor discovered that the cubicle occupant had left the area, the Smart Building System could turn down the temperature, and switch off the task lighting and the radiant heater. When the cubicle occupant returns, these settings could automatically be restored. Similarly, energy consuming settings could be automatically implemented at the end of the business day, or alternatively when the occupancy sensor determines that all occupants are likely to be gone from the environmentally controlled zone for a substantial length of time.

In the PEM Interface 420, the actuators (task light, heater, white noise, and fan) can be either locally controlled or get their levels from the server computer. The PEM Interface 420 acts like it's another slider control wired in parallel to the standard user slider control (or is completely passive and just monitors the user settings). Generalized, a local actuator could receive its setting from the central server, but could also employ alarm thresholds and local sensors to provide local closed-loop operation. Using the heater example, the local device could switch on the radiant heater panel, but local sensors could also monitor the temperature to make sure that the affected area doesn't get too hot and act like a local thermostat. Some safety features (a tip-over sensor, for example) would have to be implemented so that processor or system failure would not interfere with their action. A tip-over switch would have to directly cut power to a local heater, but still could be monitored by the local smart sensor interface which could report alarm conditions to the central server for added protection.

Effectively, smart sensor/actuators preferably have all the "smarts" they need in order to perform their assigned task. The concept is scalable. The simplest form would be a single microcontroller with supporting discrete components and a single sensor of some sort. On the other end of the scale, the "smart sensor" could be a full-fledged computer bristling with actuator controllers and sensor input interfaces. The concept is also extensible, covering not only smart building control, but also process control in a factory, or even control of animatronics.

The modular design of the system permits replacement of any of is components by a proprietary or simply different implementation. The focus on open-source software provides an affordable starting configuration. Device drivers, which are a very significant obstacle to interoperability, can be implemented in a matter of days or even hours by extending or replacing software modules provided in templates. The selection of Web Services implemented in the framework covers all typical uses identified in BAS systems, and implementation of an operational system of medium complexity provides a strong proof of the concept.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

What is claimed is:

1. An environmental control system for controlling at least a first environmental control appliance and for receiving at least a first detected environmental characteristic from at least a first environmental control sensor, the environmental control system comprising:
    an Internet protocol communication network, wherein said at least a first environmental control appliance and said at least a first environmental control sensor are directly connected to said Internet protocol communication network;
    a server computer comprising a control module; and
    an environmental control sub-system comprising an environmental control sensor software module and an environmental control appliance software module;
    wherein:
    the environmental control sensor software module is adapted to receive the first detected environmental characteristic from the first environmental control sensor in a format of an environmental control sensor protocol, to convert the first detected environmental characteristic into a format of an Internet transmissible protocol, and to send the first detected environmental characteristic in the Internet transmissible protocol over the communication network;
    the control module is adapted to receive the first detected environmental characteristic in the Internet transmissible protocol from the communications network, to determine a control signal based at least in part on the first detected environmental characteristic, to convert the control signal into the format of the Internet transmissible protocol, and to send the control signal in the Internet transmissible protocol over the communications network; and
    the environmental control appliance software module is adapted to receive the control signal in the Internet transmissible protocol from the communications network, to convert the control signal into a format of an environmental control appliance protocol, suitable for controlling the first environmental control appliance, and to send the control signal in the environmental control appliance protocol to the first environmental control appliance to control the operation of the first environmental control appliance.

2. The environmental control system of claim 1, wherein said control module further comprises:
    a smart building framework module; and an inference engine module;
    wherein:
    said smart building framework module is adapted to monitor status of each of said first environmental control appliance by communicating with the environmental control appliance software module and said first environmental control sensor by communicating with the environmental control sensor software module;
    said smart building framework module is adapted to facilitate communication between said environmental control sensor software module and said inference engine module;
    said smart building framework module is adapted to facilitate communication between said environmental control appliance software module and said inference engine module; and
    said inference engine module is adapted to implement control logic of said control module.

3. The environmental control system of claim 2 further comprising a Web Services technology adapted to implement the communication between said environmental control sensor software module and said inference engine module.

4. The environmental control system of claim 3 wherein the Web Services technology is adapted to implement the communication between said environmental control appliance software module and said inference engine module.

5. The environmental control system of claim 1, wherein the Internet transmissible protocol is Hypertext Transfer Protocol.

6. The environmental control system of claim 1, wherein said environmental control sensor protocol is an Internet transmissible protocol.

7. The environmental control system of claim 1, wherein said environmental control appliance protocol is an Internet transmissible protocol.

8. The environmental control system of claim 1, wherein:

the environmental control sensor software module is further adapted to receive a second detected environmental characteristic from a second environmental control sensor in a format of a second environmental control sensor protocol, to convert the second detected environmental characteristic into a format of the Internet transmissible protocol, and to send the second detected environmental characteristic in the Internet transmissible protocol over the communication network;

the control module is further adapted to receive the second detected environmental characteristic in the Internet transmissible protocol from the communications network, to determine a second control signal based at least in part on the second detected environmental characteristic, to convert the second control signal into the format of the Internet transmissible protocol, and to send the second control signal in the Internet transmissible protocol over the communications network; and the environmental control appliance software module is further adapted to receive the second control signal in the Internet transmissible protocol from the communications network, to convert the second control signal into a format of a second environmental control appliance protocol, suitable for controlling the second environmental control appliance, and to send the second control signal in the second environmental control appliance protocol to the second environmental control appliance to control the operation of the second environmental control appliance.

9. An environmental control system, for use by at least a first user, the system comprising:

a first environmental control appliance;

a first environmental control sensor adapted to detect a first detected environmental characteristic in an environmental zone;

a communication network;

a first user profile that may be activated on a plurality of workstations, said user profile being adapted to dictate whether the first user is present in an environmental zone;

a server computer comprising a control module and a first user environmental preference data comprising at least one environmental control preference corresponding to the first user; and an environmental control sub-system, adapted to be located remotely from the server computer, in proximity to the first environmental control appliance and in proximity to the first environmental control sensor, the sub-system comprising an environmental control sensor software module and an environmental control appliance software module;

wherein:

the environmental control sensor software module is adapted to receive the first detected environmental characteristic from the first environmental control sensor and to send the first detected environmental characteristic over the communication network;

the control module is adapted to receive the first detected environmental characteristic from the communications network, to determine a control signal based at least in part on the first detected environmental characteristic, and to send the control signal over the communications network;

the environmental control appliance software module is adapted to receive the control signal from the communications network, and to send the control signal in the environmental control appliance protocol to the first environmental control appliance to control the operation of the first environmental control appliance; and the control module is further adapted to control the first environmental control appliance based upon the first user environmental preference data when it is dictated by the first user profile that the first user is present in the environmental zone.

* * * * *